US007367277B2

(12) United States Patent
Bowman

(10) Patent No.: US 7,367,277 B2
(45) Date of Patent: May 6, 2008

(54) PULLEY

(76) Inventor: George Bowman, 362 Kennington Rd., London SE11 4DB (GB)

( * ) Notice: Subject to any disclaimer, the term of this patent is extended or adjusted under 35 U.S.C. 154(b) by 251 days.

(21) Appl. No.: 11/233,654

(22) Filed: Sep. 23, 2005

(65) Prior Publication Data

US 2006/0079357 A1 Apr. 13, 2006

(30) Foreign Application Priority Data

Sep. 23, 2004 (GB) ................................ 0421249.4

(51) Int. Cl.
*B63H 9/04* (2006.01)
*F16H 9/10* (2006.01)

(52) U.S. Cl. .................................... 114/102.12; 474/67

(58) Field of Classification Search ............ 114/102.12
See application file for complete search history.

(56) References Cited

U.S. PATENT DOCUMENTS 4,440,354 A * 4/1984 Kobayashi et al. ...... 242/388.8

* cited by examiner

*Primary Examiner*—Jesús D Sotelo
(74) *Attorney, Agent, or Firm*—St. Onge Steward Johnston & Reens LLC

(57) ABSTRACT

A pulley comprising a first pulley wheel and a second pulley wheel and a ratchet acting between the two pulley wheels. When substantially equal force is applied to each pulley wheel in use on a rope tail side causing the pulley wheels to rotate, a low gear ratio is achieved through a rope, chain or the like acting on a load through a block. When one pulley wheel is prevented from rotating and a force is applied to the other pulley wheel in use on a rope tail side causing it to rotate, then a higher gear ratio is achieved through a rope or chain or the like acting on a load through a block. When force is applied to the first wheel on a rope tail side and the second pulley wheel is allowed to rotate, then a still higher ratio is achieved in use through a rope, chain or the like acting on a load through a block. In another embodiment, the pulley comprises a first pulley wheel, a second pulley wheel and means to prevent relative rotation of the pulley wheels in one direction, the pulley wheels being able to rotate relative to each other in the other direction. In another embodiment, the pulley comprises a first pulley wheel, a second pulley wheel and means acting between the pulley wheels such that, a force acting to rotate the first pulley wheel in a first direction imparts a corresponding force to rotate the second pulley wheel in a second, opposite direction.

66 Claims, 47 Drawing Sheets

D – D

B – B

C – C

B – B

BII – BII

PULLEY

This application claims priority of British Patent Application No. 0421249.4 filed on Sep. 23, 2004.

FIELD OF THE INVENTION

The present invention relates to a pulley which can be used as an improved type of differential pulley, and is particularly but not exclusively concerned with use in sailing, mountaineering and industry, and more particularly for use with a mainsheet for controlling the angle of a mainsail on a sailing boat, or for the kicking strap or boom vang on a sailing boat or any other rope handling application on a sailing boat.

BACKGROUND OF THE INVENTION

FIG. 1 shows a known differential pulley 10. Differential pulleys are used to lift heavy loads because they achieve a high gear ratio. A standard differential pulley 10 consists of two pulley wheels 12, 14 of different radii R, r which are fast with one another to rotate as one about a common axle. The differential pulley 10 is fixed in position so as not to move. A continuous chain 16 is run around both pulley wheels 12, 14 in opposite directions to create two hanging loops 18, 20. A moveable pulley block 22, which is connected to a load 24, is placed in a first hanging loop 18, and the load 24 is raised or lowered by pulling or releasing respectively a length of the second hanging loop 20. When the load 24 is being raised or lowered, the two pulley wheels 12, 14 rotate as one around the common axle and, because the chain 16 is reaved in opposite directions around each wheel 12, 14, the chain 16 winds upon one pulley wheel as it unwinds from the other. A high gear ratio is achieved because the pulley wheels 12, 14 have different radii. It is important that the chain 16 does not slip on the pulley wheels 12, 14, and so the pulley wheels 12, 14 have lugs (not shown) to engage the chain links and thereby prevent slipping.

The known differential pulley 10 achieves a single high power gear ratio which is determined by the radii of the two pulley wheels 12, 14, and it is not possible to achieve multiple gear ratios from a single known differential pulley 10. However, there are applications where more than one gear ratio is desired.

On a sailing boat 30, for example as shown in FIG. 2, when the mainsail 32 is being controlled, it is advantageous to be able to use a high gear ratio when large forces are acting on the mainsail 32, or when fine control of the position of the mainsail 32 is required. It is also advantageous to be able to trim the sail position quickly when maneuvering, and this requires that the pulley system 34 for the mainsheet 36 is configurable to have more than one gear ratio, preferably having at least one high power gear ratio and one low power gear ratio. The known differential pulley would not be useful for such applications. In the known boat shown in FIG. 2 the mainsheet pulley system acts between the boom 38 and a transverse spar 40 across the boat 30. A pulley system 42 is also used on the known boat 30 for the vang 44 or kicking strap to the boom 38.

Two-speed mainsheet block and tackle systems provide mainsail control with two gear ratios. For example, a mainsheet pulley system as shown in FIG. 3 with gear ratios of 4:1 and 16:1 are commercially available. Two-speed continuous mainsheet block and tackle systems, as shown in FIG. 4, having for example gear ratios of 2:1 and 4:1, 3:1 and 6:1, and 4:1 and 8:1 are also commercially available, for example, the Harken system 330 2-speed mainsheet system. However, only two gear ratios are possible with these block and tackle systems, and furthermore, the available gear ratios from a single system are relatively close to one another, thus preventing both very fine tuning and quick trimming of a mainsail with a single mainsheet system.

SUMMARY OF THE INVENTION

According to one aspect of the invention there is provided a pulley comprising a first pulley wheel and a second pulley wheel, the pulley including means acting between the two pulley wheels such that: when substantially equal force is applied to each pulley wheel in use on a rope tail side causing the pulley wheels to rotate, then a low gear ratio is achieved through a rope, chain or the like acting on a load through a block; when the first pulley wheel is prevented from rotating and a force is applied to the second pulley wheel in use causing it to rotate, then a higher gear ratio is achieved through a rope or chain and the like acting on a load through a block; and, when force is applied to the first wheel on a tail side and the second pulley wheel is allowed to rotate, then a still higher ratio is achieved in use through a rope, chain or the like acting on a load through a block.

In this way, a single pulley which can have three increasing gear ratios in a system is achieved, and so low-power quick trimming and high-power fine tuning of a load may be achieved, which may be at widely differing gear ratios, and an intermediate ratio is also available, which is particularly useful for controlling the position of a mainsail on a sailing boat, or for tightening a boom vang.

In one embodiment, the means acting between the pulley wheels prevents relative rotation of the pulley wheels in one direction, the pulley wheels being able to rotate relative to each other in the other direction. In this way the pulley wheels are not fixed to rotate as one about a common axis, as in the known differential pulley, but the pulley wheels may rotate in a direction opposite from one another, and may rotate as one. As such, the potential to achieve more than one gear ratio exists. A low power gear ratio may be achieved when the pulley wheels rotate relative to one another, and a high power gear ratio may be achieved when the second pulley wheel and the first pulley both rotate as one.

In another embodiment, the means acting between the pulley wheels imparts, when a rotational force is applied to the first pulley wheel, an opposite counter-rotational force on the second pulley wheel such that in the absence of a force on the second pulley wheel opposite to the counter-rotational force, a rotational force applied to the first pulley wheel causes the first pulley wheel to rotate and the second pulley wheel to counter-rotate. In this way, in use, a rope or chain or the like can be reaved in the same direction around the pulley wheels to create a differential system.

According to another aspect of the invention there is provided a pulley comprising a first pulley wheel, a second pulley wheel and means to prevent relative rotation of the pulley wheels in one direction, the pulley wheels being able to rotate relative to each other in the other direction.

In this way, the first pulley wheel and the second pulley wheel are not fixed to rotate as one on a common axle, as in the known differential pulley, but the pulley wheels may rotate in a direction opposite from one another, and may rotate as one. As such, the potential to achieve more than one gear ratio exists. A low-power gear ratio may be achieved when the pulley wheels rotate relative to one another, and a high-power gear ratio may be achieved when the second pulley wheel and the first pulley both rotate as one.

The means to prevent relative rotation of the pulley wheels in one direction may take any suitable form and may comprise a ratchet mechanism. The means acting between the pulley wheels may be a simple ratchet system or a load activated ratchet system where the ratchet operates only when the load on one pulley wheel reaches a certain level. In this way the pulley wheels can freely rotate in either direction under low-load conditions allowing the pulley to run out more freely. The ratchet may be an internal ratchet. Part of the ratchet may be resiliently moveable under load to activate the load-activated ratchet mechanism. Preferably, a mount for part of the rotate mechanism is resiliently moveable.

Preferably, the first pulley wheel is arranged to grip a rope, chain or the like reaved around the pulley less well than the second pulley wheel. Preferably, the first pulley wheel is arranged to prevent a rope, chain or the like reaved around the pulley from slipping relative to the pulley wheel when both tails of the rope, chain or the like coming from the pulley wheel are under tension, the pulley wheel being arranged to allow the rope, chain or the like to slip relative to the pulley wheel when one or both tails of the rope are not under tension. The first pulley wheel may be arranged so that in use, the friction between the pulley wheel and the rope or the like is such that the ratio of tension between two ends of a rope reaved around the pulley wheel is greater than half the gearing ratio of the differential system. In this way, the pulley wheel will grip the rope when under load, but the pulley wheel will be able to slip with respect to the rope when outgoing tension is released allowing quick release of the pulley. The pulley wheel may be drum shaped so that in use, a rope may be passed all the way around it at least once or even around it several times.

Preferably, the second pulley wheel is arranged to prevent a rope, chain or the like from slipping around the pulley wheel. In this way, the rope should not slip relative to the pulley wheel regardless of whether or not the rope tails coming from the pulley wheel are under tension.

At least one pulley wheel may be grooved around its circumference and may have a substantially V-shaped groove. Preferably, the pulley wheel has at least one intrusion into the groove and may have a plurality of intrusions. Where the pulley wheel is arranged for use with rope, the intrusions may be offset on opposite sides of the groove to create a serpentine path for the rope. The intrusion or intrusions may be achieved by providing holes or rebates in the walls defining the groove. The inner surface of the groove of the pulley wheel may consist of a series of facets, for example between four and eleven facets. Preferably there are eight facets. With a suitable number of facets on the first pulley wheel, this enables the required friction force between the pulley wheel and rope under tension while allowing free movement when tension on the rope is released.

A resisting means may be provided to resist rotation of at least one pulley wheel, preferably the second pulley wheel. The means may be a brake. Urging means may be provided to urge the pulley wheel and the resisting means together. The urging means may take any suitable form and may comprise means to urge the pulley wheel against the resisting means. The urging means may include an elastomeric member. The elastomeric member may comprise a bush mounted axially of the pulley wheel. The bush may axially mount both pulley wheels, preferably through a common bearing.

Preferably, the first pulley wheel and the second pulley wheel have a common axis of rotation. Preferably, the first pulley wheel and the second pulley wheel each rotate about an axle which more preferably is a common axle. In this way, the pulley is simple to construct.

The pulley wheels may have the same radius, but in a preferred embodiment, one pulley wheel has a larger effective radius of the rope around the pulley wheel than the other pulley wheel, which may provide differential gearing.

The pulley suitably has a frame. Preferably, the frame defines an opening aligned with the second pulley wheel which, in use, enables a rope, chain or the like to be fed around substantially the whole circumference of the second pulley wheel. Both ends of the rope, chain or the like may pass through the opening. In this way, the friction between the second pulley wheel and rope is increased so as to reduce the likelihood of the rope or pulley wheel slipping.

The frame may carry means suitable for jamming the rope, chain or the like. Preferably, the means suitable for jamming the rope is a cam cleat. In this way, means for jamming the rope is conveniently located on the pulley and is a known, readily available device.

Preferably, an anchor point is provided on the pulley, more preferably on the frame. In this way, the pulley may be attached and removed from a fixed anchorage. The pulley may comprise means to allow the pulley to be bolted directly to a fixed object, such as the deck or a spar of a sailing boat. A shackle may be provided for attaching to the anchor point. Where the pulley includes a frame, the frame may define at least one flat side cheek, and means may be provided to mount the pulley with the flat side cheek flat against a flat fixed object such as the deck of a boat. The frame may be provided with holes for allowing the pulley to be fixed to an object with screws or the like.

According to another aspect of the invention there is provided a system comprising a pulley according to the preceding aspect of the invention, and a rope, chain or the like wound around the pulley wheels, the rope, chain or the like being wound on the pulley wheels in opposite directions.

The system preferably includes rope. Preferably, the first pulley wheel and rope have friction coefficients such that the ratio of tension between two ends of a rope reaved around the pulley wheel is greater than half the gearing ratio of the differential system. In this way, the pulley wheel will grip the rope when under load, but the pulley wheel will be able to slip with respect to the rope when outgoing tension is released allowing quick release of the pulley.

According to a further aspect of the invention there is provided an expanded system comprising a system according to the preceding aspect of the invention and a block, the rope, chain or the like being wound around the pulley wheels and block.

According to another aspect of the invention there is provided a pulley comprising a first pulley wheel and a second pulley wheel, wherein the first pulley wheel and the second pulley wheel communicate with each other, such that, a force acting to rotate the first pulley wheel in a first direction imparts a corresponding force to rotate the second pulley wheel in a second, opposite direction.

According to a further aspect of the invention there is provided a pulley comprising a first pulley wheel and a second pulley wheel, wherein the first pulley wheel and the second pulley wheel communicate with each other, such that, a force acting to rotate the first pulley wheel in a first direction imparts a corresponding force to rotate the second pulley wheel in a second opposite direction, and wherein, when the corresponding force is greater than any opposing forces on the second pulley wheel, the force acting to rotate the first pulley wheel causes the first pulley wheel to rotate, and the corresponding force acting to rotate the second pulley wheel causes the second pulley wheel to counter-rotate.

In this way, the first pulley wheel and second pulley wheel can be caused to rotate in opposite directions, in the absence of sufficient opposing forces. In use, a rope or chain or the like can be run in the same direction over both pulley wheels to form a hanging loop, into which a moveable block may be placed, and, in this way, a differential type pulley can be achieved without the requirement that the rope is run in opposite directions around each pulley wheel.

Preferably, when the second pulley wheel is prevented from rotating, the force acting to rotate the first pulley wheel causes the first pulley wheel to rotate but not the second pulley wheel. In this way, the pulley acts as a standard single block; the first pulley wheel rotates and the second pulley wheel remains stationary. In use, a system including the pulley, a rope or chain or the like fed around the pulley and a movable pulley block can create a low gear ratio, for example of 2:1. The lower power gear ratio is suitable for quick trimming.

Preferably, when a force is acting to rotate the second pulley wheel in the same direction as the first pulley wheel is prevented from rotating, the force acting to rotate the first pulley wheel causes the first pulley wheel to rotate, and the net force acting to rotate the second pulley wheel causes the second pulley wheel to rotate in the same direction as the first pulley wheel. In this way, both pulley wheels rotate in the same direction. In use, a system including the pulley, a rope or chain or the like fed around the pulley and a pulley block can create a still lower power gear ratio, for example of 1:1, in addition to the gear ratio of 2:1, for even quicker trimming.

Preferably, the first pulley wheel and the second pulley wheel communicate via a gear means, such that a gearing ratio exists between the first pulley wheel and the second pulley wheel. In this way, when the first and second pulley wheels rotate in opposite directions, a differential relationship may be achieved. Preferably, the gearing ratio between the first pulley wheel and the second pulley wheel is between 1:1 and 1:3, preferably between 1:1 and 1:2. In a preferred embodiment the gear ratio is 44:49. In this way, a high differential gear ratio of 19.6:1 may be achieved.

Preferably, the first pulley wheel is provided with a first rack or first gear wheel and the second pulley wheel is provided with a second rack or second gear wheel. Preferably, the racks are substantially concentric, and preferably are concentric with the rotational axis of the first and/or second pulley wheels. Preferably, the racks are bevelled. In this way, a pinion may easily engage between the racks to communicate therebetween. The term "rack" means a rack in the sense of a rack-and-pinion but the rack does not necessarily have gear teeth, but provides a surface for engagement with a pinion or the like.

Preferably, there is provided a plurality of pinions (e.g. three pinions) to engage between the first and second racks. Preferably, the pinions are bevelled and are shaped to complement the first and second racks. Preferably, the pinions are located at substantially the same distance from the axis of rotation. Preferably, the pinions are held in a carrier. Preferably, the pinions extend substantially radially from the carrier. Preferably, the carrier is concentric with the racks. The carrier may be rotatable. In particular, the carrier may normally be arranged to rotate with respect to the racks in at least one direction. Preferably, the carrier is allowed to rotate in both directions, and may be arranged to allow rotation in only one direction in one state and in both directions in another state. In this way, the first and second pulley wheels may rotate in both directions and in use, for example when the pulley is used on a boat for the kicking strap, the kicking strap can be quick released.

Typically, the carrier, the first pulley wheel and the second pulley wheel each rotate about an axle.

Typically, the first and second pulley wheels each include means for engaging the pinions, such as a continuous track. The continuous track may be toroidal. The means for engaging the pinions may be concentric with each other. The continuous track of the first pulley wheel may have a larger radius than the continuous track of the second pulley wheel. The continuous track of the first pulley wheel may be on the surface of a notional sphere. The continuous track of the second pulley wheel may be on the surface of a concentric notional sphere of a different apical angle.

In one embodiment, the first and second racks have gear teeth. Preferably, the first rack has a different number of teeth from the second rack. Preferably, the racks have similar radii. Preferably, the first and second racks have between 30 and 50 gear teeth. The first rack may have 49 gear teeth, and the second rack may have 44 gear teeth. In this way, a differential gear ratio of 44:49 exists between the pulley wheels and in use a system gear ratio of 19.6:1 is achieved.

In this embodiment, the pinions have gear teeth. Each pinion preferably has the same number of gear teeth. Preferably, the number of pinions provided is calculated from the following formula: the total number of gear teeth divided by the number of pinions should equal an integer. For a gear ratio of 44:49, the number of pinions is preferably 3, because 93 is divisible by 3. In this way the teeth of the rack and pinion will mesh together properly. Preferably still, the number of gear teeth on each rack divided by the number of gear teeth on a pinion should equal a non-integer number. In this way, more even wear on the gear teeth is achieved.

In another embodiment, the racks and pinions engage using frictional gearing. Preferably, the racks are frictional gear tracks. Preferably, the gear track of the first pulley wheel has a larger radius than the gear track of the second pulley wheel. Preferably, the pinions are frustoconical rollers, which may be made of elastomeric material. In this way, the pulley may be cheaper to manufacture. Preferably, the pinions are angled to engage the gear track on the first pulley wheel and the second pulley wheel. Preferably, means is provided to allow the first and second pulley wheels to slip relative to each other under low load conditions. In this way, in use a rope can be run out.

Preferably, each pulley wheel includes means to prevent a rope, chain or the like from slipping around the pulley wheel. Each pulley wheel may be grooved around its circumference. The groove may be V-shaped, and there may be at least one intrusion into the groove. Preferably, each pulley wheel has a plurality of intrusions. Where the pulley wheels are arranged for use with rope, the intrusions may be offset on opposite sides of the groove to create a serpentine path for the rope. The intrusion or intrusions may be achieved by providing holes or rebates or facets in the walls defining the groove.

The pulley wheels may have any suitable radii and preferably have substantially the same radii. In this way, the pulley may be more uniform in size and shape and its weight and rope lead angles may be more balanced.

Preferably, the pulley is held in a frame. Preferably the frame is provided with an anchor point. The frame may be provided with means for feeding rope to the pulley wheels, where, preferably, the means for feeding the rope comprises at least one wheel, and may comprise two opposed wheels for each pulley wheel.

Preferably one of the carrier and the frame of the pulley includes a ratchet and the other of the carrier and the frame of the pulley includes a pawl. Preferably, the carrier includes/carries the ratchet, and the frame includes/carries the pawl. Preferably, there is provided a quick-release for the ratchet system. In this way, in use a rope can be run out.

Above are set out preferred and/or optional features. These can be combined, singly or in any combination, with any of the aspects of the invention, unless the context demands otherwise.

BRIEF DESCRIPTION OF THE DRAWINGS

Embodiments of the invention will now be described by way of example and with reference to the accompanying drawings, in which:

FIG. 41*b* is an end elevation in cross-section taken through the points A-A of the pulley of FIG. 41*a;*

DESCRIPTION OF THE PREFERRED EMBODIMENTS

Figure 1:
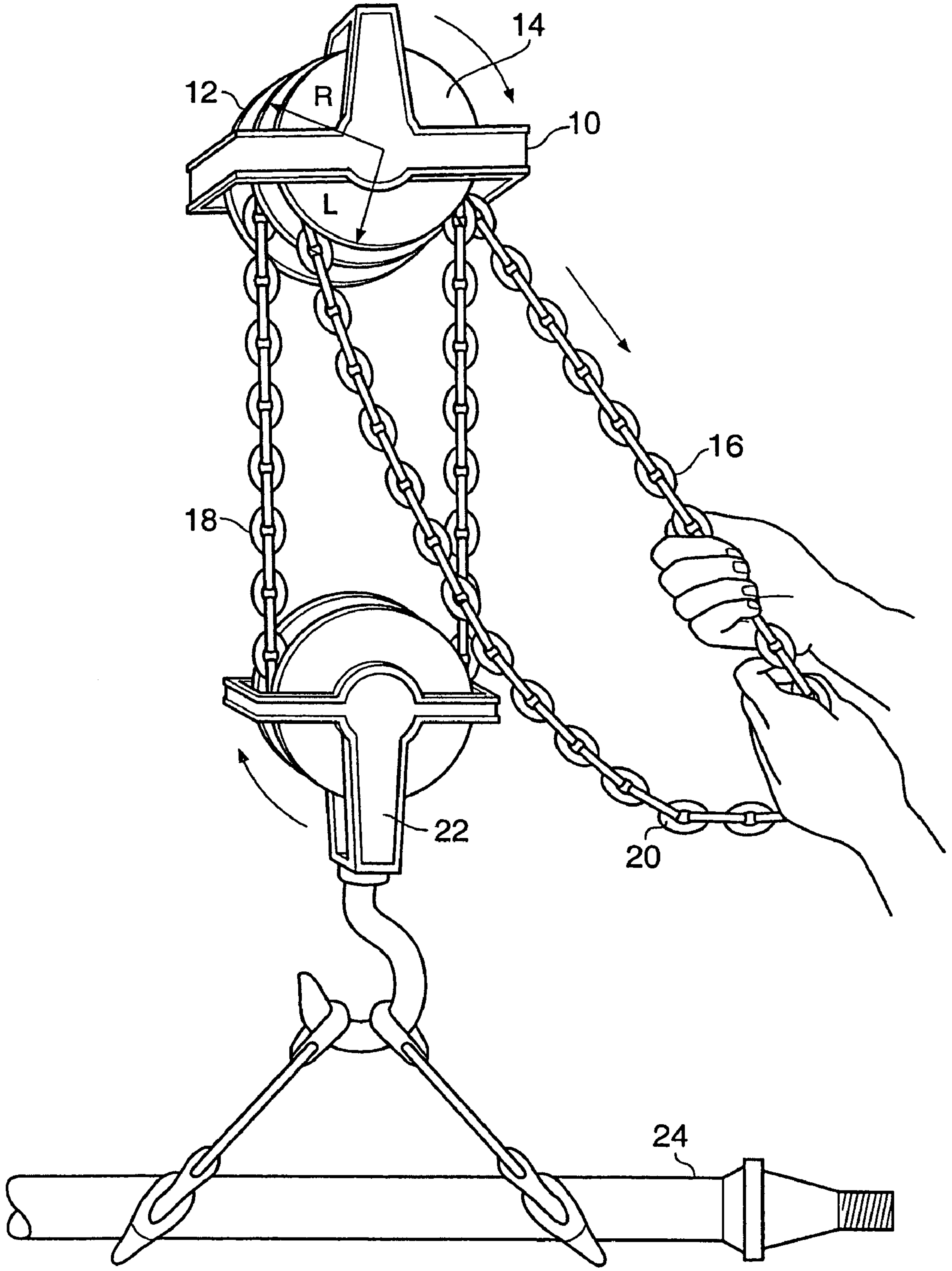
FIG. 1 is a perspective view of a differential pulley of the prior art.
Figure 2:
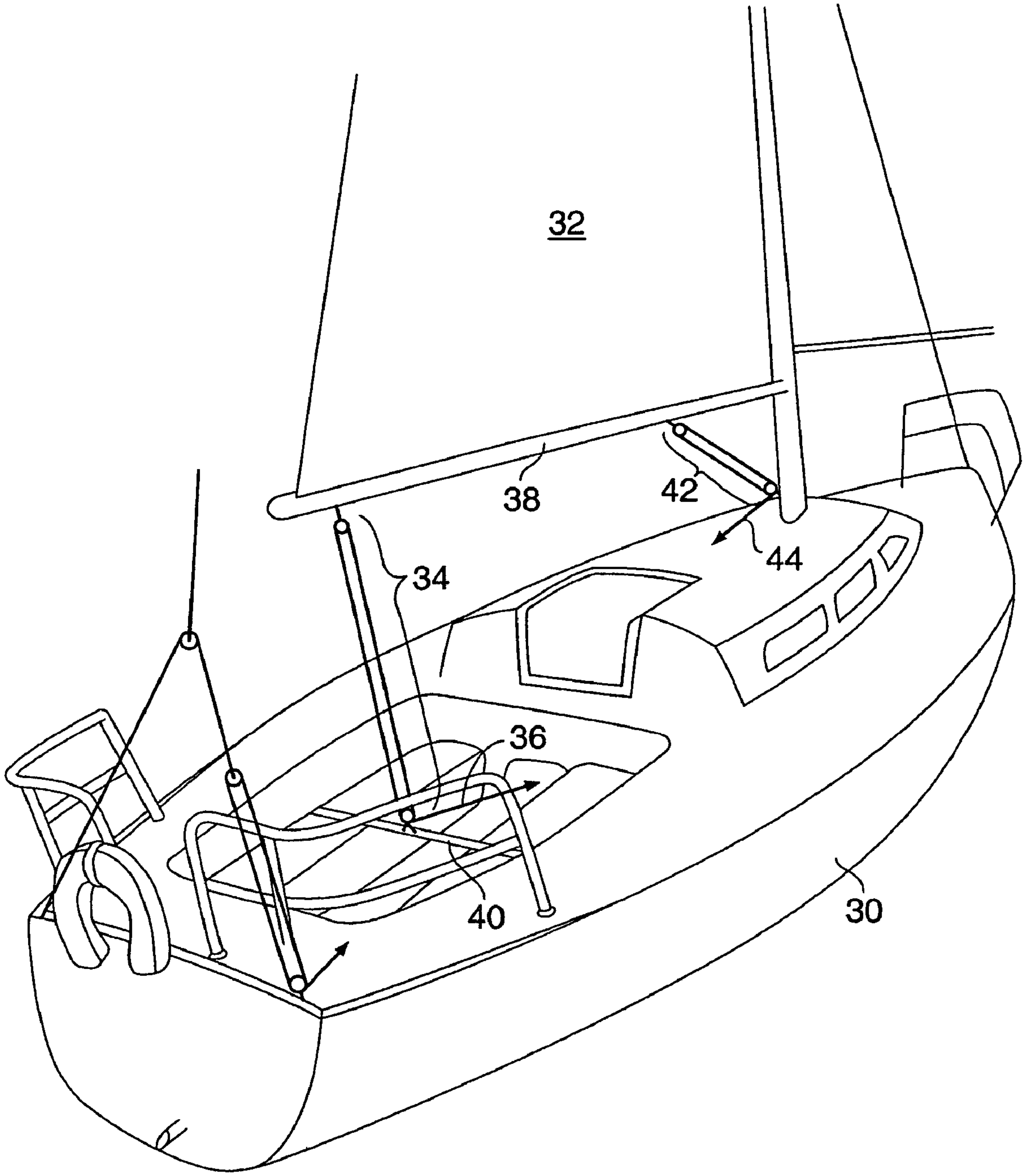
FIG. 2 is a perspective view of a sailing boat of the prior art showing a mainsheet and vang in use.
Figure 3:
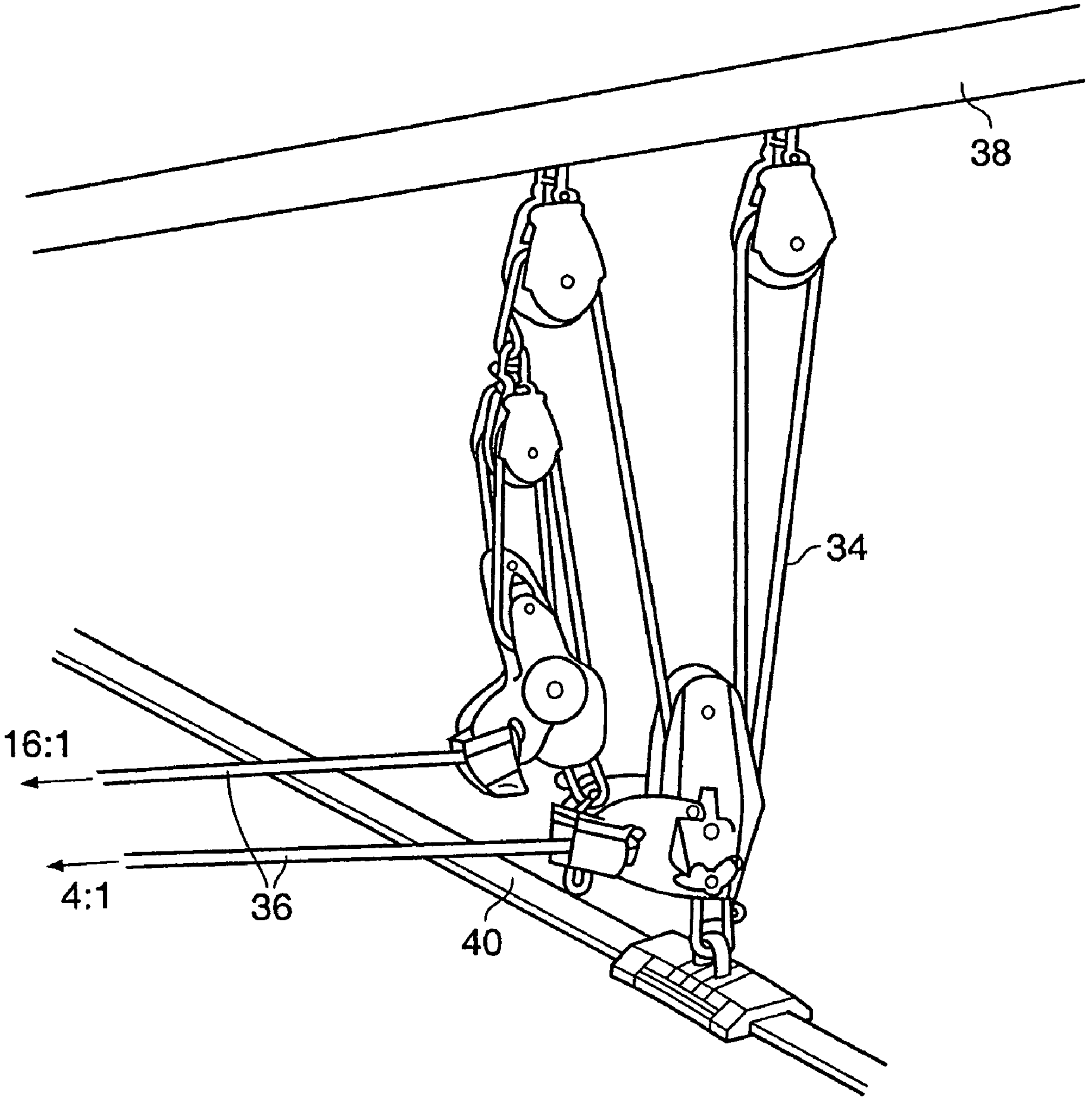
FIG. 3 is a perspective view of a 2× purchase mainsheet system of the prior art.
Figure 4:
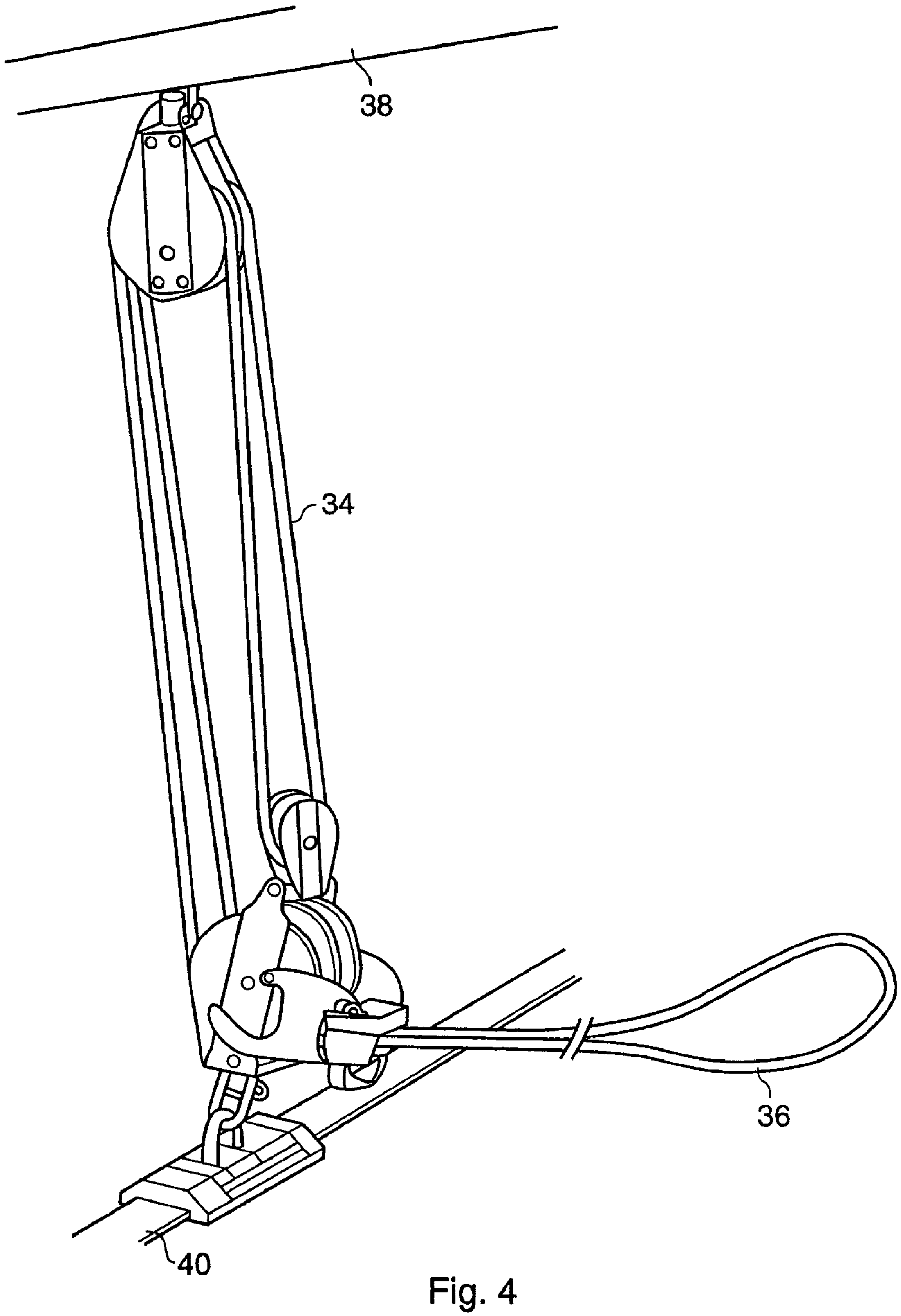
FIG. 4 is a perspective view of a two-speed mainsheet system of the prior art.

Referring to FIGS. 5 to 15, a pulley 110 of the first embodiment of the invention comprises a first pulley wheel 112, a second pulley wheel 114 and a frame 116. The first and second pulley wheels 112, 114 are held within the frame on respective axles **118*a*, 119*a* so that the pulley wheels 112, 114** are concentric and adjacent.

The rope 148 in the pulley system may be a standard sailing rope such as made by Marlow Ropes, for example a three strand core rope with a braid cover. The rope is in a continuous loop.

The frame 116 comprises two side plates 118, 119 joined together by three tie bars 120, 121, 122. Tie bar 122 is located at a first end of the pulley 110 and is broader than tie bars 120, 121 which are located at a second opposite end of the pulley 110. Tie bar 122 has a cylindrical anchor point 124 fixed to it, which may be attached to a fixed object such as the deck of a sailing boat by a shackle (not shown). Tie bar 120 is located toward the front end of the pulley 110 and defines an aperture suitable for feeding a rope onto the second pulley wheel 114. Tie bar 121 is located toward the rear end of the pulley 110 and defines an aperture suitable for feeding a rope onto the first pulley wheel 112.

Side plate 118 has an axle **118*a* which extends into the frame 116. The first pulley wheel 112 is mounted via a cylindrical bearing 123 on the axle 118*a*. Side plate 119 has an axle 119*a* which extends into the frame 116, and the second pulley wheel 114 is mounted via a cylindrical bearing 123 on the axle 119*a*. Two mounting arms 126, 127 attach to and lie against the outside surface of each respective side plate 118, 119, extending outward to join a short distance from the frame 116. A cam cleat 128 is attached to the mounting arms 126, 127 at the point at which they join, such that a rope may be fed through the cam cleat 128 onto the first pulley wheel 112**.

The first pulley wheel 112 is drum shaped allowing in use a rope to be passed around it several times and may have a rope radius of 38 mm.

The second pulley wheel 114 has a substantially V-shaped groove running around its circumference. Moreover, to increase the grip of the wheel 114 on a rope, the side walls of the groove have holes drilled in them, the holes in one wall being offset from the holes in the other wall. The holes increase grip on a rope and because they are offset they cause a rope to snake as it feeds around the groove of the pulley wheel 114, again increasing friction and grip. It is important that, in use, a rope does not slip relative to the second pulley wheel 114. The second pulley wheel 114 may have a rope radius of 30 mm.

Referring in particular to FIGS. 8 to 15, the first pulley wheel 112 defines an internal cylindrical ratchet 132 which is located within the pulley wheel 112 on the side adjacent the second pulley wheel 114.

The second pulley wheel 114 has a cylindrical protrusion 136 with two pawls 138 fitted thereto by torsion springs (not shown). The protrusion 136 protrudes from the second pulley wheel 114 at a side adjacent the first pulley wheel 112 and is shaped to fit into the internal ratchet 132 of the first pulley wheel 112. The pawls 138 are arranged to engage with the ratchet 132. The ratchet mechanism is designed so that the pulley wheels 112, 114 are prevented from rotating relative to each other in one direction, but are able to rotate relative to one another in the other direction.

Figure 5:
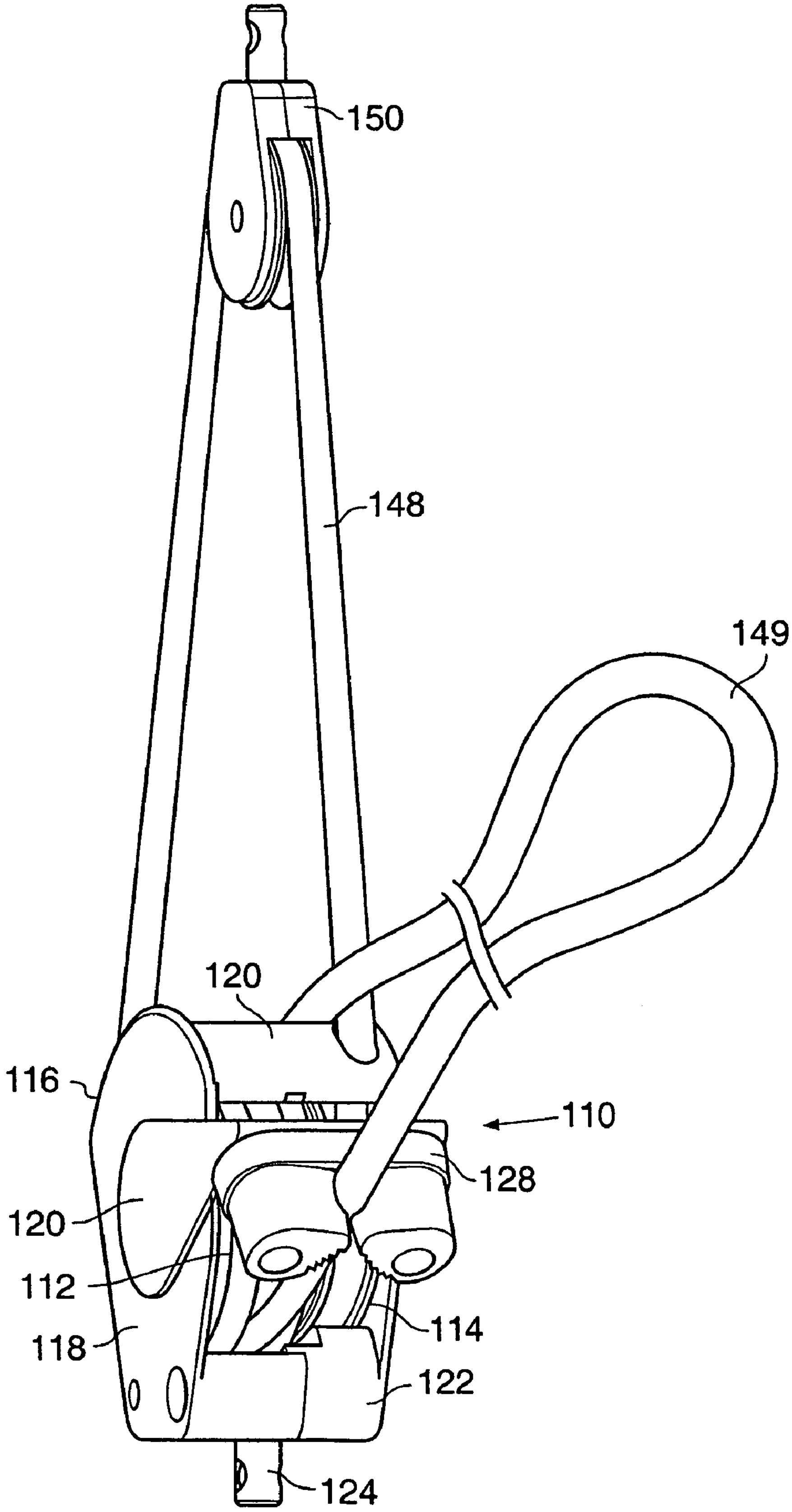
FIG. 5 is a perspective view of the pulley of the first embodiment of the invention in a system showing a rope and pulley block.
Figure 6A:
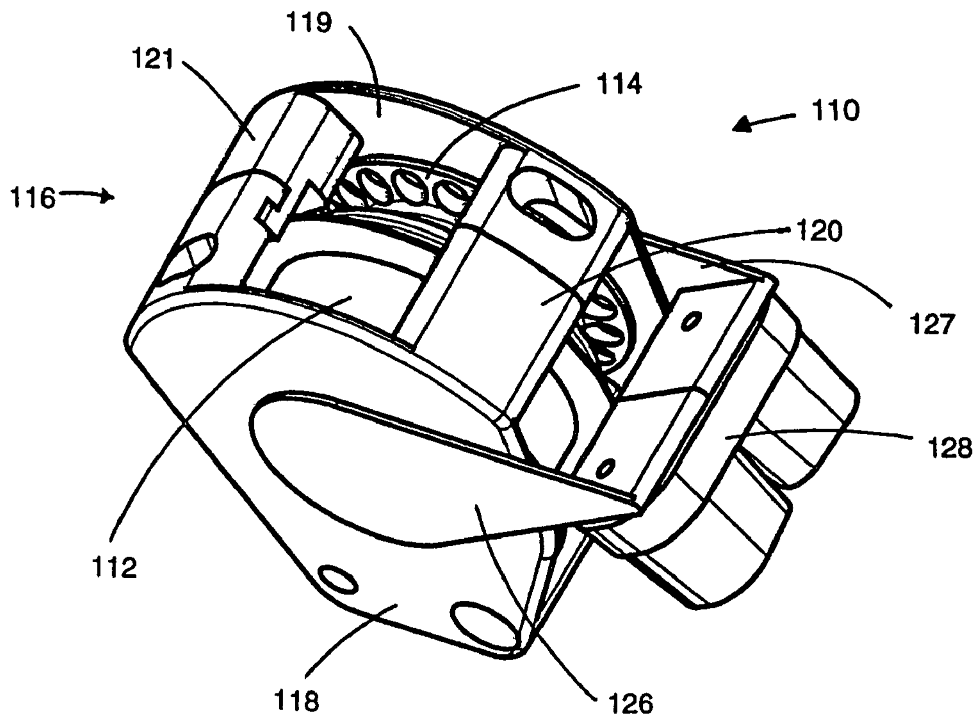
FIGS. 6*a* and 6*b* are perspective views of the pulley of FIG. 5.
Figure 6B:
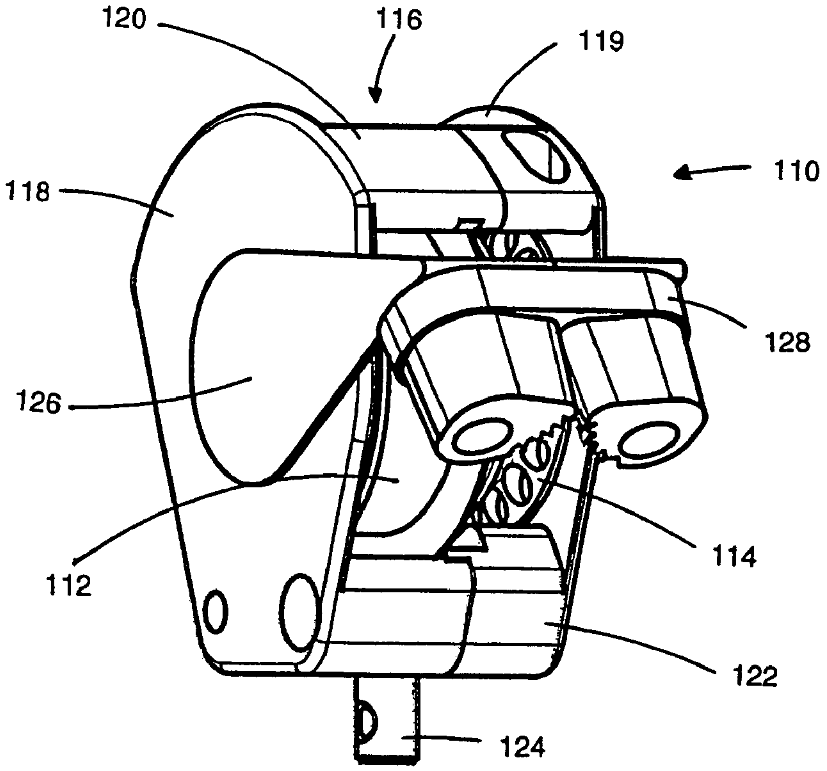
Figure 8:
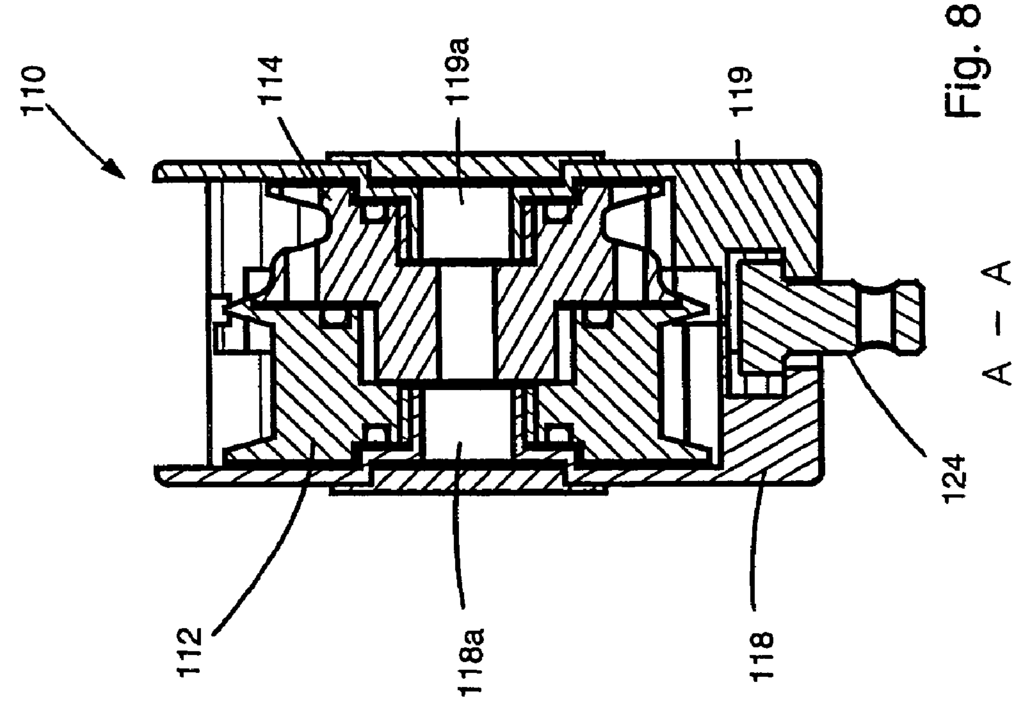
FIG. 8 is a front end elevation of the pulley of FIG. 5 in cross-section taken through the points A-A shown in FIG. 7.
Figure 7:
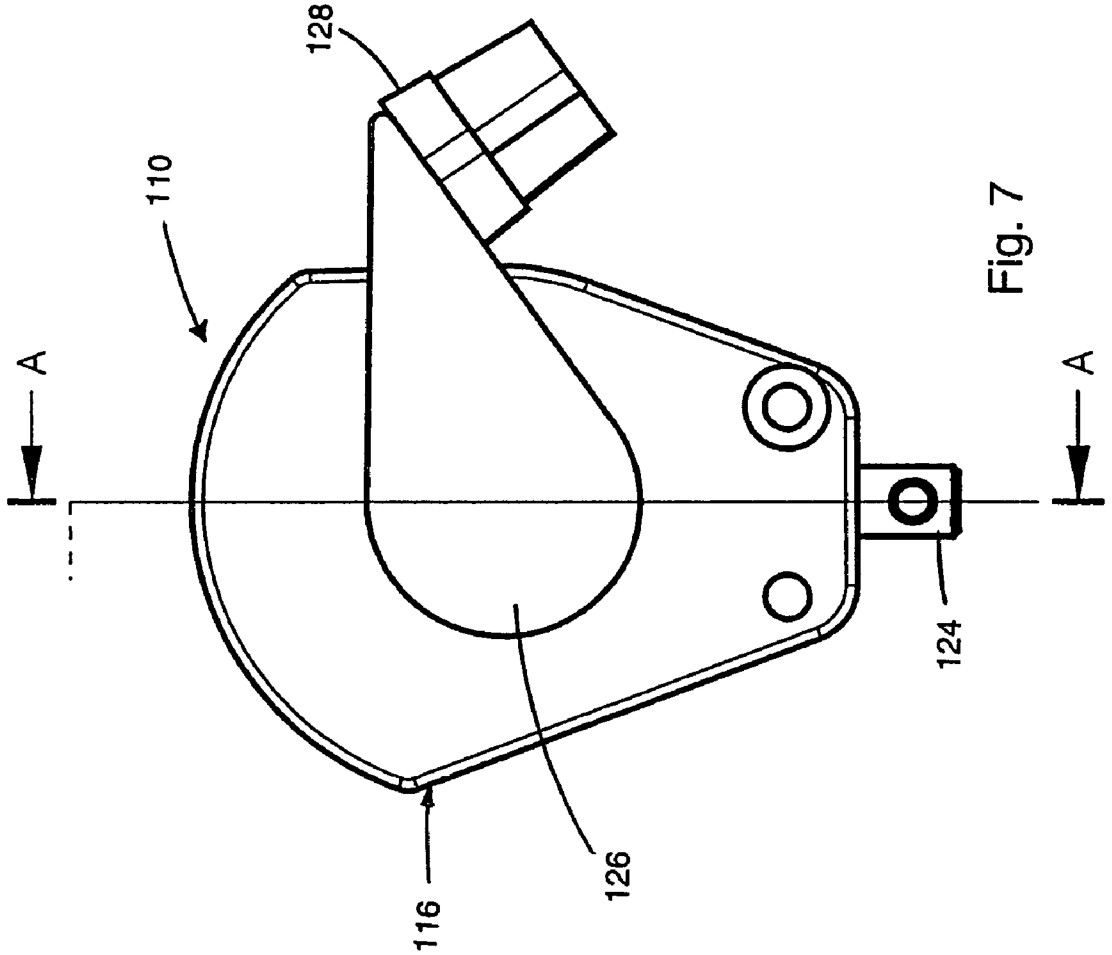
FIG. 7 is a side elevation of the pulley of FIG. 5.
Figure 11:
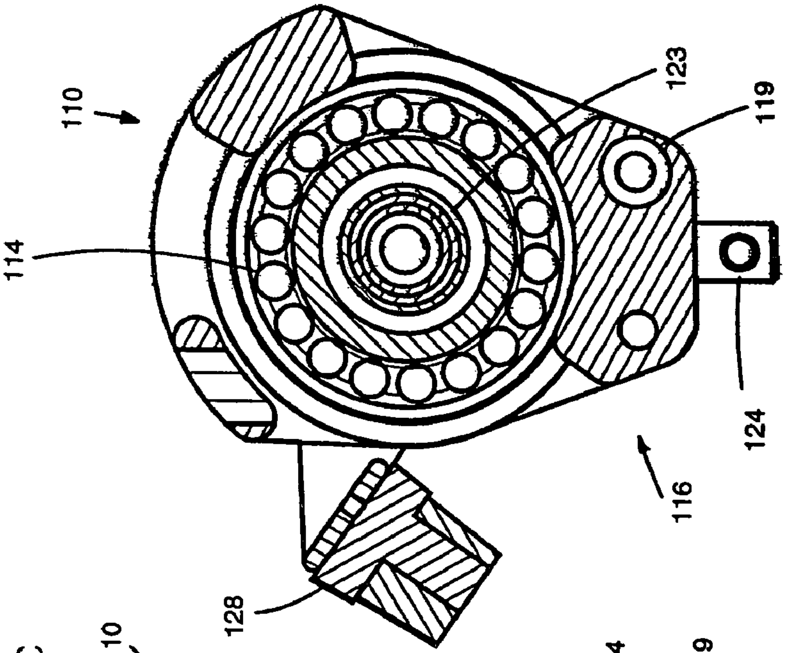
FIG. 11 is a side elevation in cross-section taken through the points C-C shown in FIG. 9.
Figure 9:
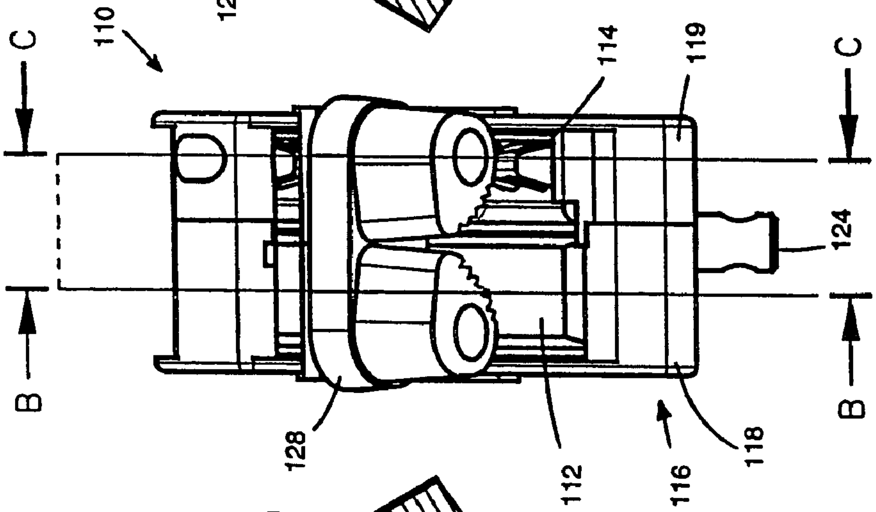
FIG. 9 is an front end elevation of the pulley of FIG. 5.
Figure 10:
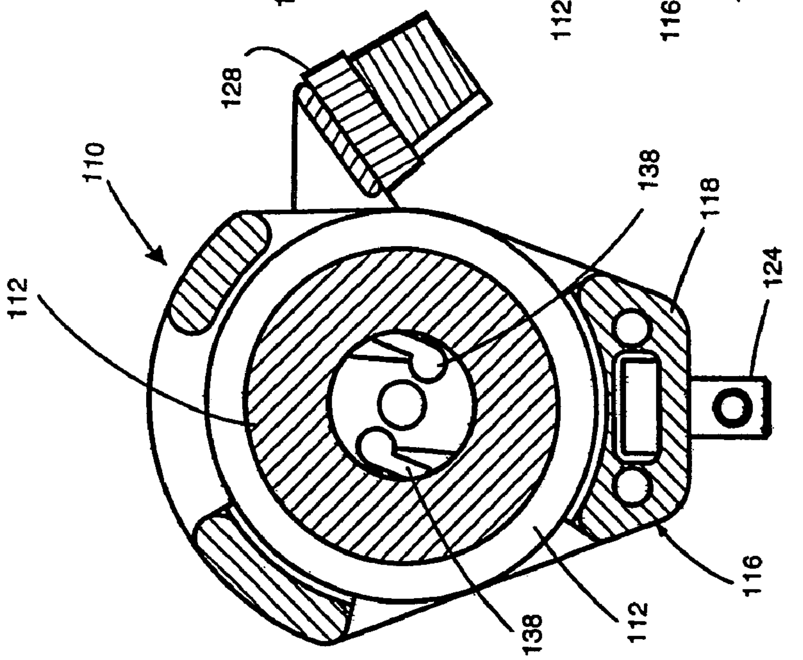
FIG. 10 is a side elevation in cross-section taken through the points B-B shown in FIG. 9.
Figure 13:
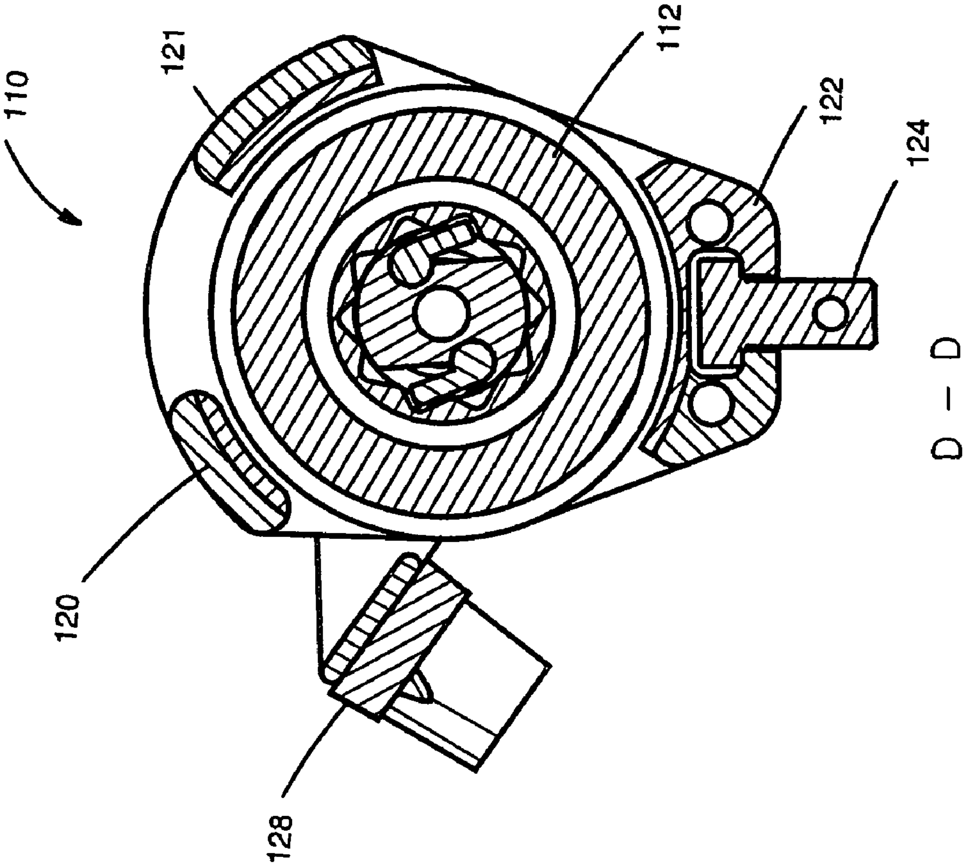
FIG. 13 is a side elevation in cross-section taken through the points D-D shown in FIG. 12.
Figure 12:
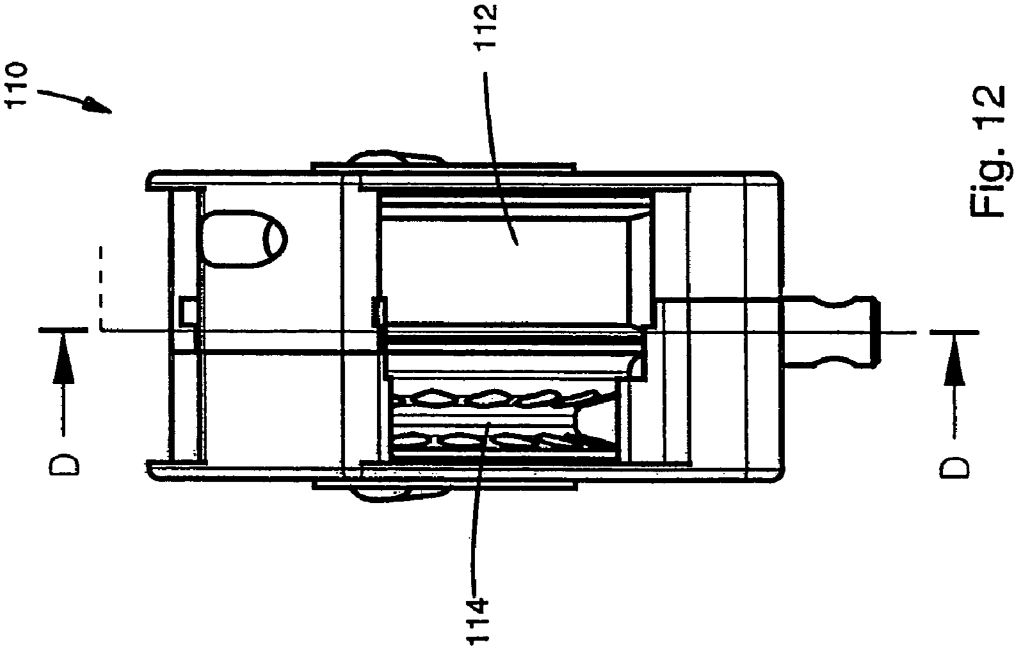
FIG. 12 is an rear end elevation of the pulley of FIG. 5.
Figure 14:
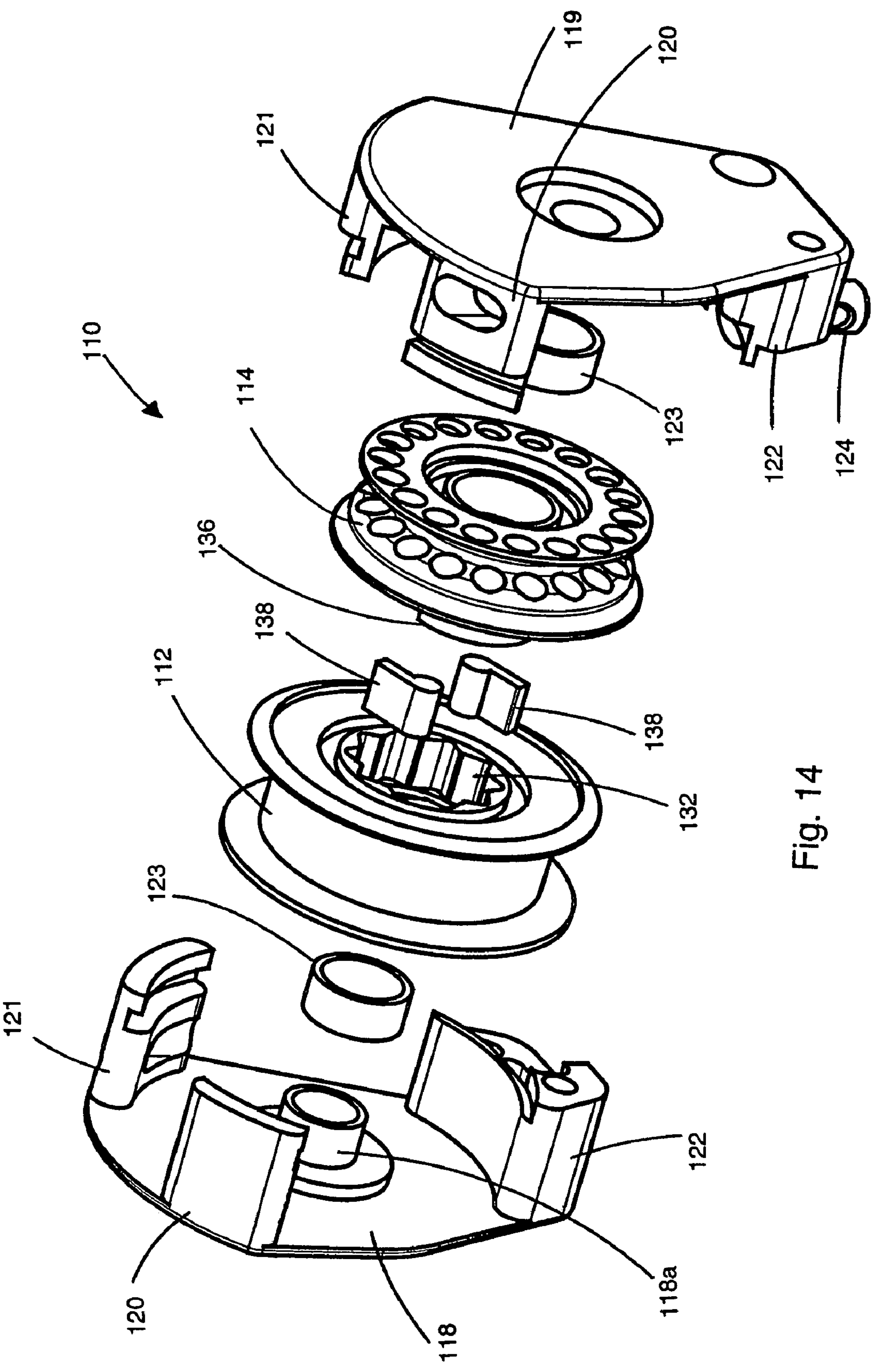
FIG. 14 is a first exploded perspective view of the pulley of FIG. 5.
Figure 15:
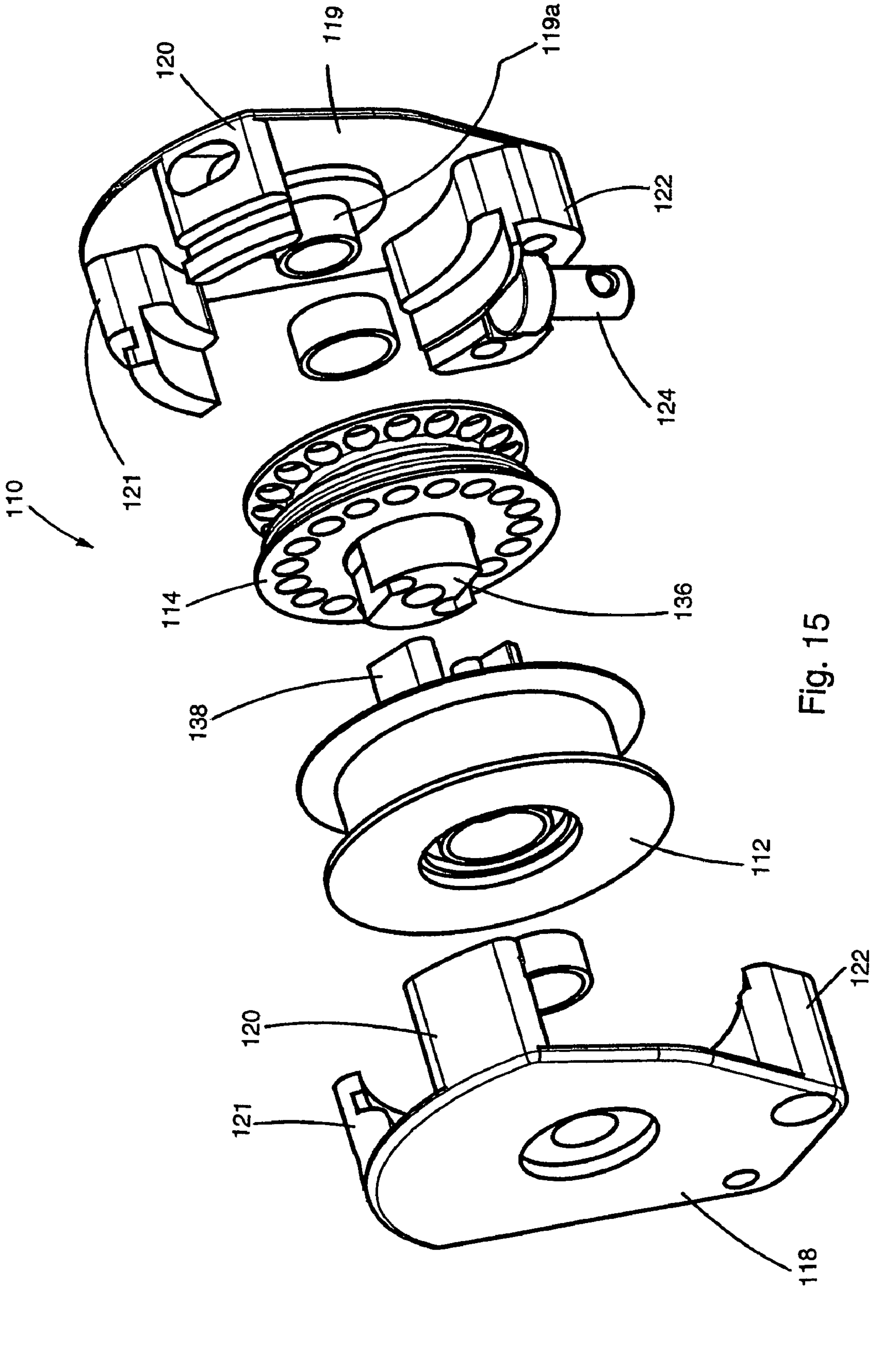
FIG. 15 is a second exploded perspective view of the pulley of FIG. 5.

In use, as shown in FIG. 5, a continuous rope 148 runs through the cam cleat 128, around the first pulley wheel 112 about 1¼ times, then to a standard block 150 which is attached to a load (not shown), and back around the second pulley wheel 114. The rope 148 is reaved in opposite directions around the first and second pulleys 112, 114 and forms a free loop 149.

A first gear ratio of 1:1 is obtained by pulling simultaneously both free ends of the loop 149. In this way, the pulley wheels 112, 114 turn in opposite directions. Friction between the rope 148 and first pulley wheel 112 prevents the rope from slipping. The ratchet mechanism allows the pulleys 112, 114 to turn in opposite directions.

A second gear ratio of 2:1 is obtained by securing the length of the loop 149 from the first pulley wheel 112 in the cam cleat 128 and pulling on the other length from the second pulley wheel 114. In this way, the first pulley wheel 112 is prevented from moving while the second pulley wheel 114 turns as the rope is pulled. Again, friction between the rope 148 and first pulley wheel 112 prevents the rope from slipping. The ratchet mechanism allows the second pulley wheel 114 to turn relative to the first pulley wheel 116 in this direction. Alternatively, the length of the loop 149 from the second pulley wheel may be fixed and the same 2:1 ratio can be achieved by pulling on the rope from the first pulley wheel.

A third, high power, gear ratio of 9.5:1 is obtained by pulling on the free length of the loop 149 from the first pulley wheel 112 and allowing the other length of the loop 149 to run out freely. The first pulley wheel 112 turns as the free end of the loop 149 is pulled. The second pulley wheel 114 is impelled to turn in the same direction as the first pulley wheel 112 by the rope 148. In this way, the pulley wheels 112, 114 rotate in the same direction due to the forces acting on them from the free length of the rope and the load. The second pulley wheel 114 is prevented from rotating relative to the first pulley wheel 112 in this direction by the ratchet mechanism, and so the second pulley wheel 114 cannot overtake the first, despite the force from the load, as transmitted by the rope 148, compelling it to do so. However, the force from the load, as transmitted by the rope 148, generates a torque on the first pulley wheel 112 through the ratchet mechanism. The torque urges the first pulley wheel 112 to rotate faster in the same direction, and it is important that the pulley wheel 112 does not slip relative to the rope 148 in normal use. To prevent slippage, sufficient friction must be generated between the first pulley wheel 112 and the rope 148. In this embodiment a drum-shaped pulley wheel 112 is used with the rope being reaved around it about 1¼ times. The friction between the first pulley wheel 112 and the rope 148 reaved around it should ideally be such that the ratio of tension between the two ends of the rope 148 is greater than half the high gear ratio. In this way both pulley wheels 112, 114 turn together in the same direction and the difference in radii of the pulley wheels 112, 114 creates a differential. A high power gear ratio is achieved in a similar way to the known differential pulley.

If the free ends of the rope 148 are released, the friction around the first pulley wheel 112 is reduced and the rope may slip. A quick release of the pulley 110 is achieved in this way.

Figure 54:
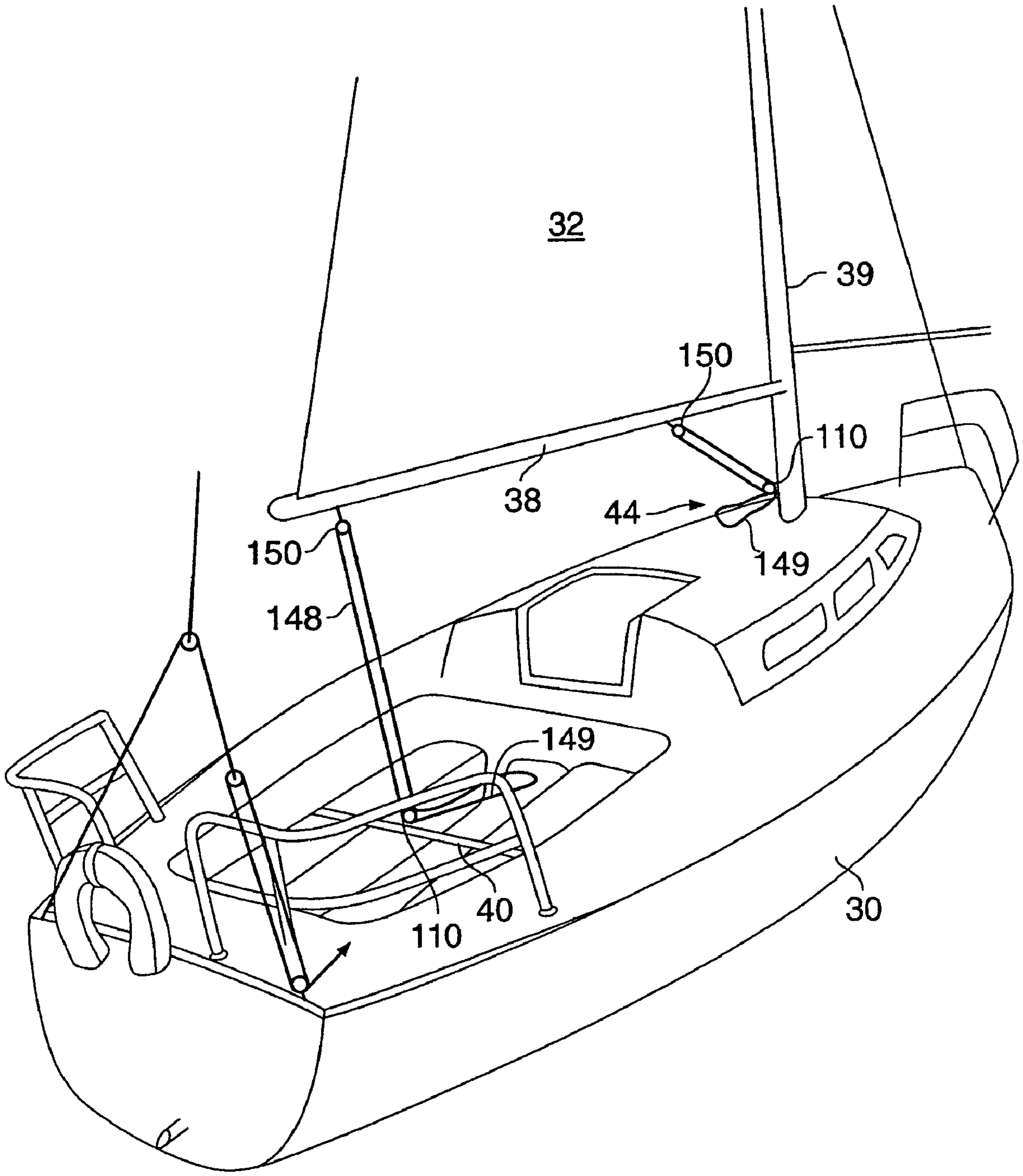
FIG. 54 is a perspective view of a sailing boat showing a pulley system of the present invention.

Referring to FIG. 54, the pulley 110 is shown in a system fitted to a boat 30. A system including the pulley 110 is fitted between a boom 38 and a spar 40. Another system including the pulley is fitted between the boom 38 and the foot of the mast 39 as a vang 44.

Referring to FIGS. 16 to 29, a pulley 210 of the second embodiment of the invention comprises a first pulley wheel 212, a second pulley wheel 214 and a frame 216. The first and second pulley wheels 212, 214 are held within the frame on respective axles 218*a*, 219*a* so that they are concentric and adjacent.

The frame 216 comprises two side plates 218, 219 joined together by two upper tie bars (not shown) and a central bar (not shown). The two upper tie bars are located at a first end of the pulley 210, with one located toward the front and the other located toward the rear of the pulley 210 passing through apertures 208 in the side plates 218, 219. An anchor point 224 is fixed to the frame 216 between the two upper tie bar apertures 208 being received in opposed undercut recesses 215 in the side plates 218, 219 of the frame 216 so as to project radially away from the pulley wheels 212, 214.

Figure 26:
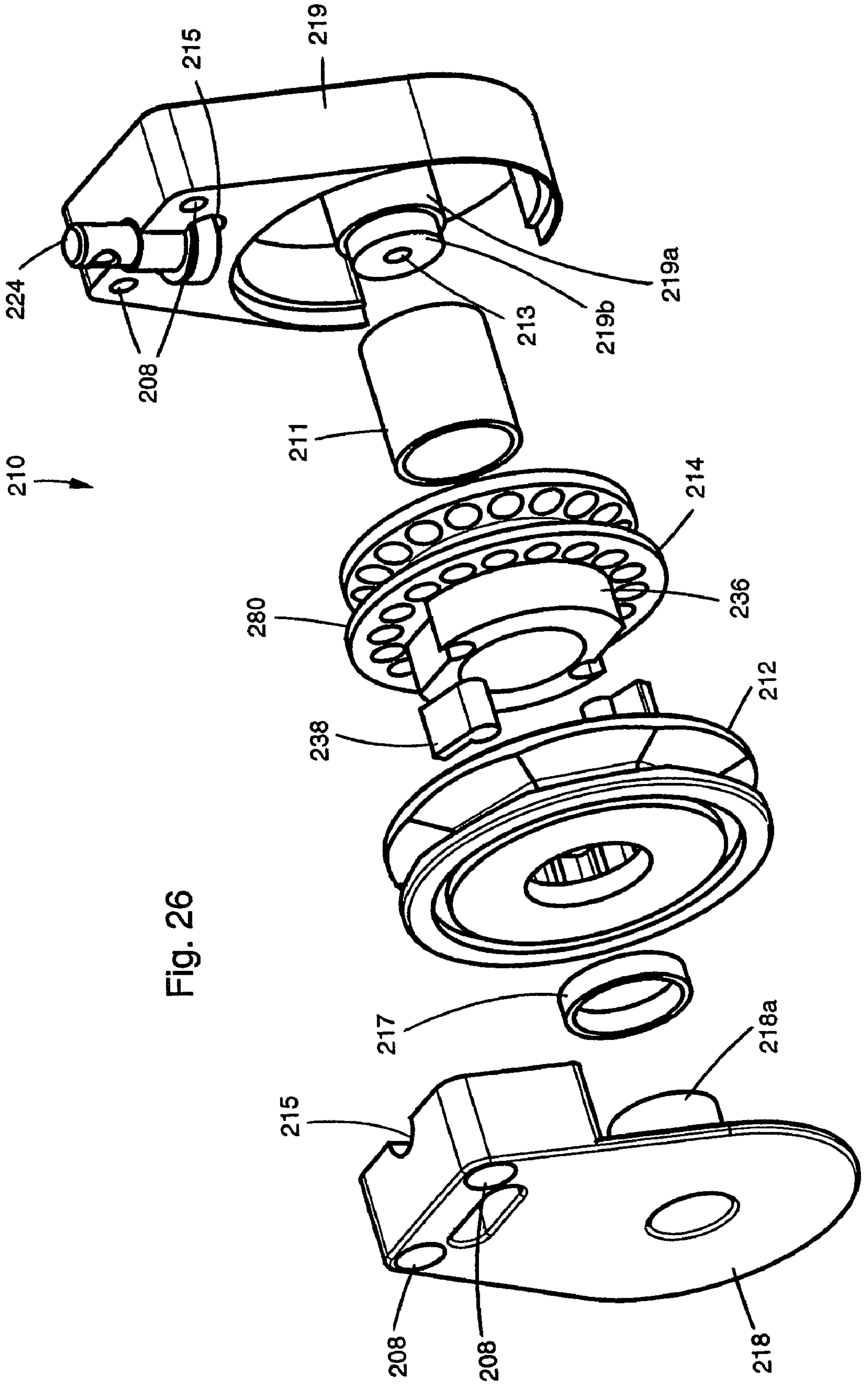
FIG. 26 is a first exploded perspective view of the pulley of FIG. 16.
Figure 27:
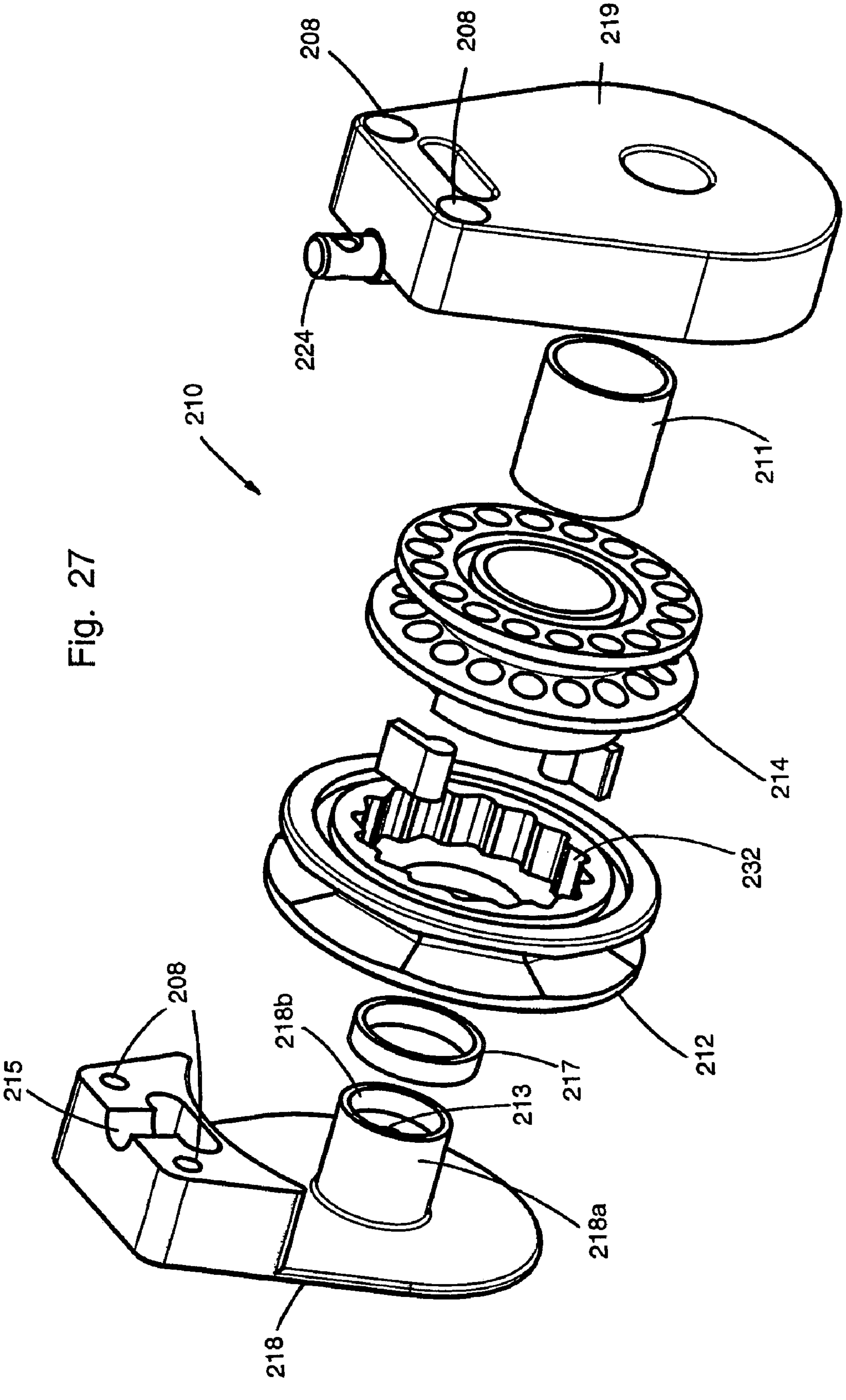
FIG. 27 is a second exploded perspective view of the pulley of FIG. 16.

Referring particularly to FIGS. 26 and 27, side plate 218 has an axle boss 218*a* which extends into the frame 216. The first pulley wheel 212 is mounted via a short cylindrical bearing 217 on the axle boss 218*a*. Side plate 219 has an axle boss 219*a* which extends into the frame 216, and the second pulley wheel 214 is mounted via a cylindrical bearing 211 on the axle boss 219*a*. Each axle boss 218*a*, 219*a* has a central aperture 213 to receive the central tie bar to connect the side plates 218, 219 together. Axle boss 218*a* defines an axial recess 218*b* at its inner end. Axle boss 219*a* has an inwards step to define a narrower diameter end portion 219*b* to be received in the recess 218*b* in the end of axle boss 218*a*.

Figure 22:
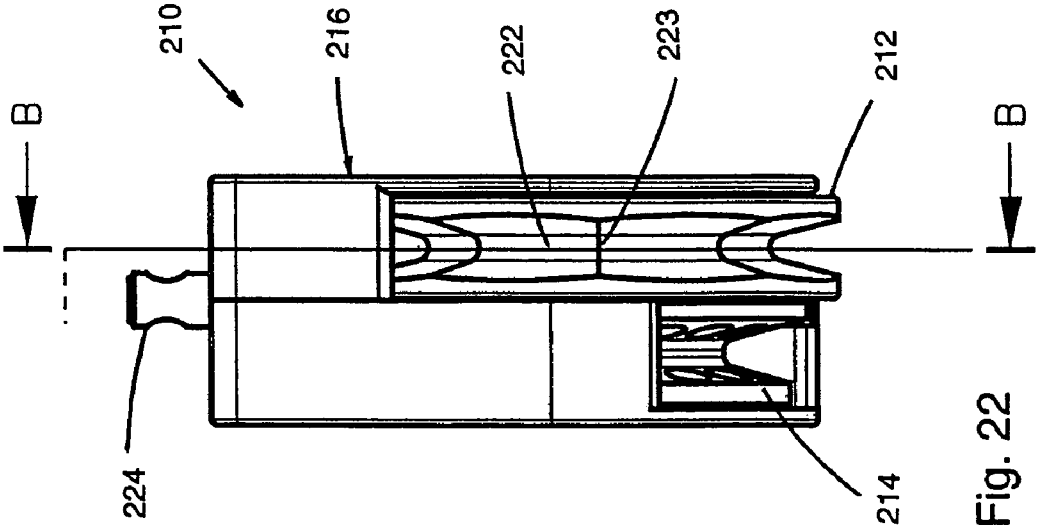
FIG. 22 is a front end elevation of the pulley of FIG. 16.
Figure 25:
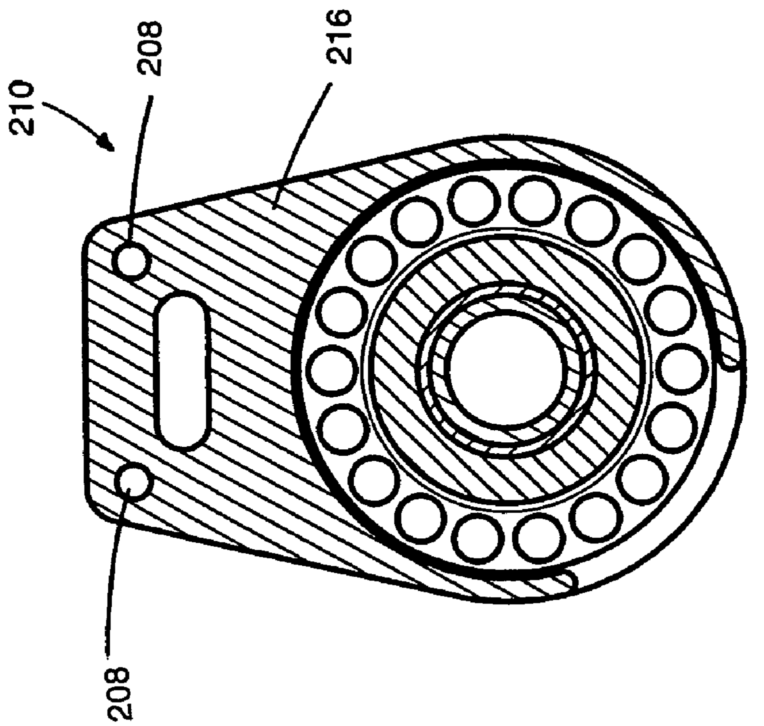
FIG. 25 is a side elevation in cross-section taken through the points C-C of the pulley of FIG. 24.
Figure 24:
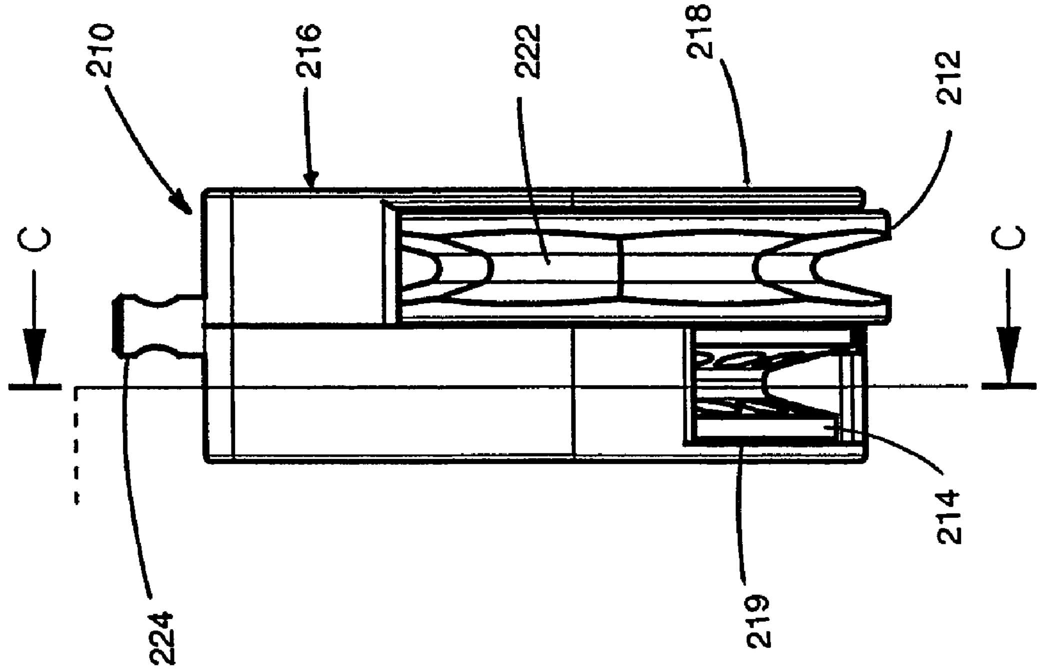
FIG. 24 is a front end elevation of the pulley of FIG. 16.

Referring particularly to FIG. 22, the first pulley wheel 212 has a substantially V-shaped groove running around its circumference. The innermost surface of the groove 222 is faceted and has a octagonal profile. The groove 222 is narrowest at the point where two of the eight facets 223 meet. The side walls of the groove 222 bow out between the points where the eight facets meet. The first pulley wheel 212 has a rope radius of 38 mm.

The second pulley wheel 214 also has a substantially V-shaped groove running around its circumference. However, to increase the grip of the wheel 214 on a rope, the side walls of the groove have holes drilled in them, the holes in one wall being offset from the holes in the other wall. The holes increase grip on a rope and because they are offset they cause a rope to snake as it feeds around the groove of the pulley wheel 214, again increasing friction and grip. It is important that, in use, a rope does not slip relative to the second pulley wheel 214. The second pulley wheel 214 has a rope radius of 30 mm.

Figure 23:
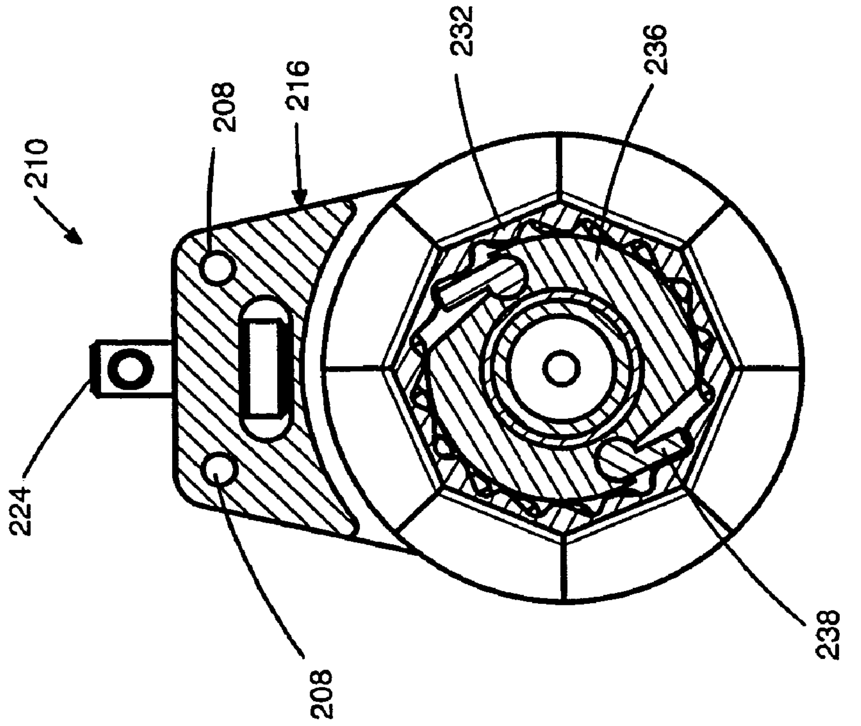
FIG. 23 is a side elevation in cross-section taken through the points B-B of the pulley of FIG. 22.

Referring in particular to FIGS. 22 to 27, and particularly FIGS. 23, 26 and 27, the first pulley wheel 212 defines an internal cylindrical ratchet 232 which is located within the pulley wheel 212 on the side adjacent the second pulley wheel 214. The second pulley wheel 214 has a substantially cylindrical protrusion 236 with two pawls 238 fitted thereto by torsion springs (not shown). The protrusion 236 protrudes from the second pulley wheel 214 at a side adjacent the first pulley wheel 212 and is shaped to fit into the internal ratchet 232. The pawls 238 are arranged to engage with the ratchet 232. The ratchet mechanism is designed so that the pulley wheels 212, 214 are prevented from rotating relative to each other in one direction, but are able to rotate relative to one another in the other direction.

Two mounting arms 226, 227 attach to and lie against the outside surface of each respective side plate 218, 219, extending outward to join a short distance from the frame 216. Each arm 226, 227 is in the form of a strip, a first end of which lies coplanar with and against the side surface of the frame casing 216, and which is bent through substantially a right angle at the other end. Each arm is bent in the same direction. Thus, the arm 226 adjacent the first pulley wheel 212 is bent outwards, and the other arm 227 is bent inwards. A cam cleat 228 is attached to the mounting arms 226, 227 at their bent ends, such that a rope may be fed through the cam cleat 228 onto the first pulley wheel 212, the cam cleat 228 in this way being aligned with the first pulley wheel 212.

Figure 16:
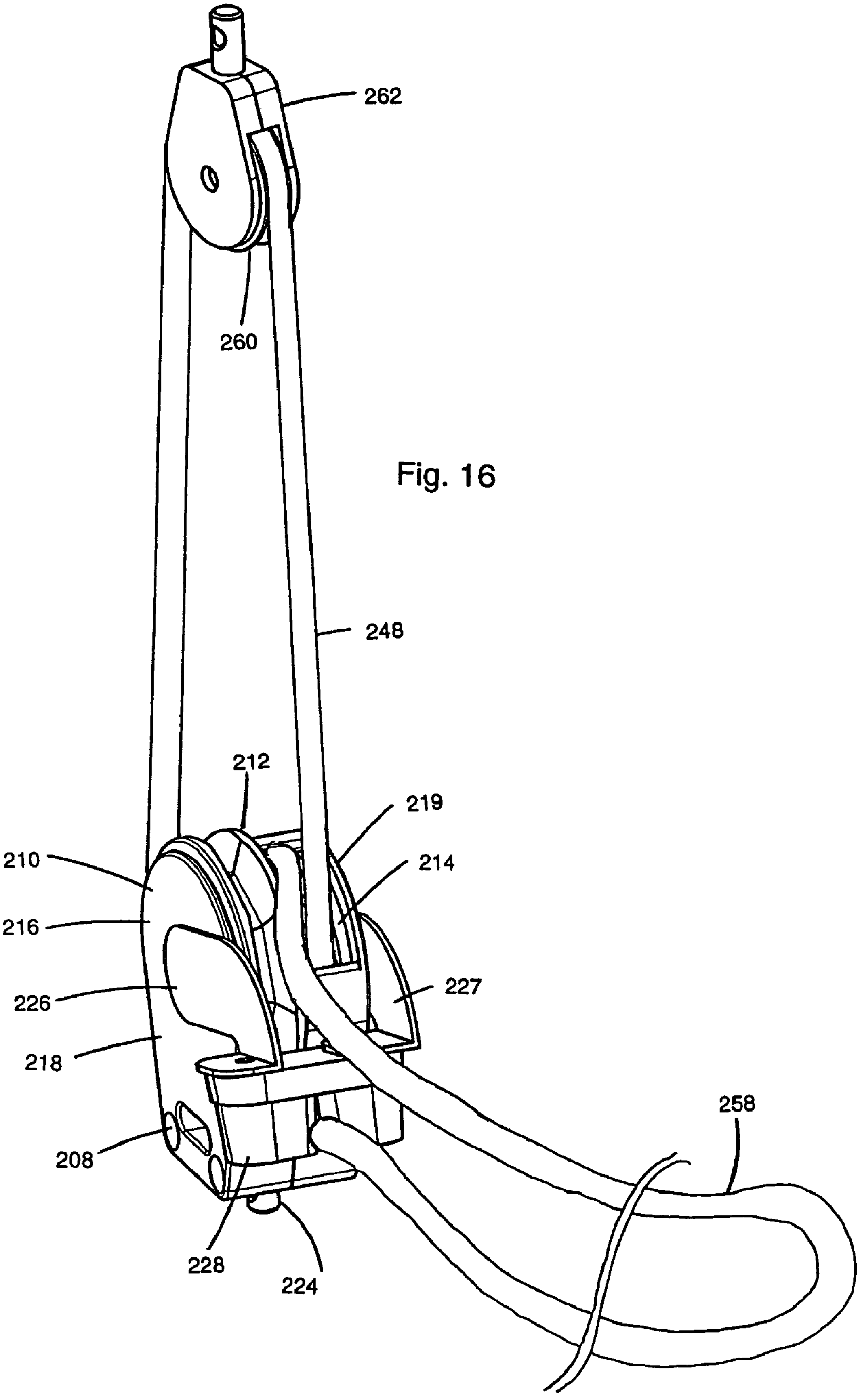
FIG. 16 is a front perspective view of the pulley of the second embodiment of the invention in a system showing a rope and pulley block.
Figure 17:
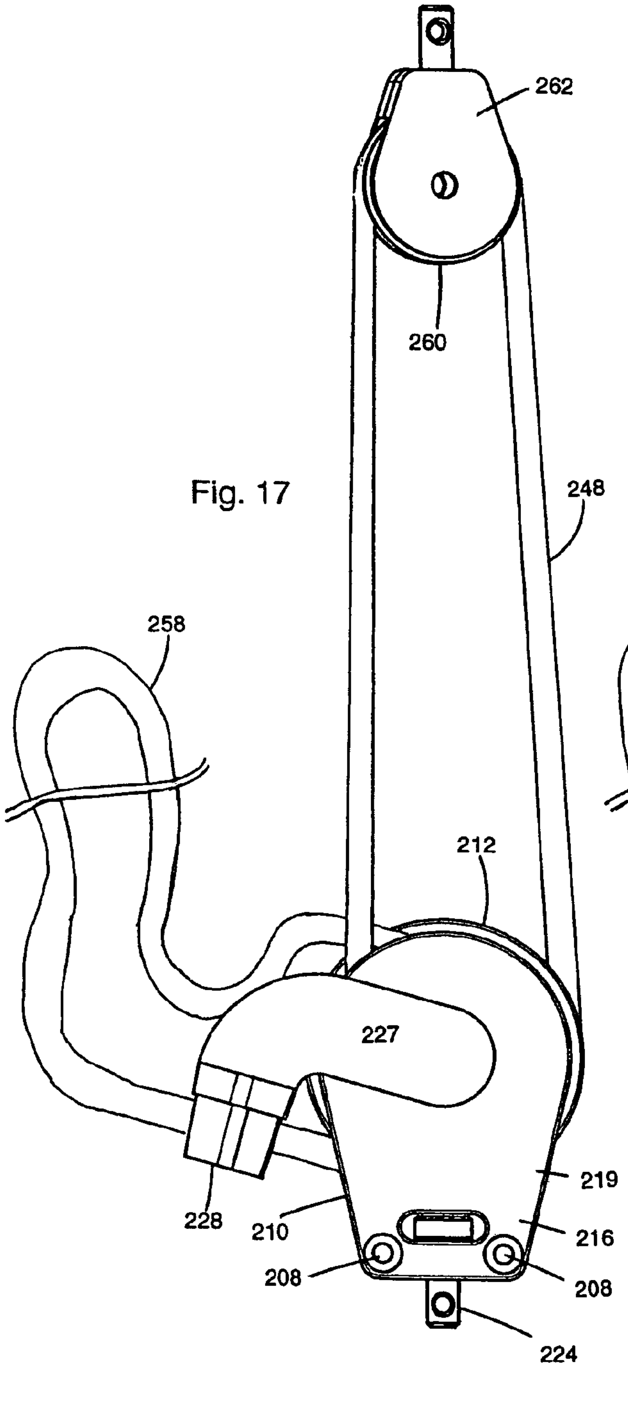
FIG. 17 is a side elevation of the pulley of the second embodiment of the invention in a system showing a rope and pulley block.
Figure 18:
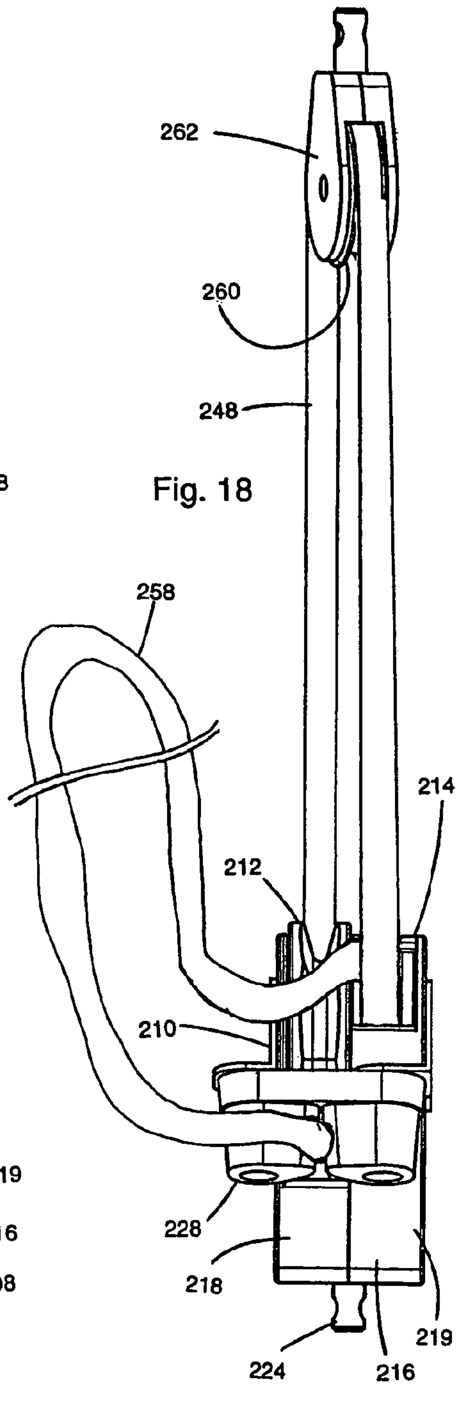
FIG. 18 is a front elevation of the pulley of the second embodiment of the invention in a system showing a rope and pulley block.
Figure 19A:
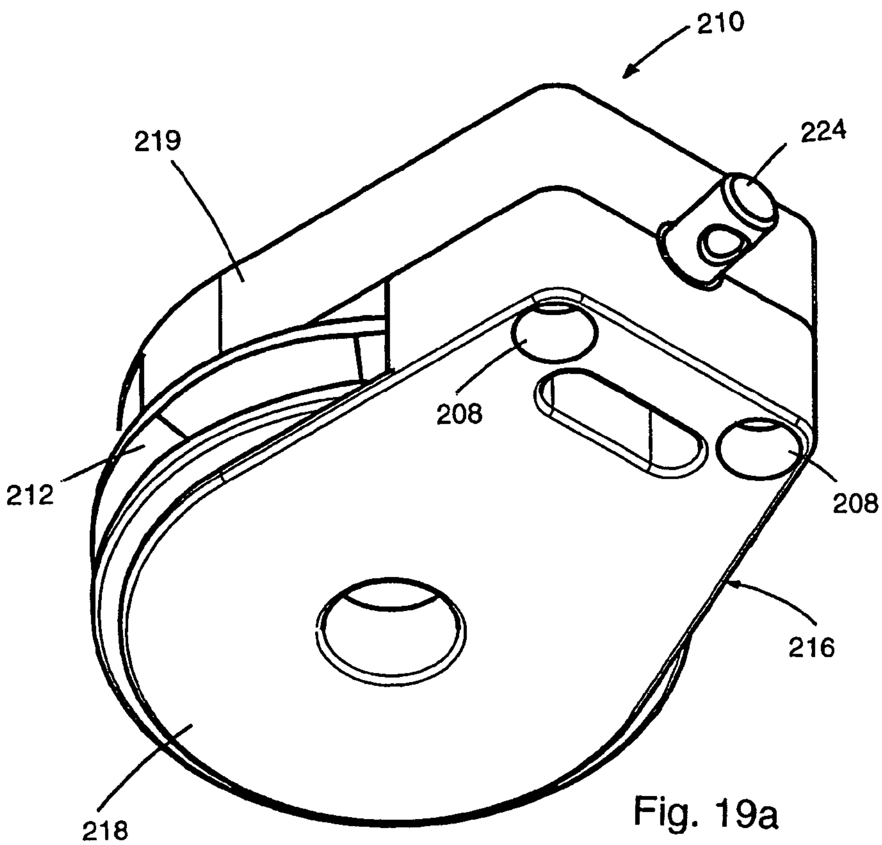
FIGS. 19*a* and 19*b* are perspective views of the pulley of FIG. 16.
Figure 19B:
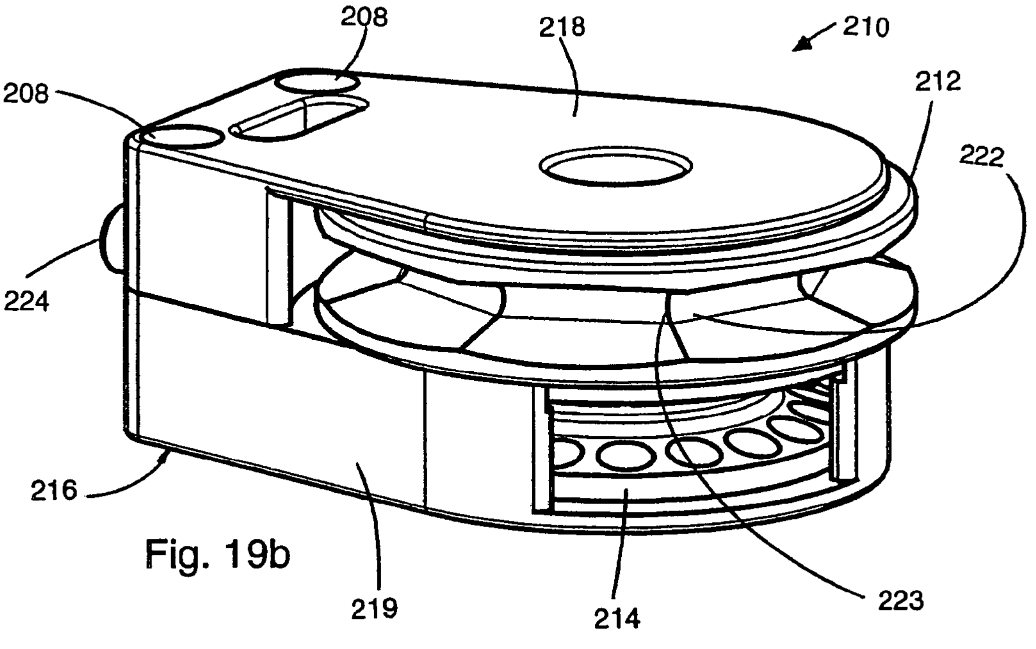
Figure 21:
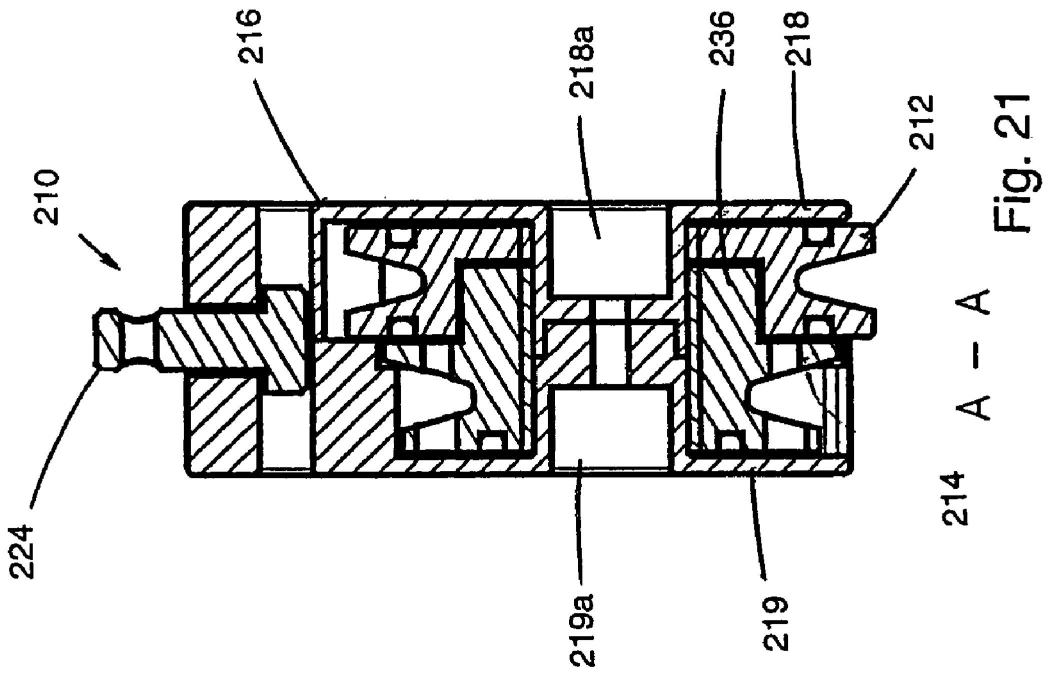
FIG. 21 is a front end elevation in cross-section taken through the points A-A of the pulley of FIG. 20.
Figure 20:
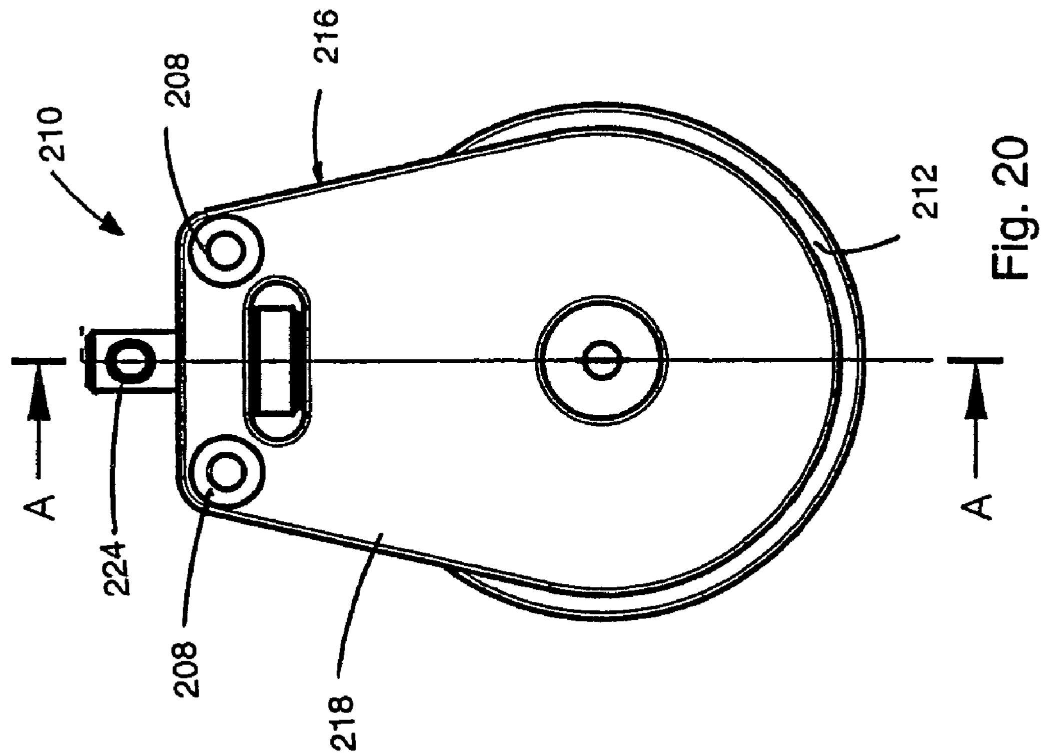
FIG. 20 is a side elevation of the pulley of FIG. 16.

In use, as shown in FIGS. 16, 17 and 18, a continuous rope 248 runs around the first pulley wheel 212 of the pulley 210, around a pulley wheel 260 of a normal block 262 which is attached to a load (not shown), then around the second pulley wheel 214 of the pulley 210.

A first gear ratio of 1:1 is obtained by pulling simultaneously both lengths of the loop 258 entering the pulley 210. This causes the first pulley wheel 212 and the second pulley wheel 214 to turn in opposite directions. In this situation, the ratchet mechanism allows the pulleys 212, 214 to turn in opposite directions. The three pulley wheels 212, 214, 260 work together to achieve the 1:1 gear ratio.

A second gear ratio of 2:1 is obtained by securing the rope 248 in the cam cleat 228 and pulling on the loop 258 from the second pulley wheel 214. In this way, pulley wheels 214, 260 rotate as the rope 248 is pulled and pulley wheel 212 is prevented from rotating as the rope 248 is jammed in the cam cleat 228. The pulley wheel 260 rotates slowly. In this situation, the ratchet mechanism allows the second pulley wheel 214 to turn relative to the first pulley wheel 212 in this direction only. The two pulley wheels 214, 260 work together thus a 2:1 gear ratio is achieved.

A third high power gear ratio of is obtained by pulling on the free length of the loop 258 from the first pulley wheel 212 and allowing the other length to run out freely. In this way, the pulley wheels 212, 214 rotate in the same direction. The second pulley wheel 214 is prevented from rotating relative to the first pulley wheel in this direction by the ratchet mechanism, and so the second pulley wheel 214 cannot overtake the first. The difference in radii of the pulley wheels 212, 214 creates a differential and a high power gear ratio of 9.5:1 is achieved in a similar way to the known differential pulley. As in the first embodiment, the first pulley wheel 212 must not slip relative to the rope 248 in use in this way. In this embodiment, a grooved pulley wheel 212 is used instead of a drum-shaped pulley wheel 112, and the rope is reaved around the grooved pulley wheel 212 along about ¼ of the wheel's circumference. Ideally, to prevent slippage in this system, the total friction between the rope 248 and the pulley wheel 212 should be such that the ratio of tension between the two ends of the rope 248 is greater than half the high gear ratio. Therefore, as there is less contact between the rope 248 and pulley wheel 212 of this embodiment, the friction coefficient must be greater than that of the first embodiment. The faceted grooved pulley wheel 212 of this embodiment achieves a sufficiently high friction coefficient.

If the free end of the rope 248 through the cam cleat 228 is released, the friction around the first pulley wheel 214 is reduced and the rope may slip. A quick release of the load attached to the pulley 210 is achieved in this way.

Figure 28:
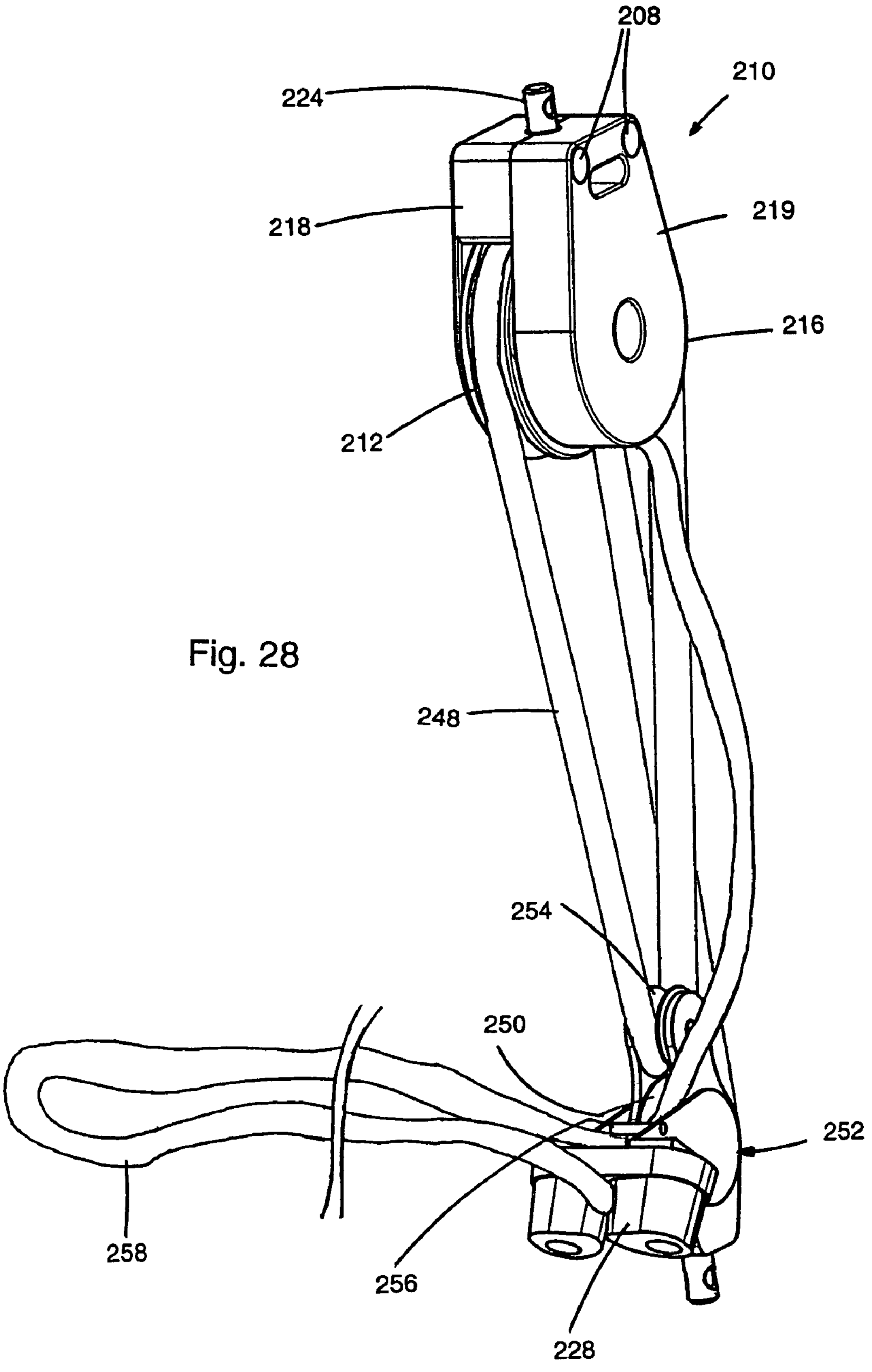
FIG. 28 is a front perspective view of the pulley of the second embodiment of the invention in another system showing a rope and fiddle block
Figure 29:
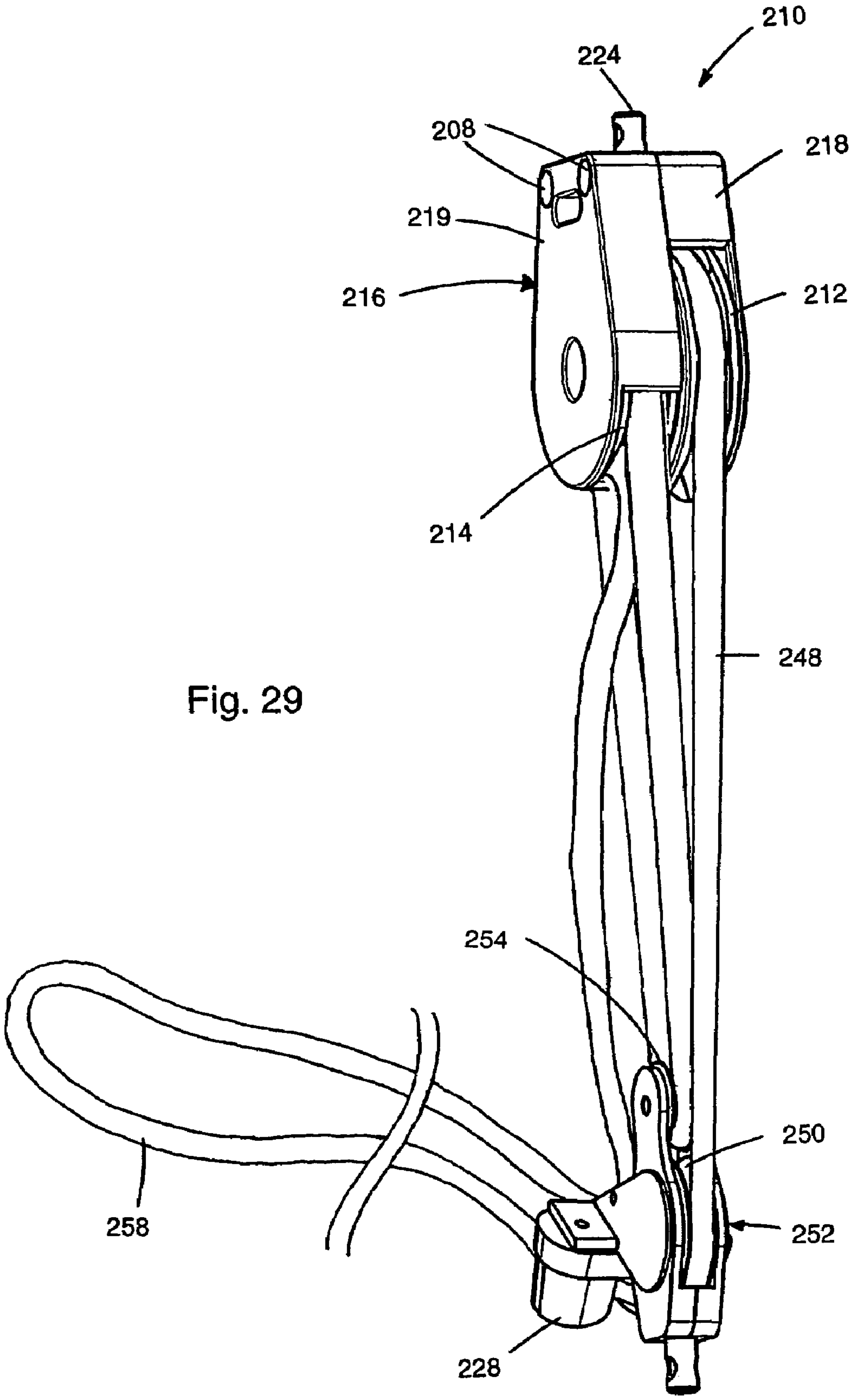
FIG. 29 is a rear perspective view of the pulley of the second embodiment of the invention in the system of FIG. 28.
Figure 30C:
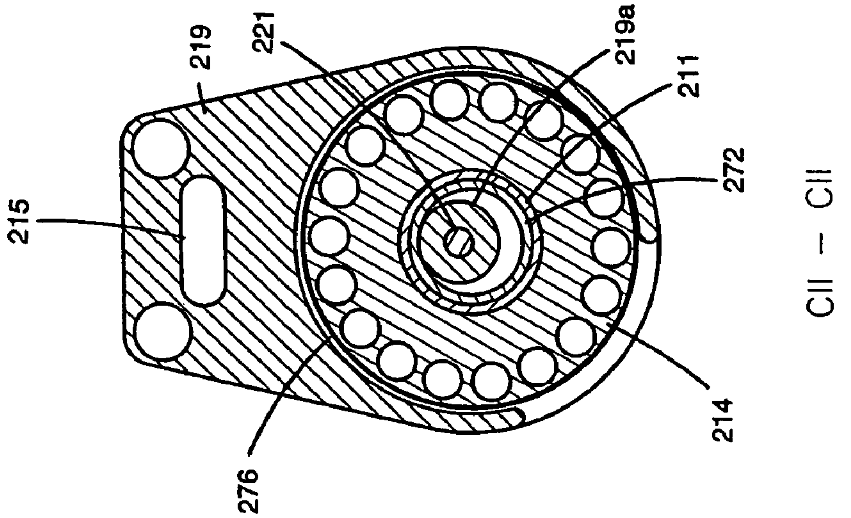
FIG. 30*c* is a side elevation in cross-section taken through the points CII-CII of the pulley of FIG. 30*a* under applied external load.
Figure 30B:
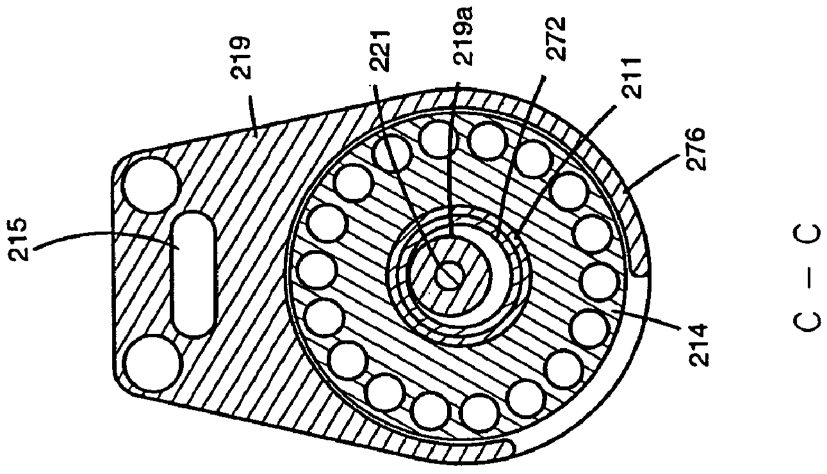
FIG. 30*b* is a side elevation in cross-section taken through the points C-C of the pulley of FIG. 30*a* under no external load.
Figure 30A:
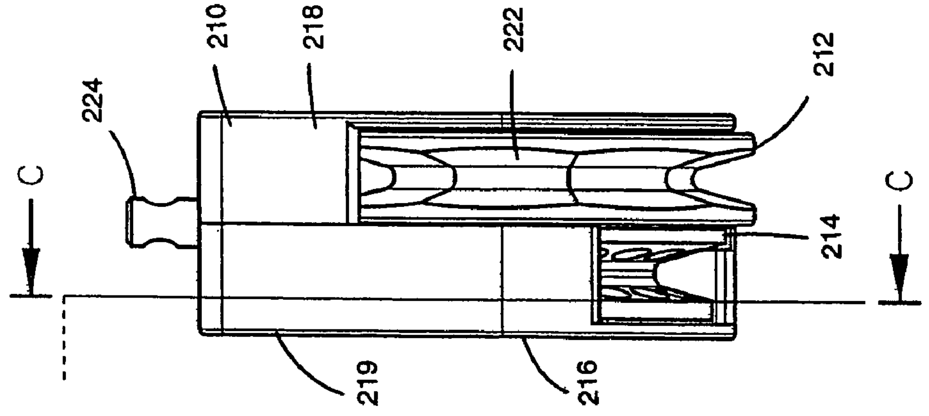
FIG. 30*a* is a front end elevation of the pulley of the third embodiment of the invention.
Figure 31A:
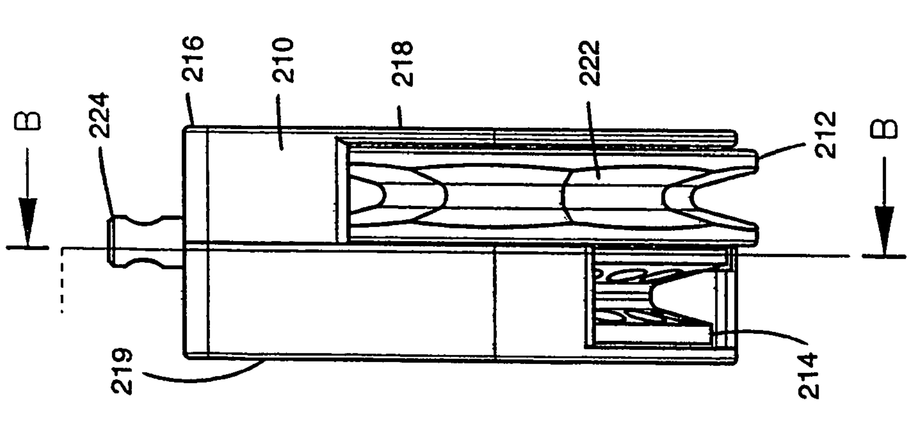
FIG. 31*a* is a front end elevation of the pulley of the third embodiment of the invention.
Figure 31B:
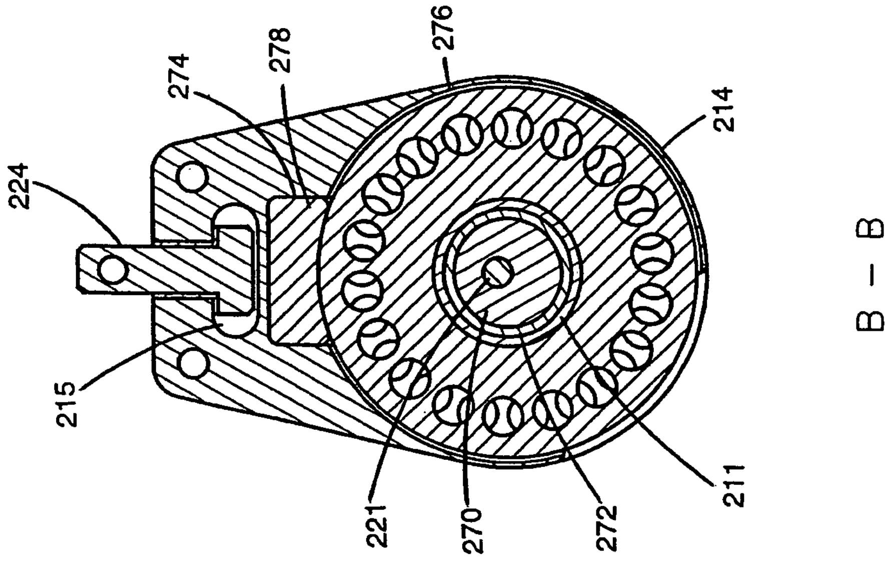
FIG. 31*b* is a side elevation in cross-section taken through the points B-B of the pulley of FIG. 31*a* under no external load.
Figure 31C:
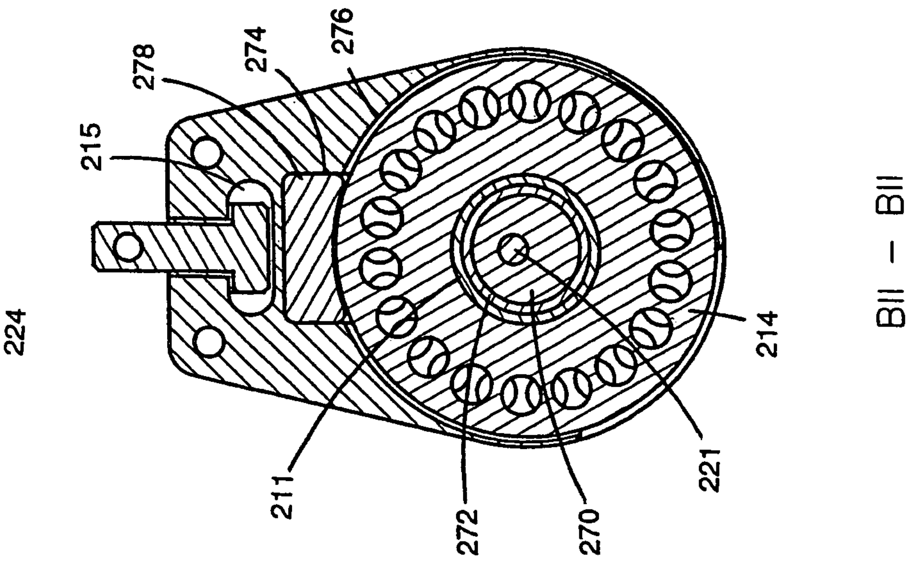
FIG. 31*c* is a side elevation in cross-section taken through the points BII-BII of the pulley of FIG. 31*a* under applied external load.
Figure 32:
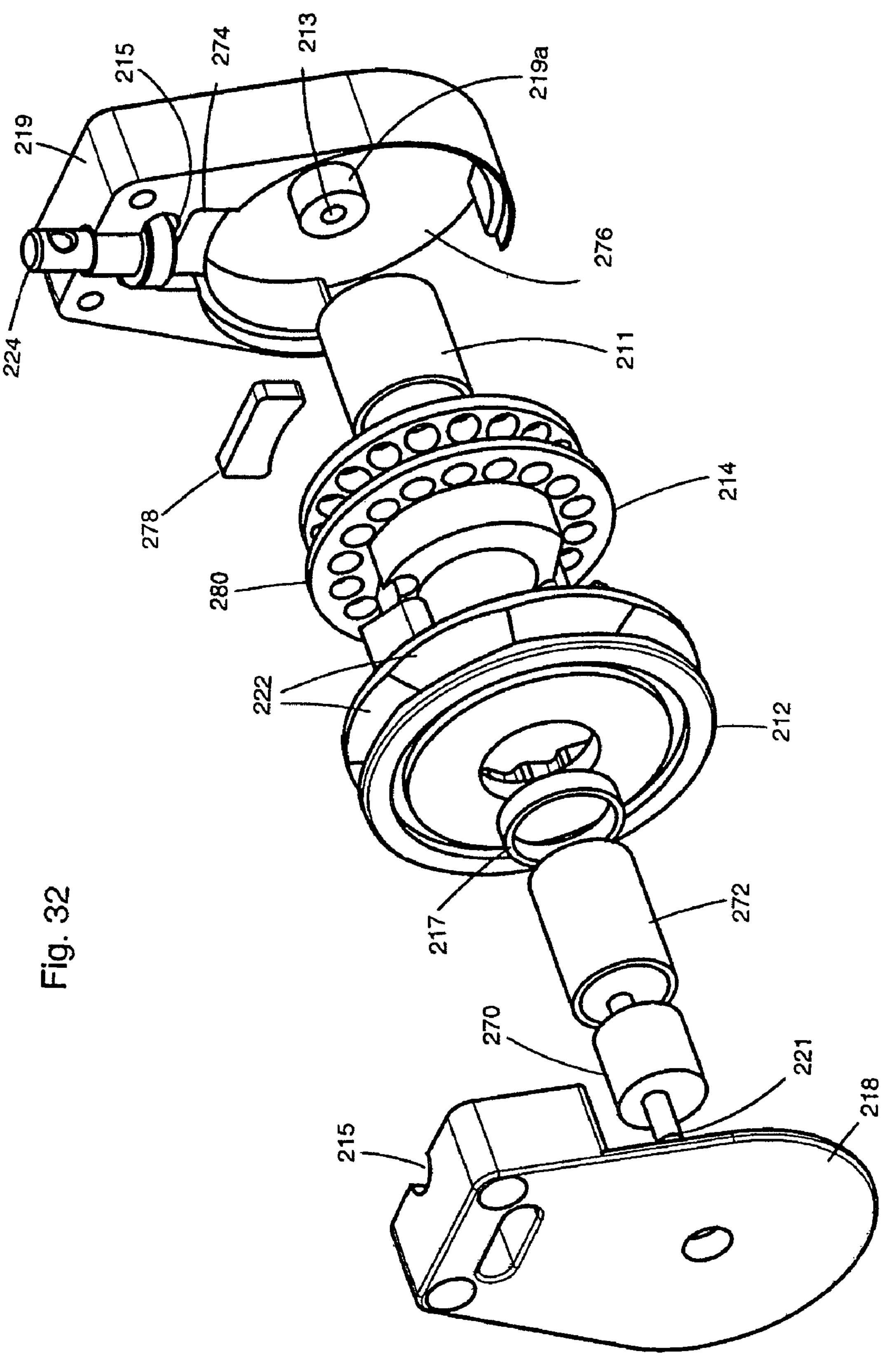
FIG. 32 is a first exploded perspective view of the pulley of FIG. 30*a;*
Figure 33:
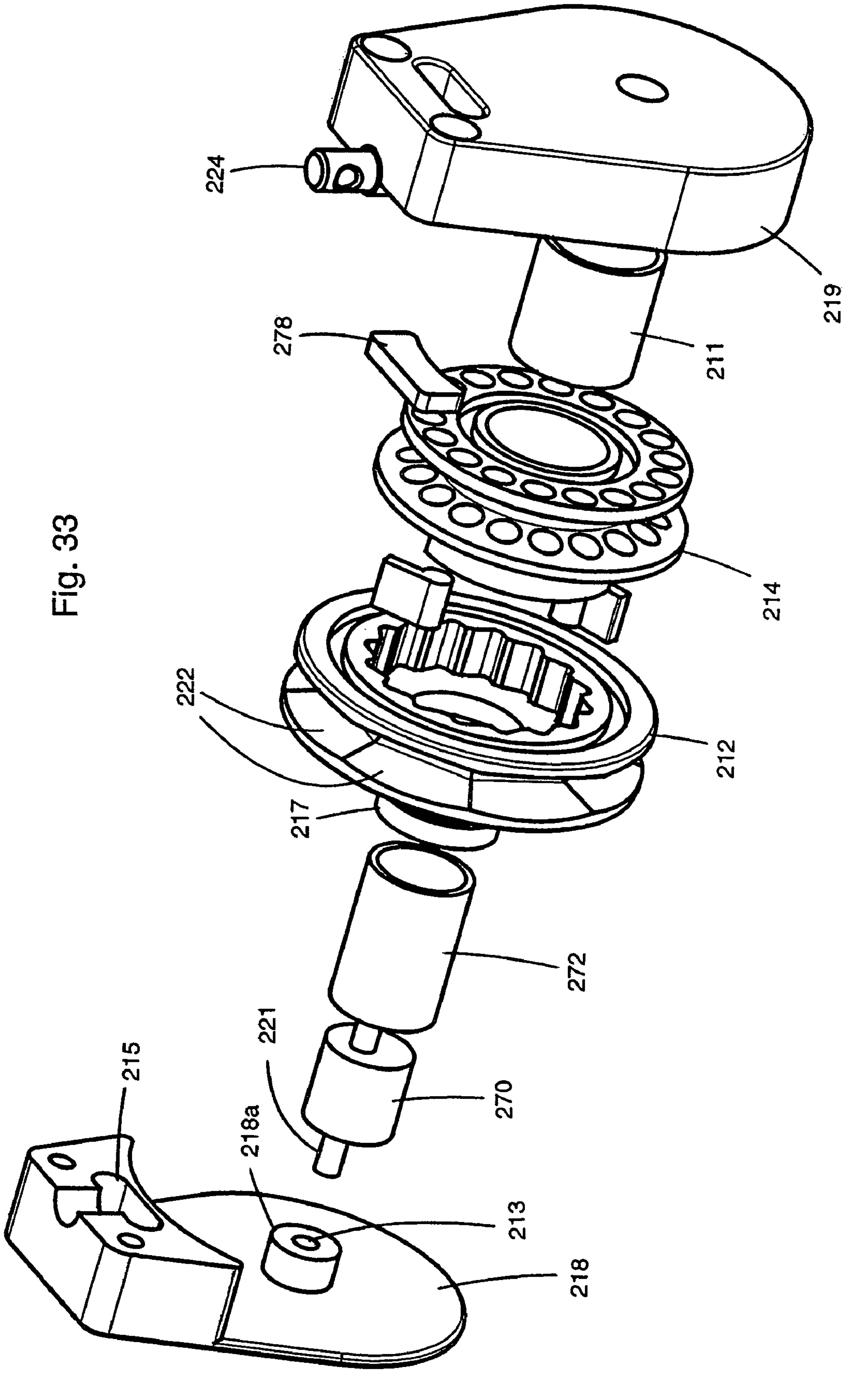
FIG. 33 is a second exploded perspective view of the pulley of FIG. 30*a;*
Figure 34B:
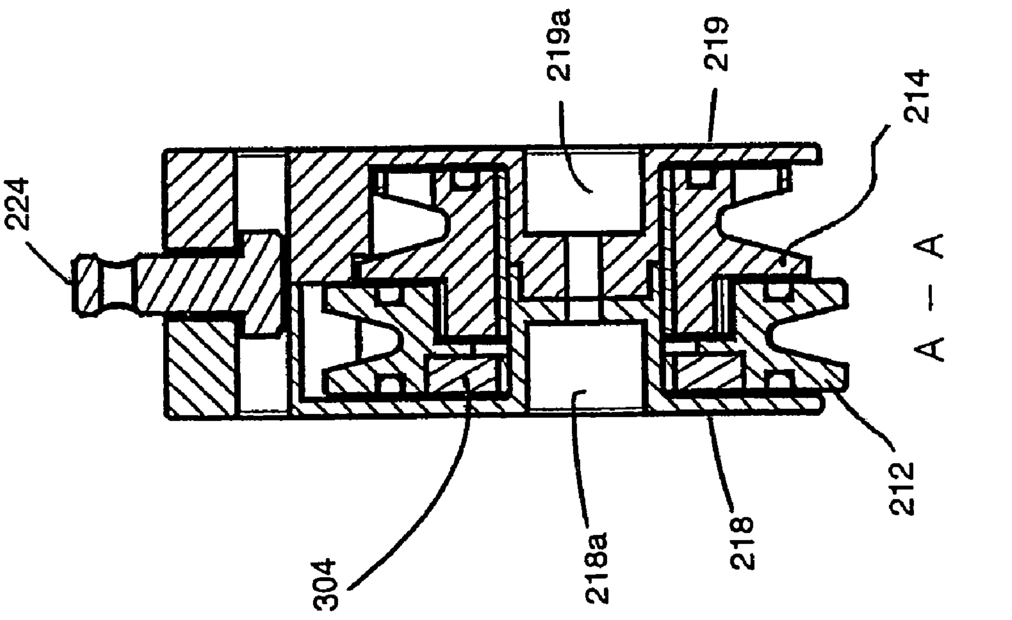
FIG. 34*b* is an end elevation in cross-section taken through the points A-A of the pulley of FIG. 34*a;*
Figure 34A:
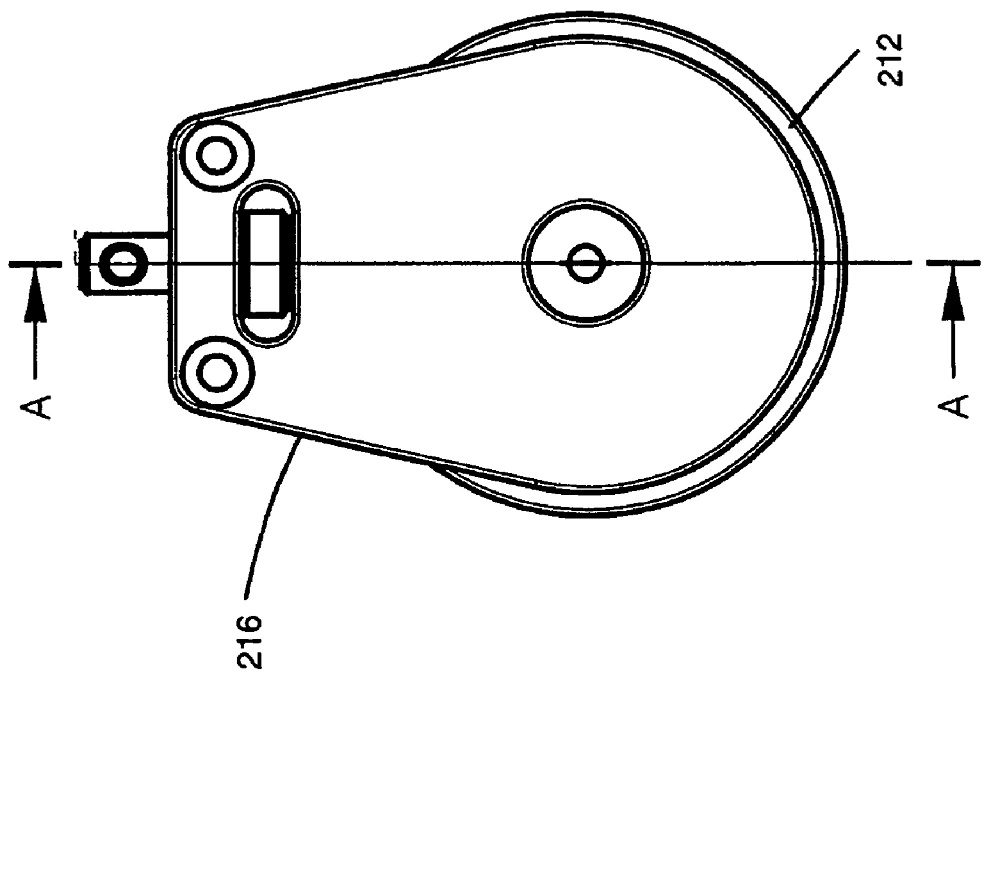
FIG. 34*a* is a side elevation of the pulley of the fourth embodiment of the invention.
Figure 35C:
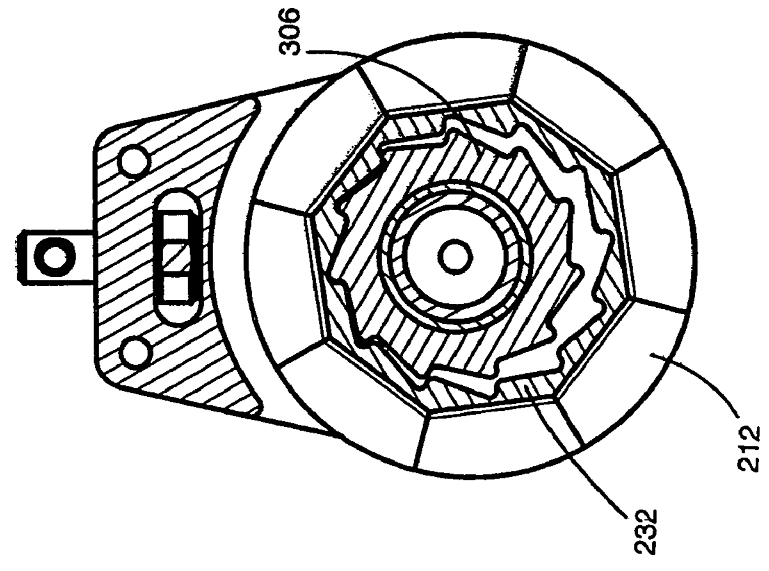
FIG. 35*c* is a side elevation in cross-section taken through the points B-B of the pulley of FIG. 35*a* under high-load conditions.
Figure 35B:
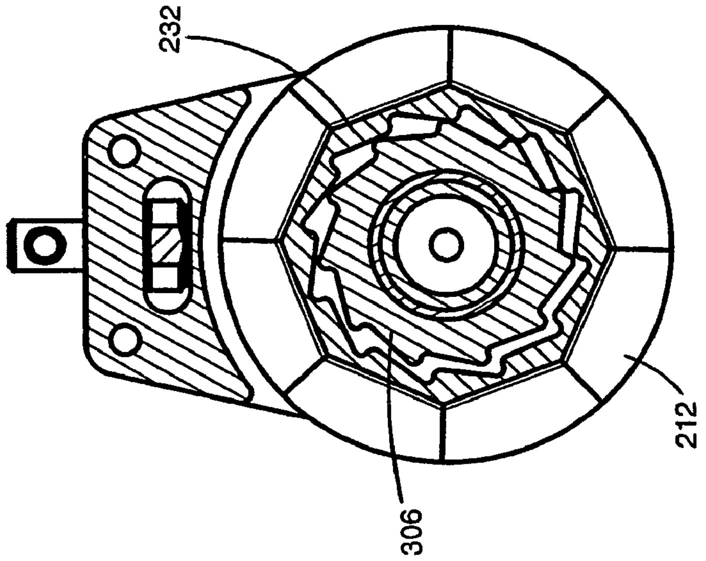
FIG. 35*b* is a side elevation in cross-section taken through the points B-B of the pulley of FIG. 35*a* under low-load conditions.
Figure 35A:
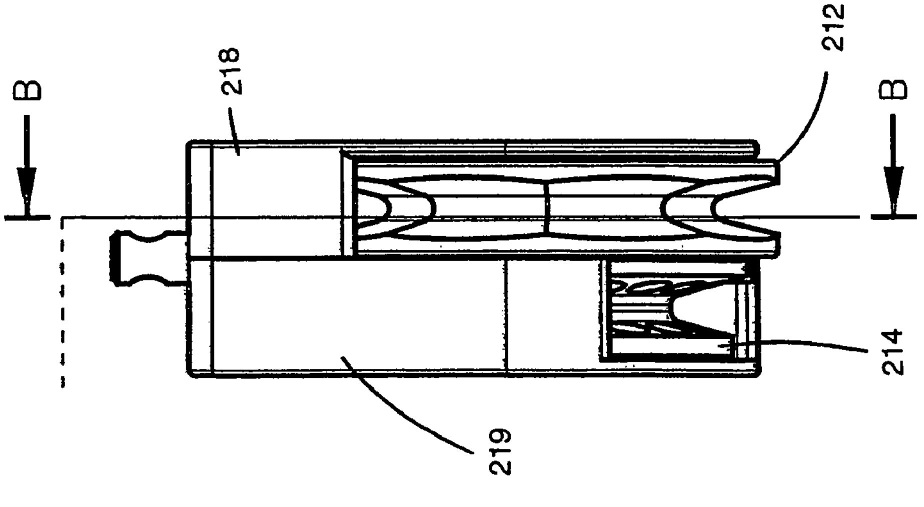
FIG. 35*a* is an end elevation of the pulley of FIG. 34*a;*
Figure 36B:
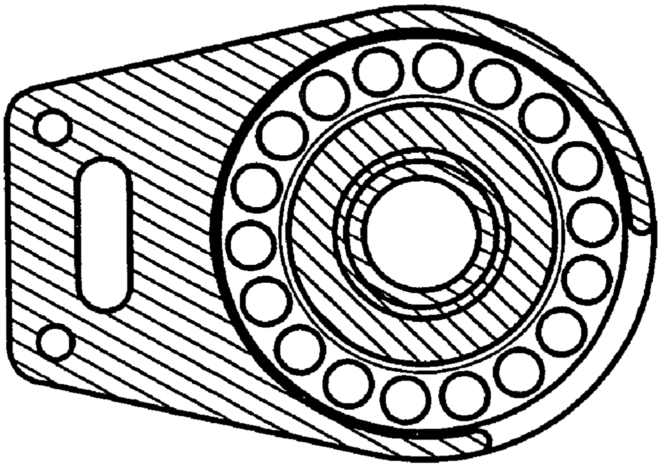
FIG. 36*b* is a side elevation in cross-section taken through the points C-C of the pulley of FIG. 36*a* under low-load conditions.
Figure 36A:
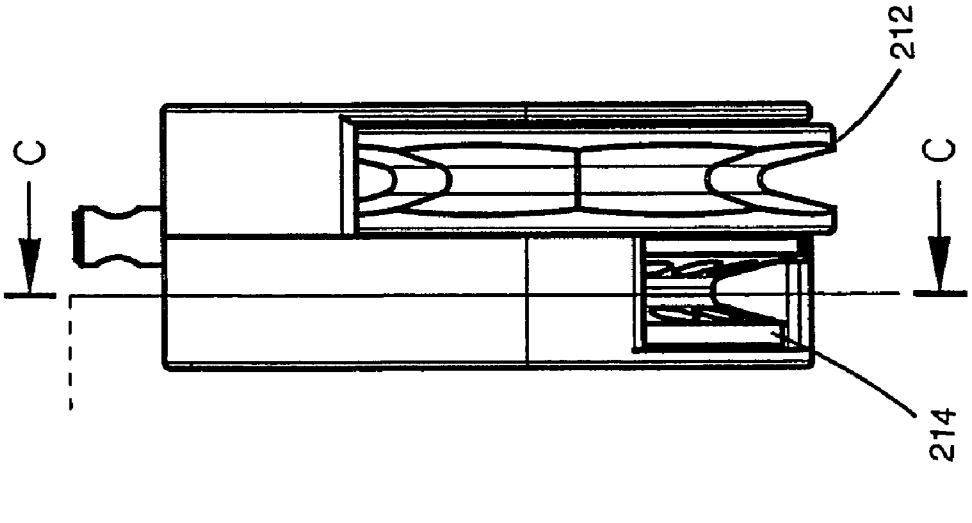
FIG. 36*a* is an end elevation of the pulley of FIG. 34*a;*
Figure 37:
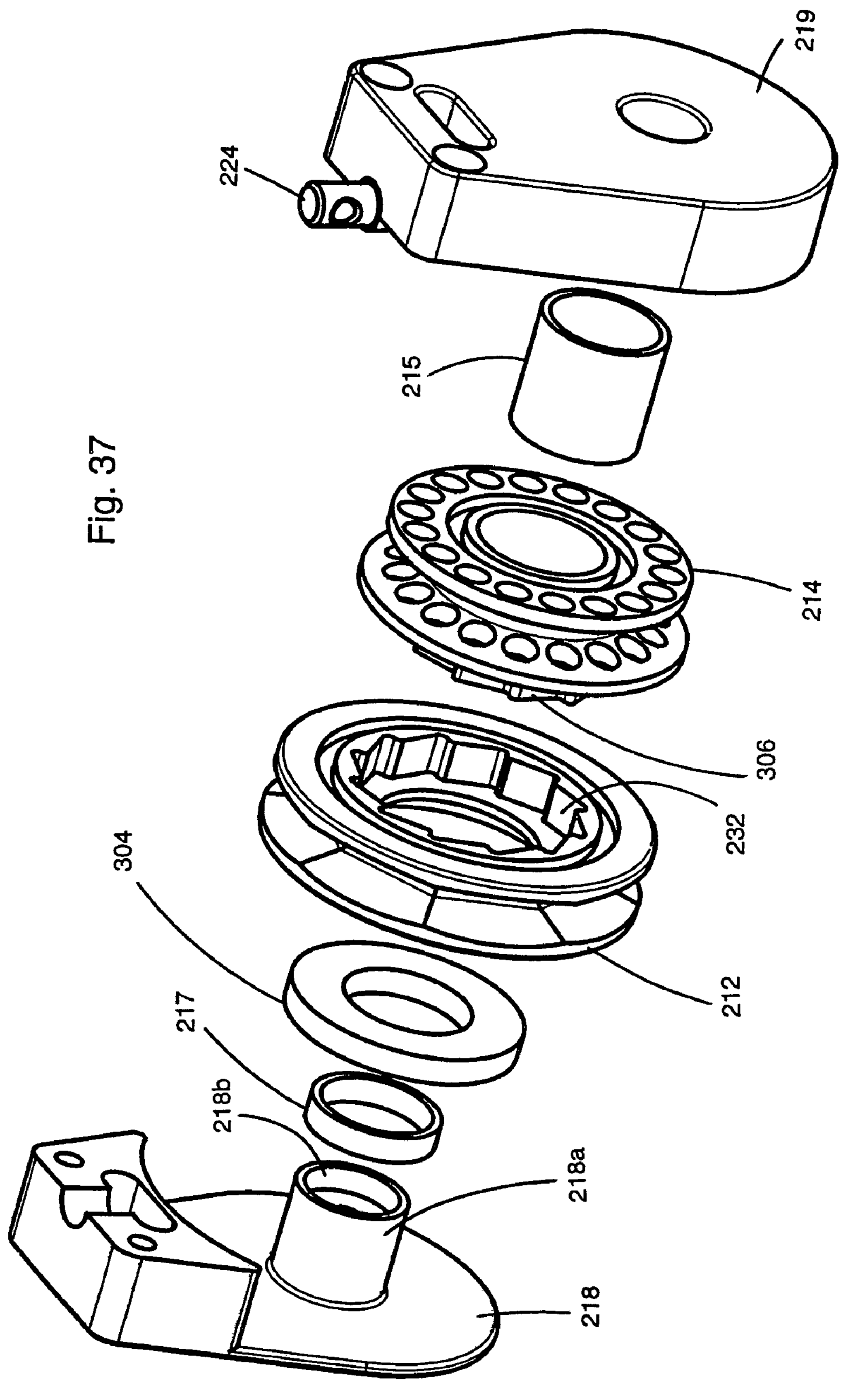
FIG. 37 is a first exploded perspective view of the pulley of FIG. 30.
Figure 38:
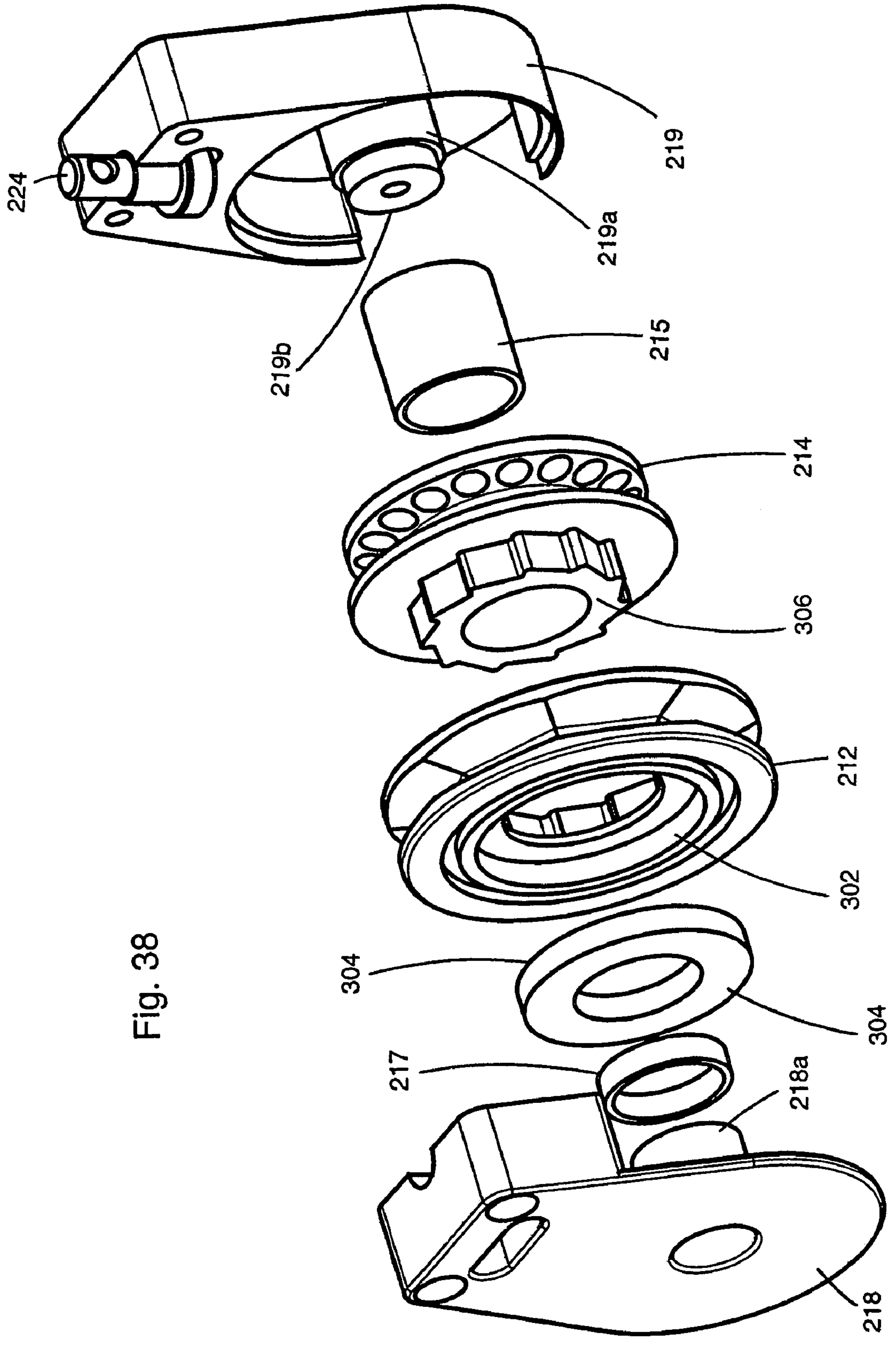
FIG. 38 is a second exploded perspective view of the pulley of FIG. 30.

FIGS. 28 and 29 show an alternative arrangement of use. Here, a continuous rope 248 runs through a cam cleat 228 attached to a standard fiddle block 252, around a first pulley wheel 250 of the fiddle block 252, then to and around the first pulley wheel 212 of the pulley 210, which is attached to a load (not shown), then around a second pulley wheel 254 of the fiddle block 252, around the second pulley wheel 214 of the pulley 210 and through a feed 256 in the fiddle block 252. The rope 248 is reaved in the opposite direction around the first and second pulley wheels 212, 214. A free loop 258 is formed in the rope 248 at the fiddle block 252.

A first gear ratio of 2:1 is obtained by pulling simultaneously both lengths of the loop 258 entering the fiddle block 252. This causes the first pulley wheel 212 and the second pulley wheel 214 to turn in opposite directions. In this situation, the ratchet mechanism allows the pulleys 212, 214 to turn in opposite directions. The four pulley wheels 212, 214, 250, 254 work together to achieve the 2:1 gear ratio.

A second gear ratio of 4:1 is obtained by securing the rope 248 in the cam cleat 228 and pulling on the loop 258 close to the feed 256. In this way, pulley wheels 214, 254 rotate as the rope 248 is pulled and pulley wheel 250 is prevented from rotating as the rope 248 is jammed in the cam cleat 228 of the fiddle block 252. The pulley wheel 212 rotates slowly. In this situation, the ratchet mechanism allows the second pulley wheel 214 to turn relative to the first pulley wheel 212 in this direction only. The three pulley wheels 214, 254, 212 work together thus a 4:1 gear ratio is achieved.

A third high power gear ratio of 10.5:1 is obtained by pulling on the free length of the loop 258 from the first pulley wheel 250 of the fiddle block 252 and allowing the other length to run out freely. In this way, the pulley wheels 212, 214 rotate in the same direction. The second pulley wheel 214 is prevented from rotating relative to the first pulley wheel in this direction by the ratchet mechanism, and so the second pulley wheel 214 cannot overtake the first. The difference in radii of the pulley wheels 212, 214 creates a differential and a high power gear ratio is achieved in a similar way to the known differential pulley.

If the free end of the rope 248 through the cam cleat 228 is released, the friction around the first pulley wheel 212 is reduced and the rope may slip. A quick release of the load attached to the pulley 210 is achieved in this way.

Referring to FIGS. 30*a* to 33, a pulley of a third embodiment of the invention is described. The third embodiment is similar to the second embodiment, and only the differences will be described. Like reference numerals are used where applicable.

In the third embodiment, the axle bosses 218*a*, 219*a* are smaller and are plain cylindrical bosses without the aperture 218*b* and narrow end portion 219*b*. The bosses 218*a*, 219*a* also are offset from central with respect to the side plates 218, 219 towards the anchor point 224. The central tie bar 221 through the apertures 213 in the bosses 218*a*, 219*a* mounts a cylindrical elastomeric bush 270. The bush 270 is received in a hollow cylindrical axle 272 which nests within the bearings 211, 217.

The casing frame 216 is elongated towards the anchor point 224 and the side plate 219 defines a radially inwardly directed recess 274 beneath the recess 215 for the anchor point 224. The recess 274 intersects the circular rebate 276 in the side plate 219 for the second pulley wheel 214 and is generally rectangular. A brake shoe 278 is received in the recess 274 and protrudes from the recess 274 into the circular rebate 276 to engage the rim 280 of the second pulley wheel 214. The second pulley wheel 214 is urged into contact with the brake shoe 278 by the elastomeric bush 270 on the offset central tie bar 221.

In use, the user does not have to decide which ratio to use and hence whether to pull one or both ropes and, if one rope, which one. Instead, the user always pulls the part of the rope 248 which exits from the first pulley wheel 212, as shown in FIG. 16.

In the system shown, the pulley is attached by the anchor point to a lower anchorage, such as the deck of a boat, and a continuous rope 248 runs around the first pulley wheel 212 of the pulley 210, around a pulley wheel 260 of a normal block 262 which is attached to an upper load (not shown), such as the boom of a sailing boat, then around the second pulley wheel 214 of the pulley 210.

When the load in the system is low, the brake shoe 278 will prevent the second pulley wheel 214 from turning and so a 2:1 gear ratio is obtained in the system.

When the load in the system is high, the force applied through the rope 248 will act to urge the first pulley wheel 212 in the radial direction away from the anchor point 224, this force acts through the short bearing 217 and the axle 272 to compress the elastomeric bush 270. Compression of the elastomeric bush 270 relieves the pressure exerted by the bush 270 on the second pulley wheel 214 to urge it against the brake shoe 278, which allows the second pulley wheel 214 to turn. This results in a high differential gear ratio as before.

Although this system only offers two ratios, it has the advantage of automating the gearing of the system so that the system is easy to use.

In an alternative embodiment the brake shoe 278 can be replaced by a pawl of a ratchet system to engage with ratchet teeth on the second pulley wheel 214.

Referring to FIGS. 34*a* to 38, a pulley 210 of the fourth embodiment of the invention is described. The fourth embodiment is similar to the second embodiment, and only the differences will be described. Like reference numerals are used where applicable.

The first pulley wheel 212 defines a central journal 302 suitable for receiving a deformable rubber bush 304. The bush 304 fits over the plain bearing mounted on the axle 218*a* and allows the pulley wheel 212 to rotate as normal under low load conditions. Under heavy load conditions the bush 304 deforms and the pulley wheel 212 moves relative to the axle 218*a* and second pulley wheel 214.

The second pulley wheel 214 has an external ratchet type protrusion 306. The protrusion 306 protrudes from the second pulley wheel 214 at a side adjacent the first pulley wheel 212 and is shaped to fit into the internal ratchet 232 so that under low load conditions on the first pulley wheel 212 the protrusion 306 may rotate freely within the internal ratchet 232. Under high load conditions on the first pulley wheel 212, the internal ratchet 232 moves relative to the protrusion 306 such that they engage. The ratchet mechanism is designed so that, under high load conditions, the pulley wheels 212, 214 are prevented from rotating relative to each other in one direction, but are able to rotate relative to one another in the other direction. Under low load conditions the pulley wheels 212, 214 may rotate relative to one another in any direction allowing quick run out of a rope chain or the like in use.

Referring to FIGS. 39 to 45, the pulley 410 of the fifth embodiment of the invention comprises a first pulley wheel 412 separated from and connected to a second pulley wheel 414 by a casing 416.

Figure 43:
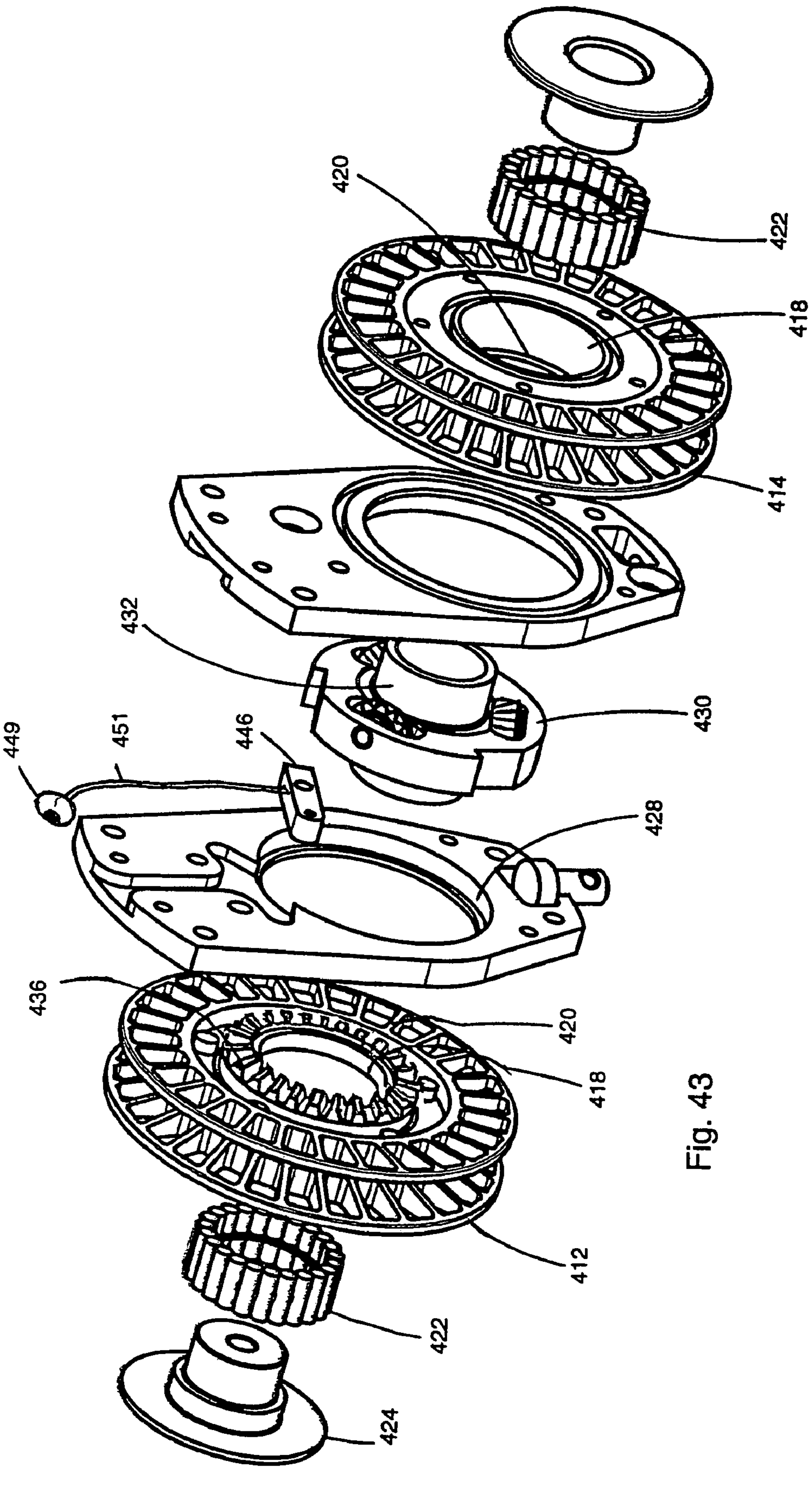
FIG. 43 is a first exploded perspective view of the pulley of FIG. 39.
Figure 44:
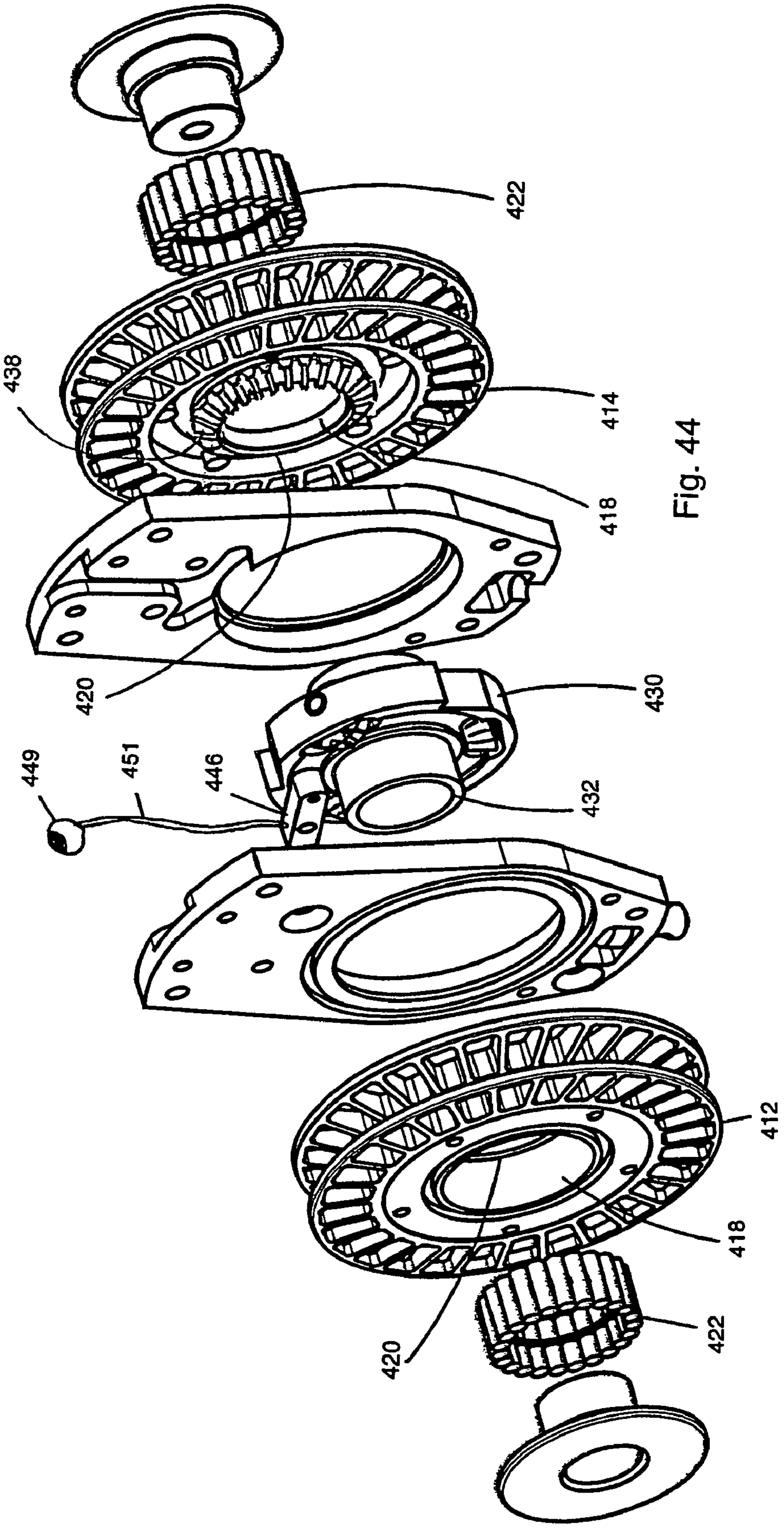
FIG. 44 is a second exploded perspective view of the pulley of FIG. 39.
Figure 45:
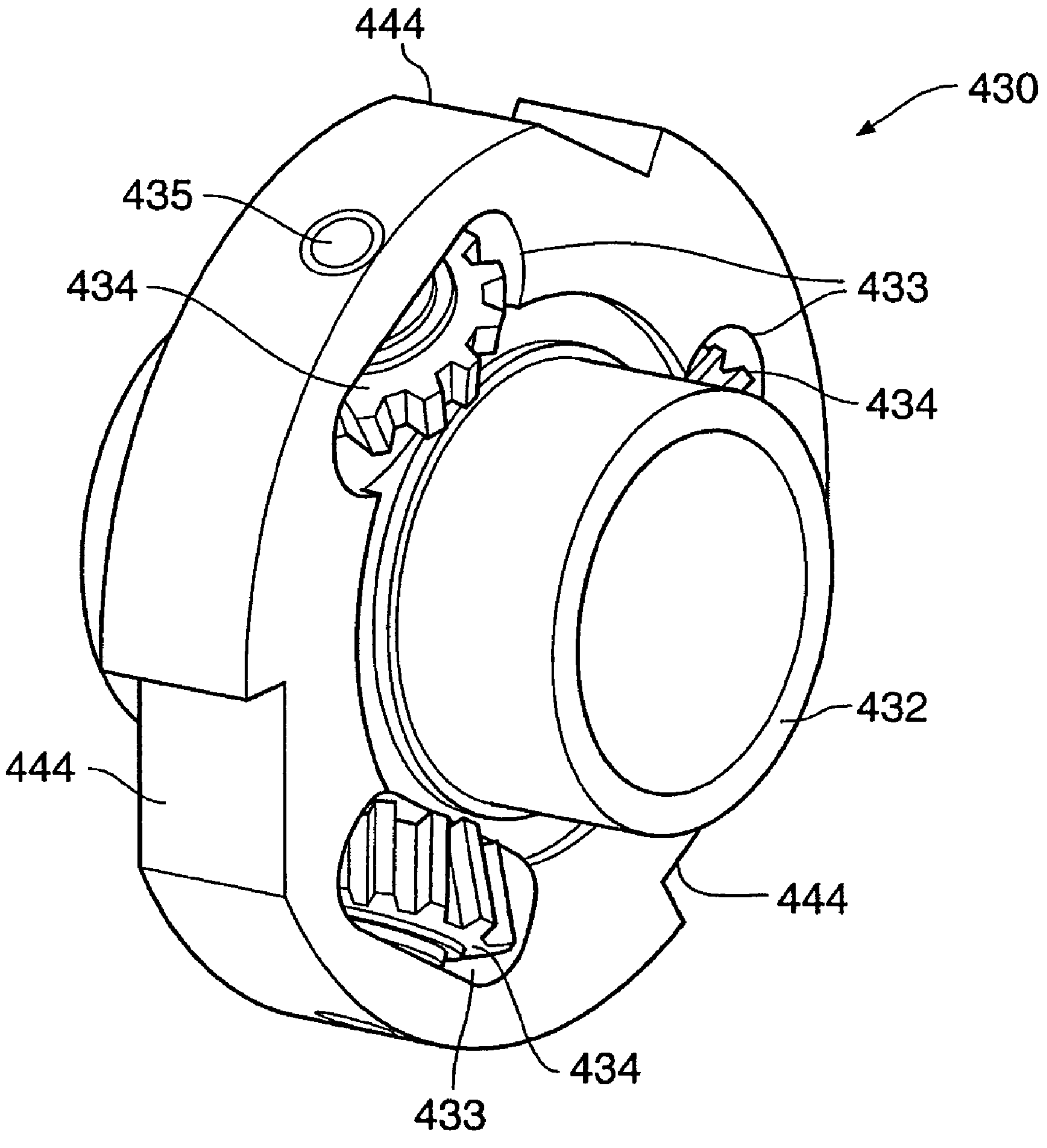
FIG. 45 is a perspective view of the carrier of the pulley of FIG. 39.
Figure 46:
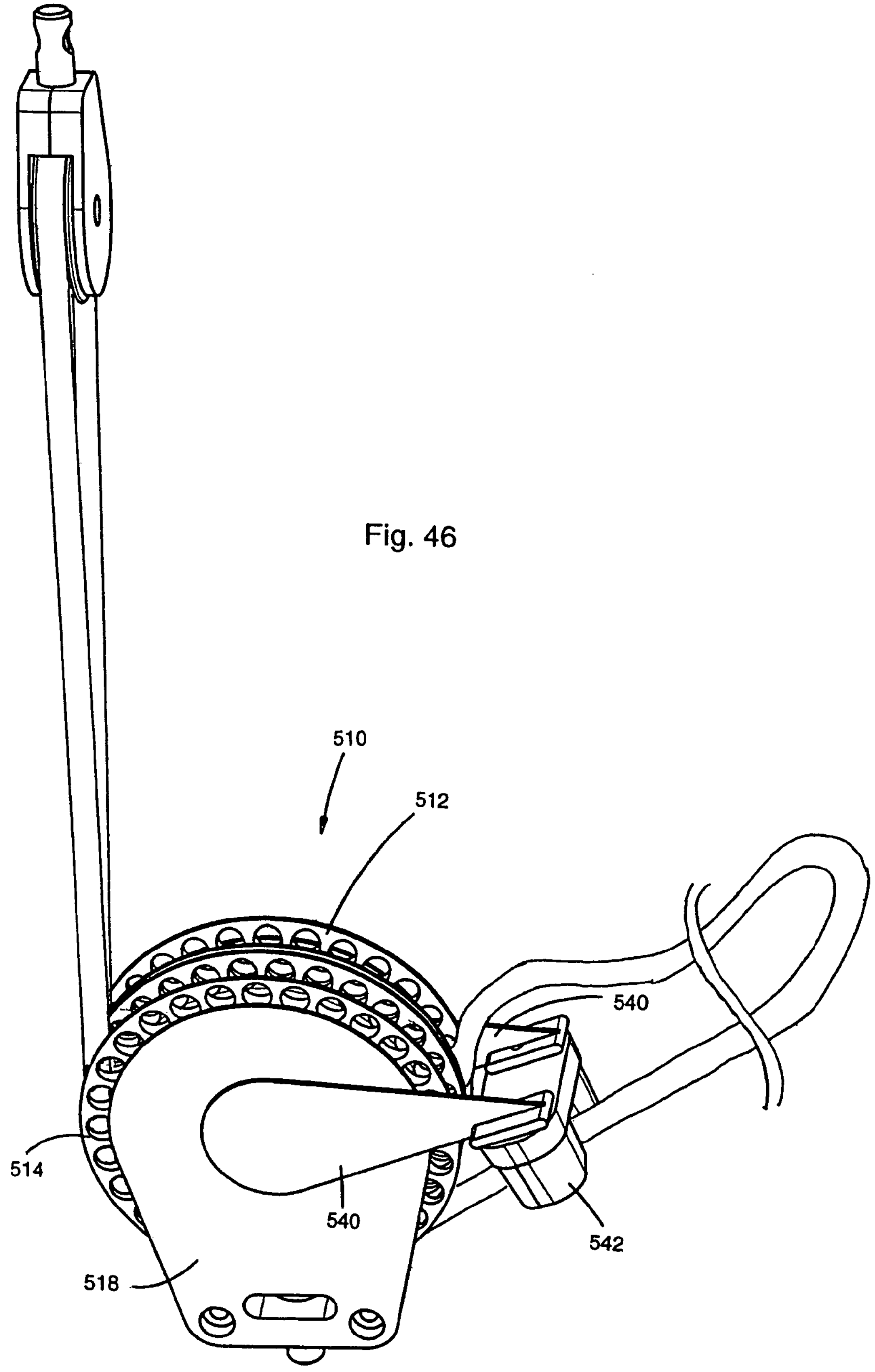
FIG. 46 is a side perspective view of the pulley of the sixth embodiment of the invention in a system showing a rope and pulley block.
Figure 48:
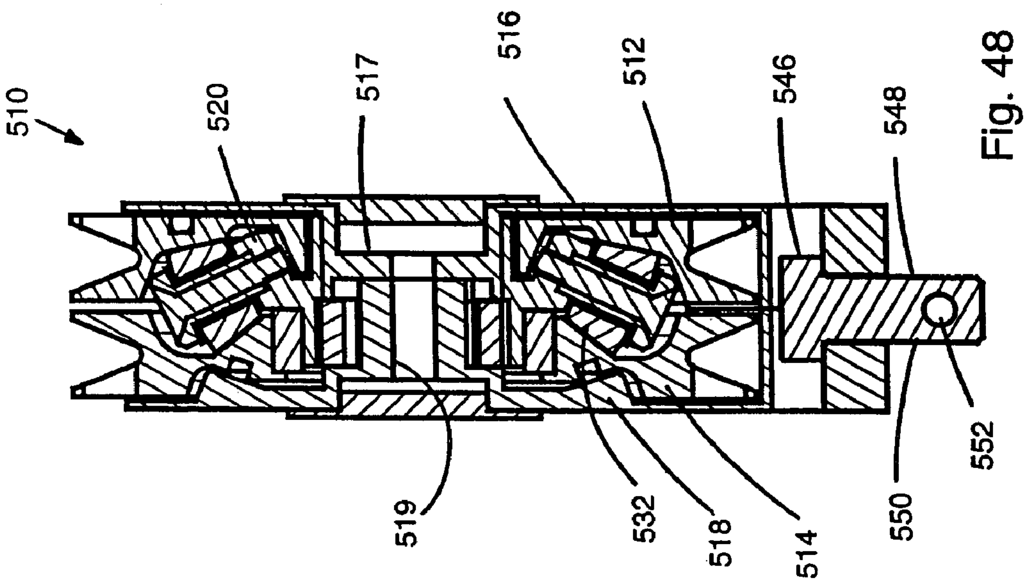
FIG. 48 is an end elevation in cross-section taken through the points A-A of the pulley of FIG. 47.
Figure 47:
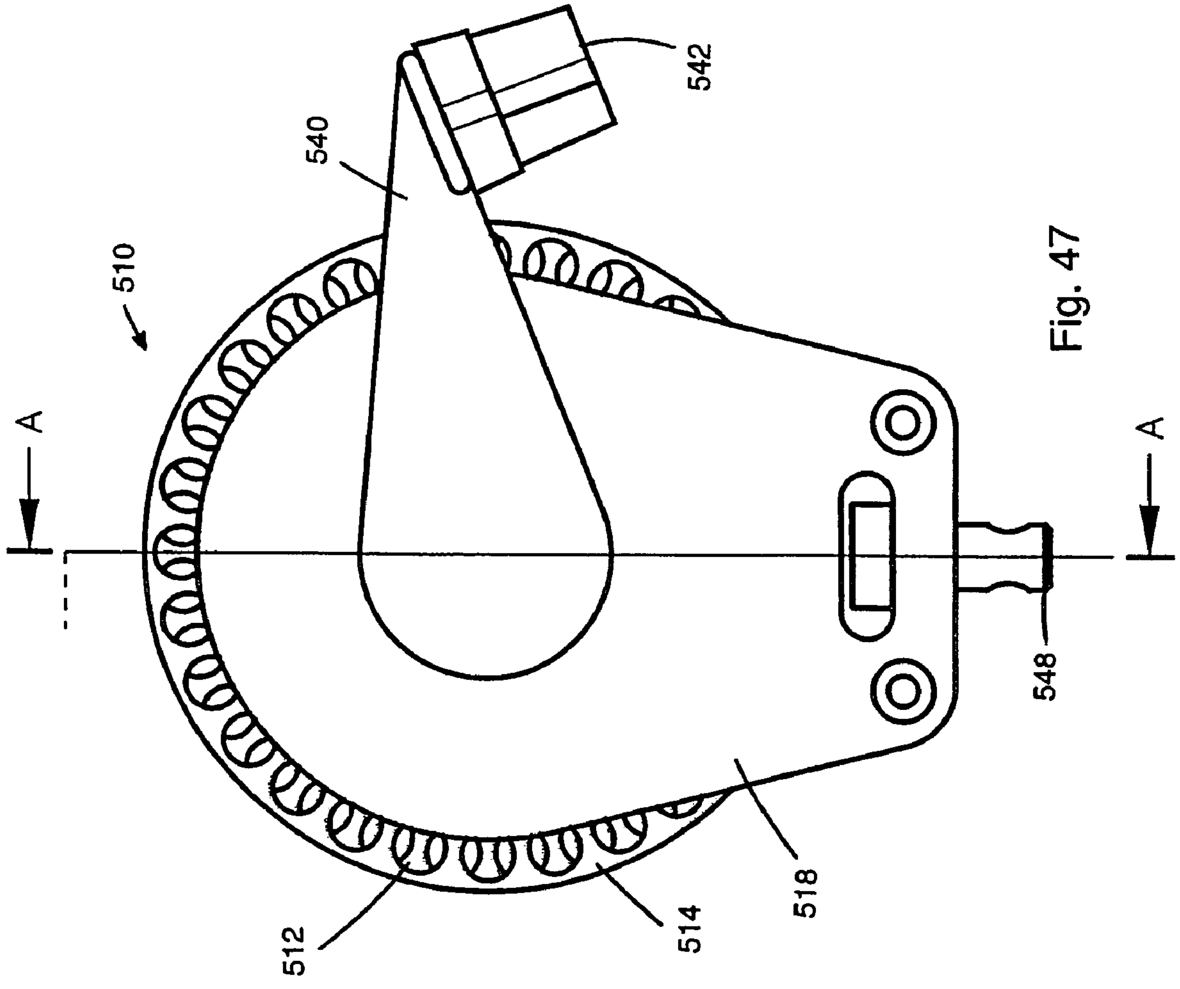
FIG. 47 is a side elevation of the pulley of FIG. 46.
Figure 50:
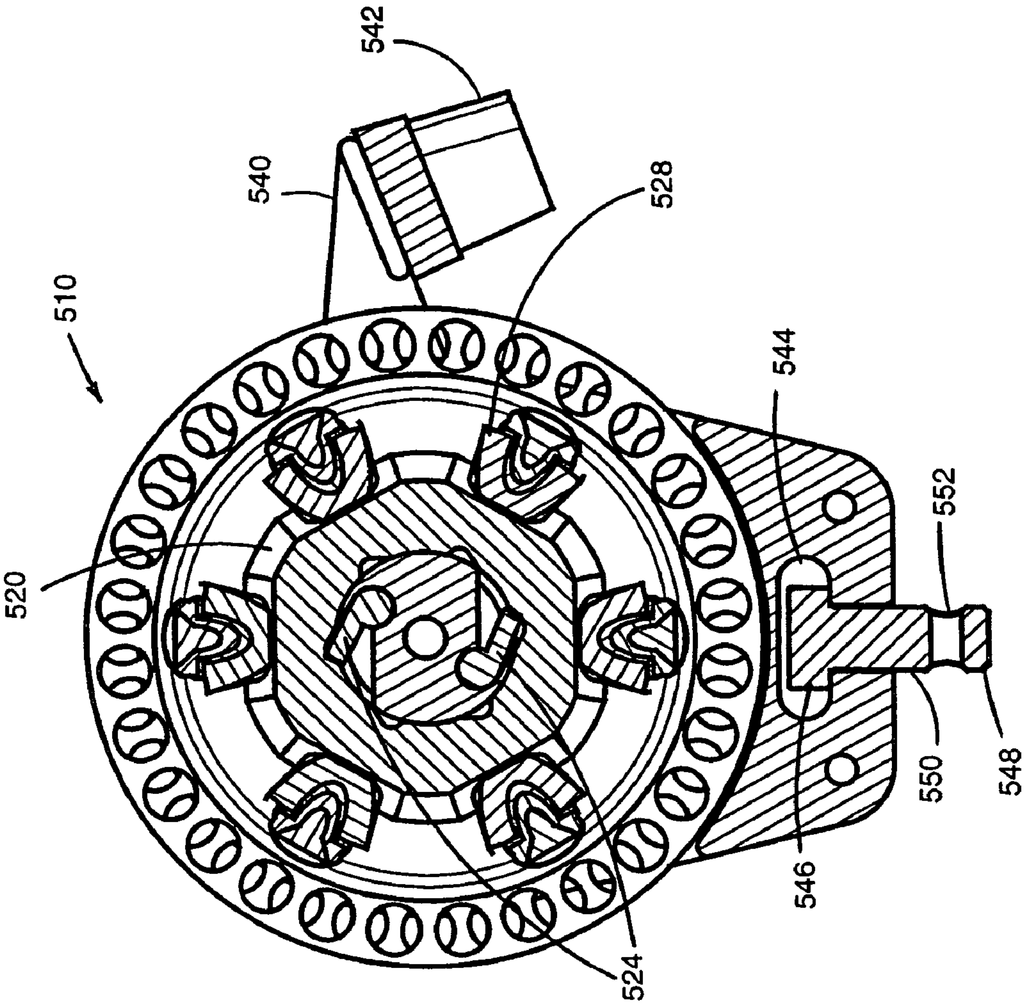
FIG. 50 is a side elevation in cross-section taken through the points B-B of the pulley of FIG. 49.
Figure 49:
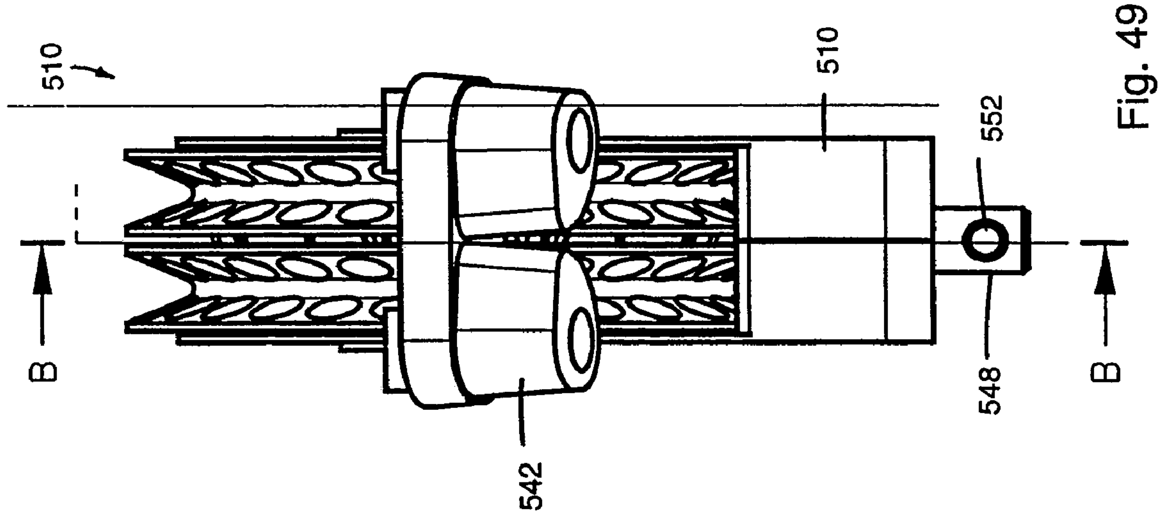
FIG. 49 is a front end elevation of the pulley of FIG. 46.
Figure 51:
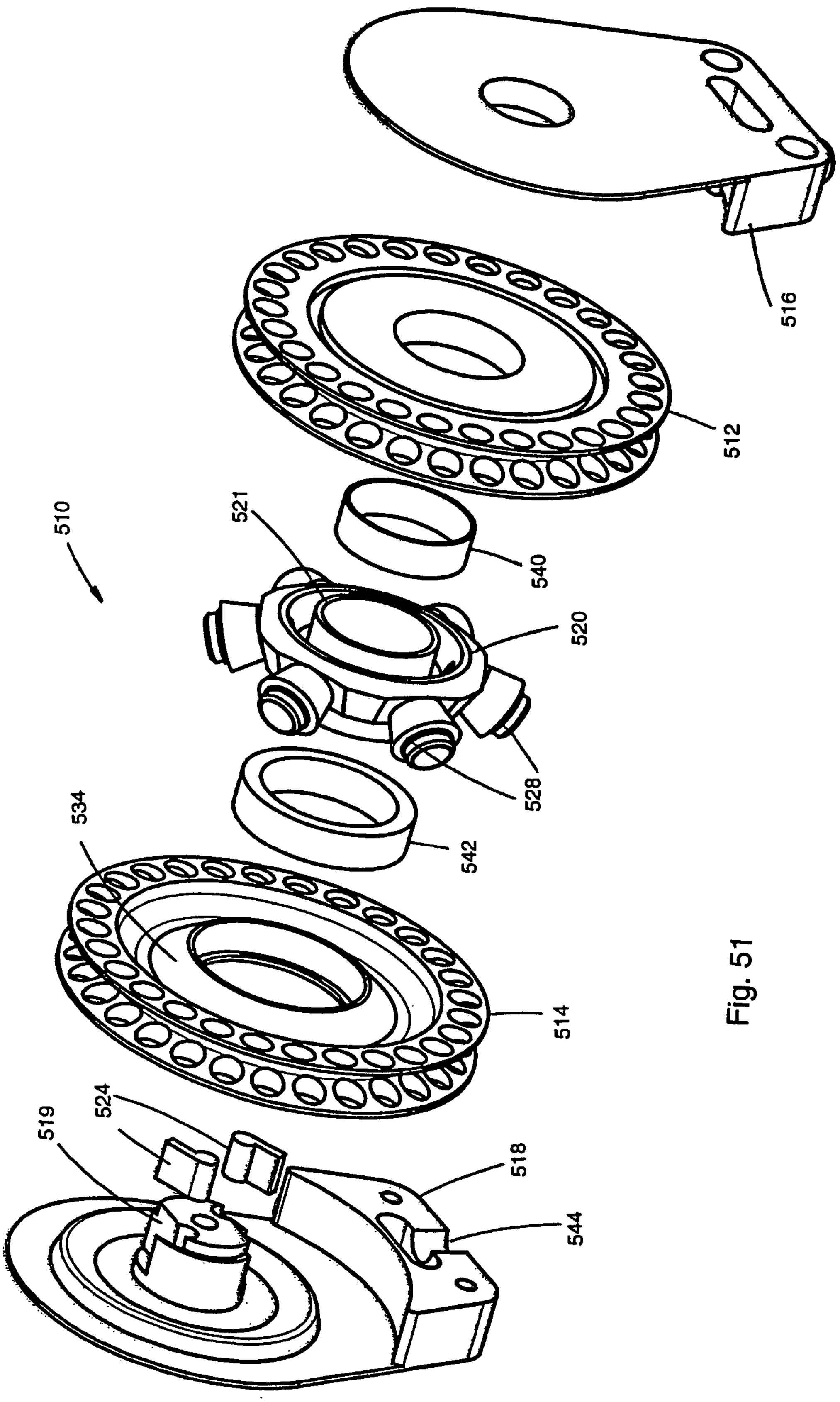
FIG. 51 is a first exploded perspective view of the pulley of FIG. 46.
Figure 52:
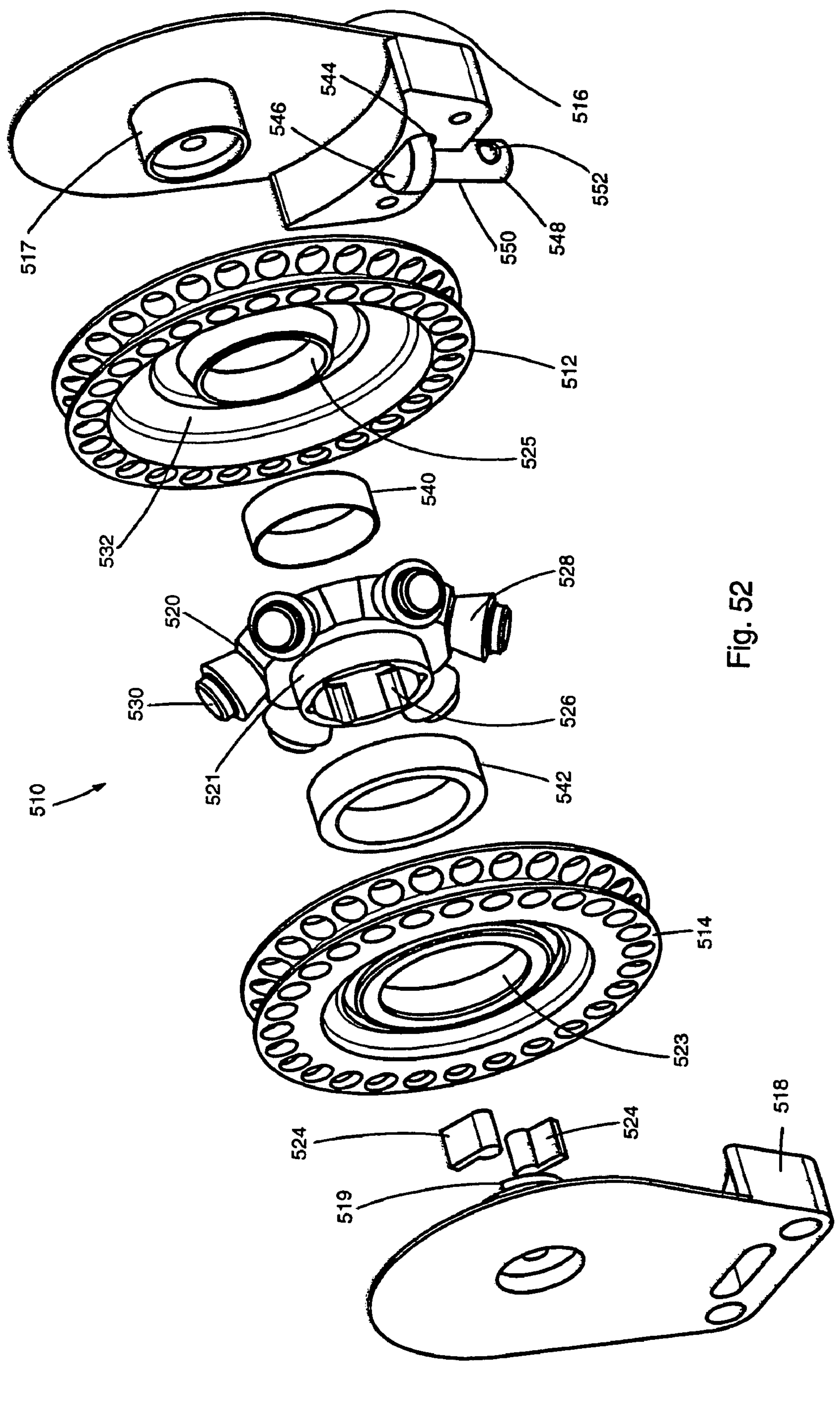
FIG. 52 is a second exploded perspective view of the pulley of FIG. 46.
Figure 53:
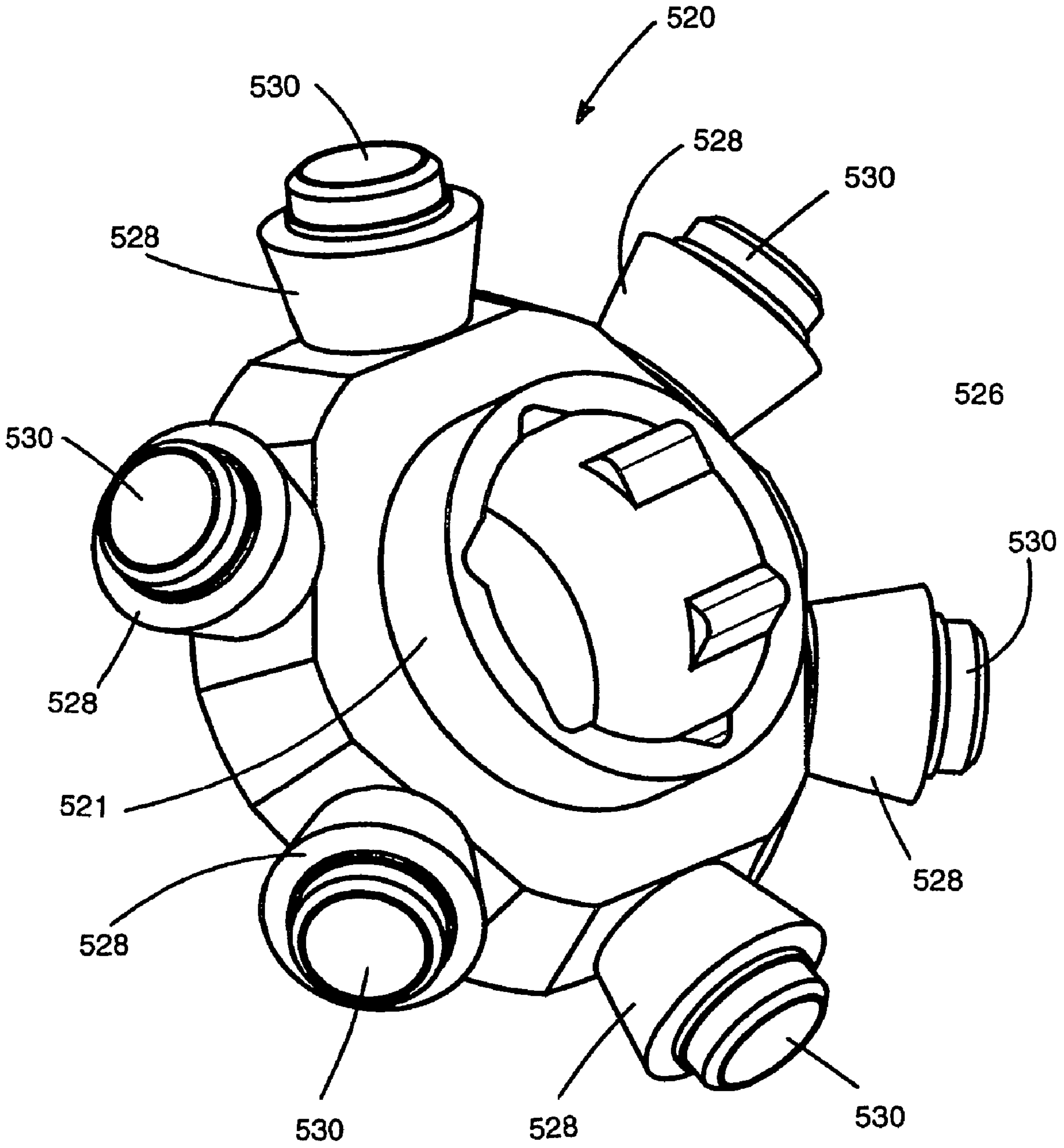
FIG. 53 is a perspective view of the carrier of the pulley of FIG. 46.

The pulley wheels 412, 414 are of the same size, and have an external diameter of 148 mm. With particular reference to FIG. 43, each pulley wheel 412, 414 has a central journal 418 and lip 420. The lips 420 are positioned on respective inside edges of the journals 418. A bearing 422 is fitted into each journal 418. An external casing 424 fits through each bearing 422 and pulley wheel 412, 414 to cover the journals 418. The bearings 422 are trapped within the journals 418 between the lip 420 and the external casing 424. The pulley wheels 412, 414 each have a substantially V-shaped groove 426 running around the circumference for gripping a rope. To increase the grip of the wheels 412, 414 on a rope, the side walls of the groove have holes cut into them. The holes are cut to leave a spoke of uniform width in the circumferential direction between adjacent holes. The spokes are at a slight angle to the radial direction to result in a jamming effect as contact with the angled spokes will tend to draw the rope down into the groove. Also, the holes in one wall are offset from the holes in the other wall. The holes increase grip on a rope and because they are offset they cause a rope to snake as it feeds around the groove of the pulley wheels 412, 414, again increasing friction and grip.

The casing 416 has a circular aperture 428. A circular carrier 430 is fitted within the circular aperture 428 such that the carrier 430 may rotate in the casing 416. The carrier 430 has an axle 432 onto which the trapped bearing 422 and external casing 424 of each pulley wheel 412, 414 fit. The pulley wheels 412, 414, bearings 422 and axle 432 are held in place by a nut and bolt arrangement (not shown), wherein the bolt passes through the external casings 424 and the axle 432. The pulley wheels 412, 414 are mounted to a common axle 432 through separate bearings 422 which allow the wheels 412, 414 to rotate independently from each other.

A gear mechanism is provided as follows. The carrier 430 has three bevelled pinions 434 spaced apart equally around the axle 432. The pinions 434 are positioned in apertures 433 in the carrier 430 and are held in place by substantially radial axles 435. The pulley wheels 412, 414 each have bevelled gear wheels 436, 438 having gear teeth attached to the side of the pulley wheels 412, 414 facing the casing 416. The gear teeth of the gear wheels engage with the pinions 434. The gear wheel 436 attached to the first pulley wheel 412 has 49 gear teeth. The gear wheel 438 attached to the second pulley wheel 414 has 44 gear teeth. The pinions 434 have gear teeth designed to mesh correctly with the gear wheels 436, 438.

Figure 39:
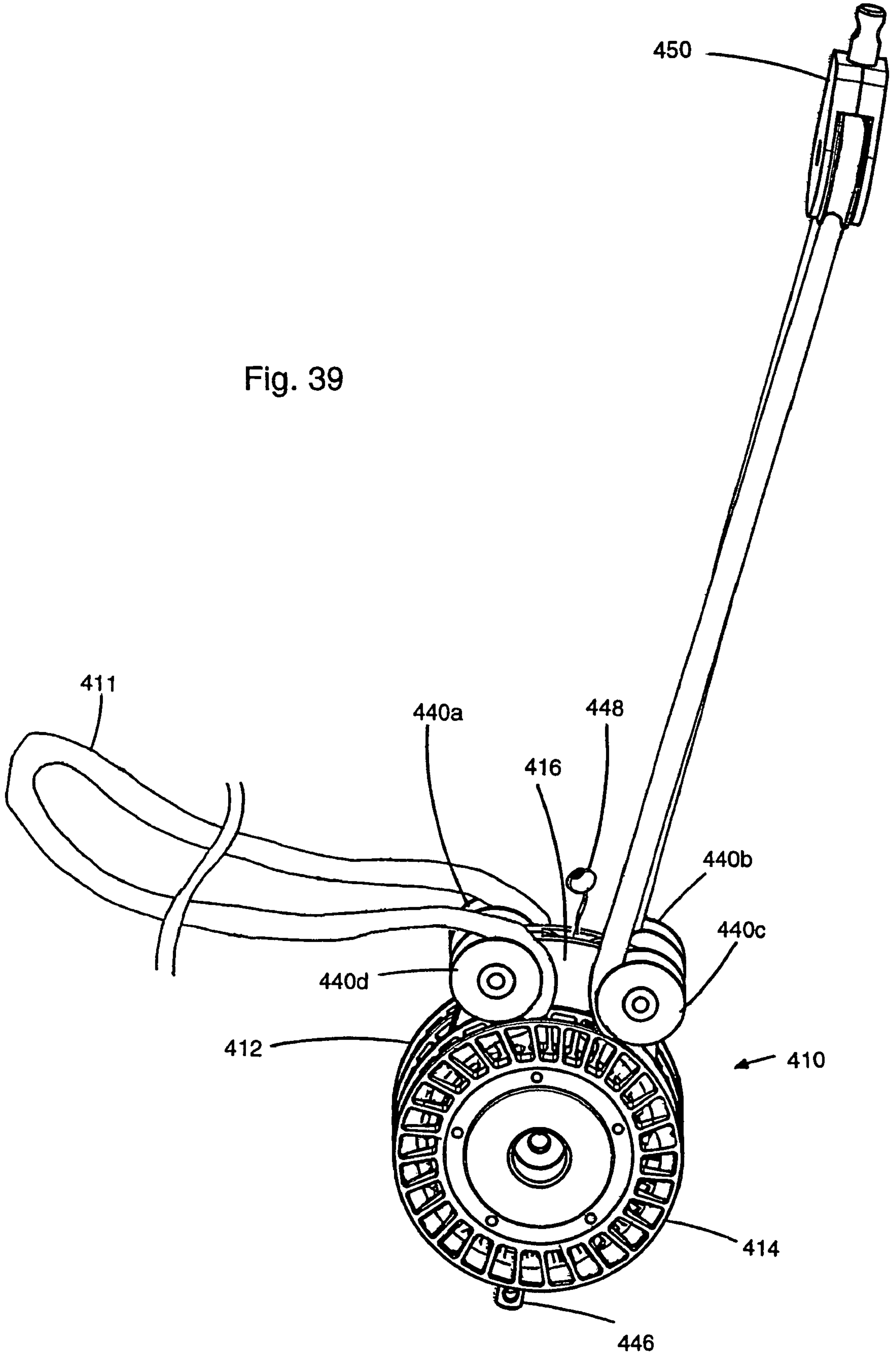
FIG. 39 is a side perspective view of the pulley of the fifth embodiment of the invention in a system showing a rope and pulley block.
Figure 40B:
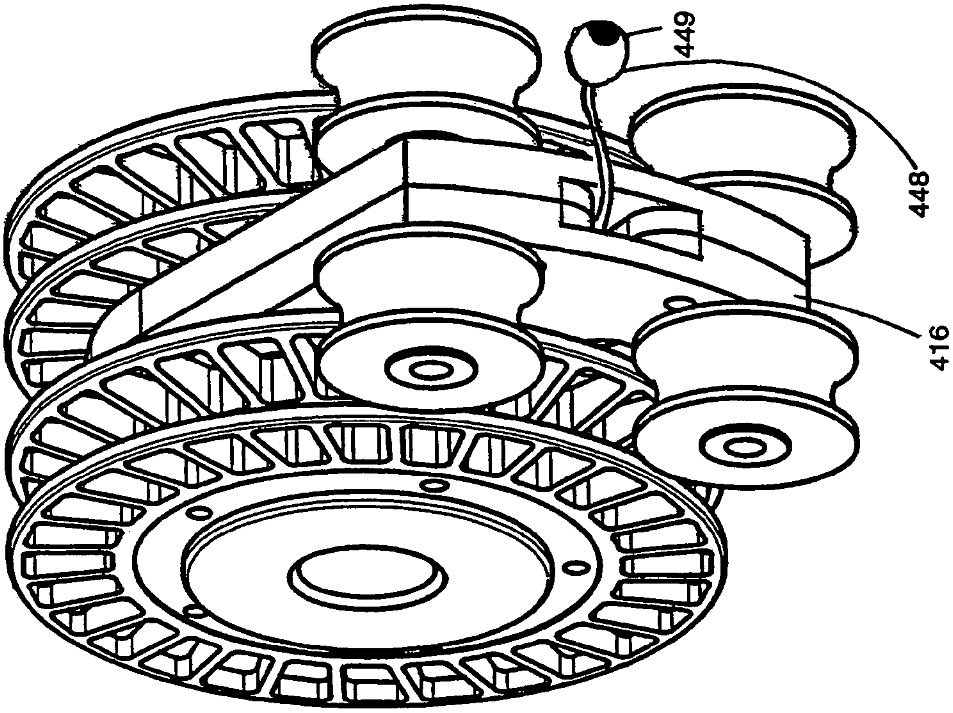
FIGS. 40*a* and 40*b* are perspective views of the pulley of FIG. 39.
Figure 40A:
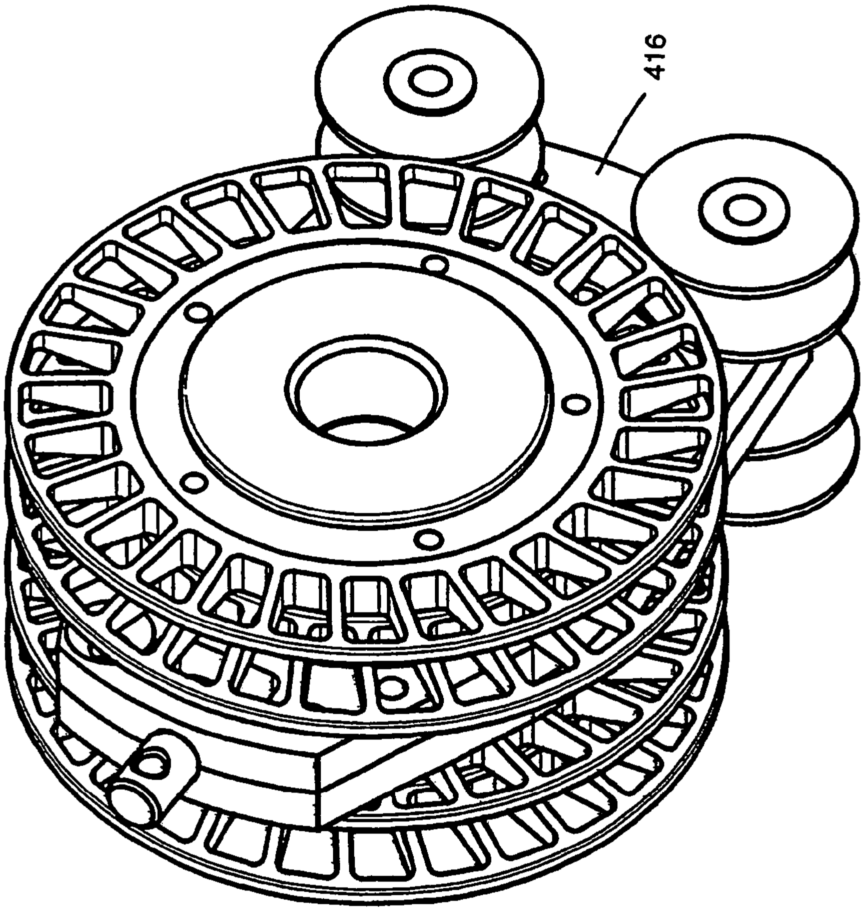
Figure 41A:
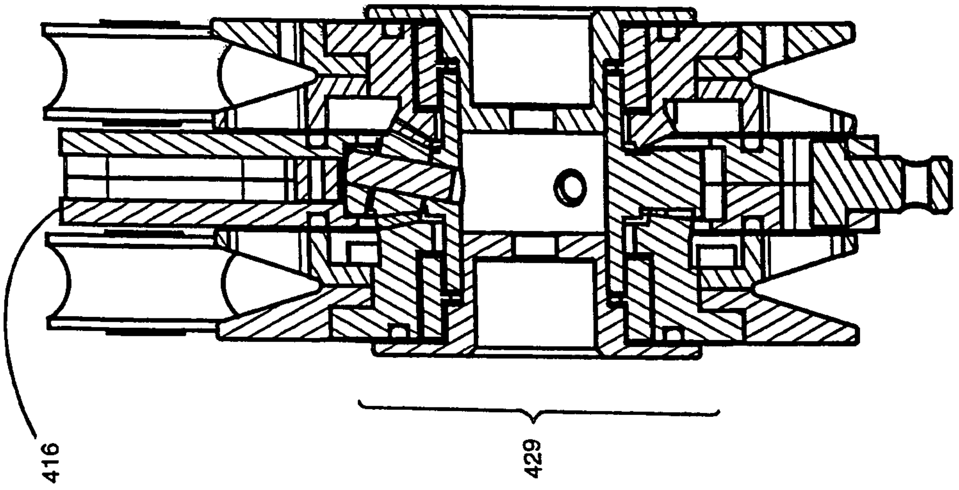
FIG. 41*a* is a side elevation of the pulley of FIG. 39.
Figure 41A:
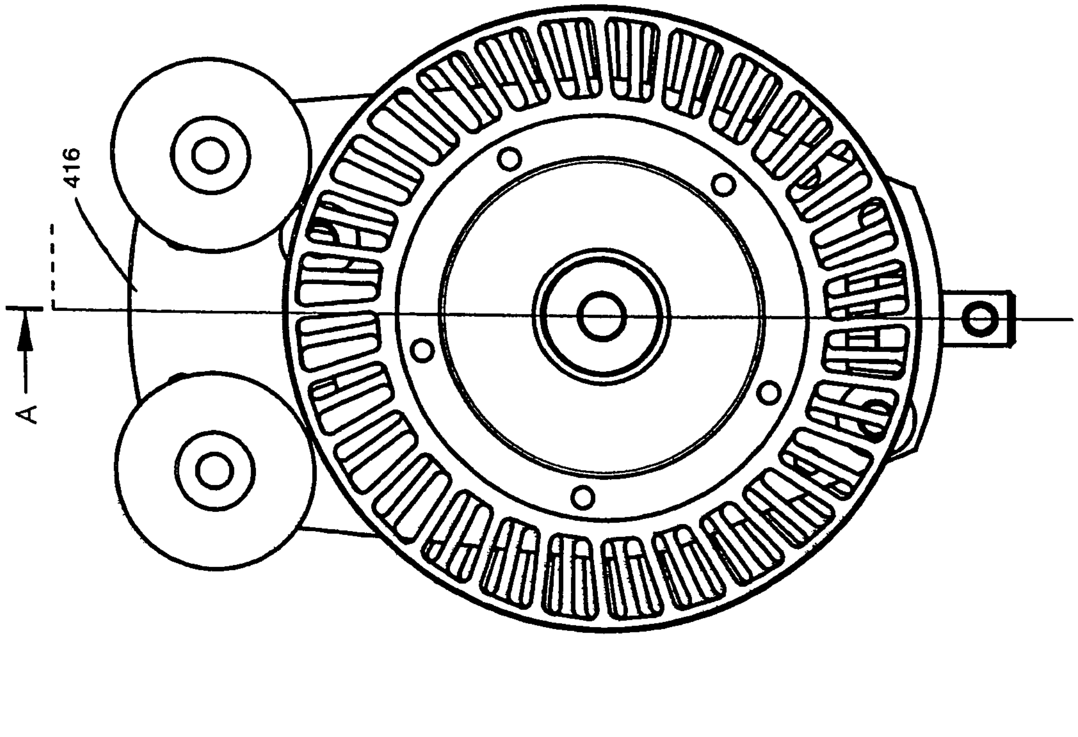
Figure 42B:
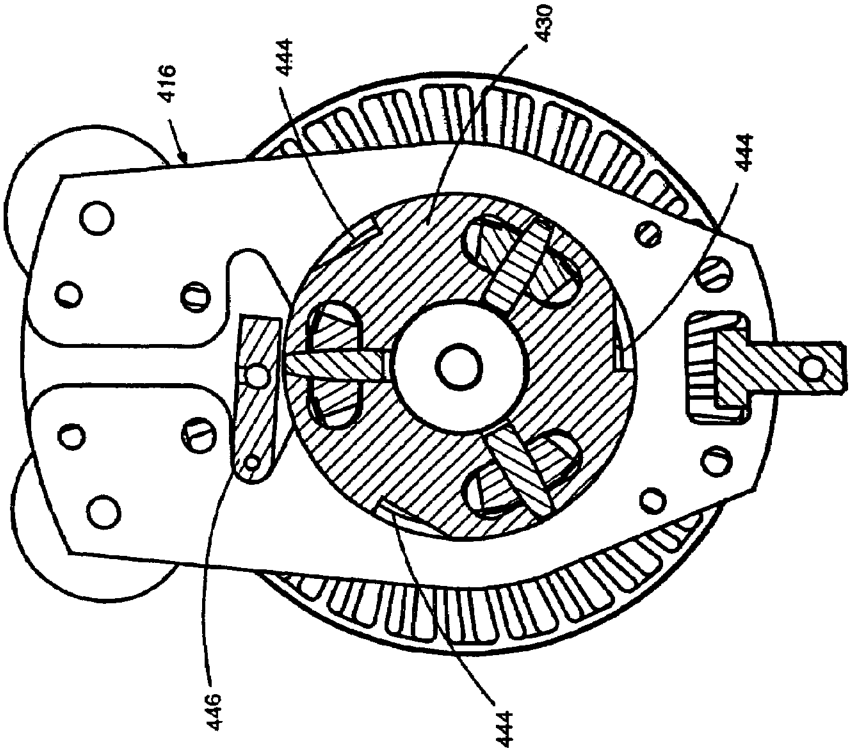
FIG. 42*b* is a side elevation in cross-section taken through the points B-B of the pulley of FIG. 42*a;*
Figure 42A:
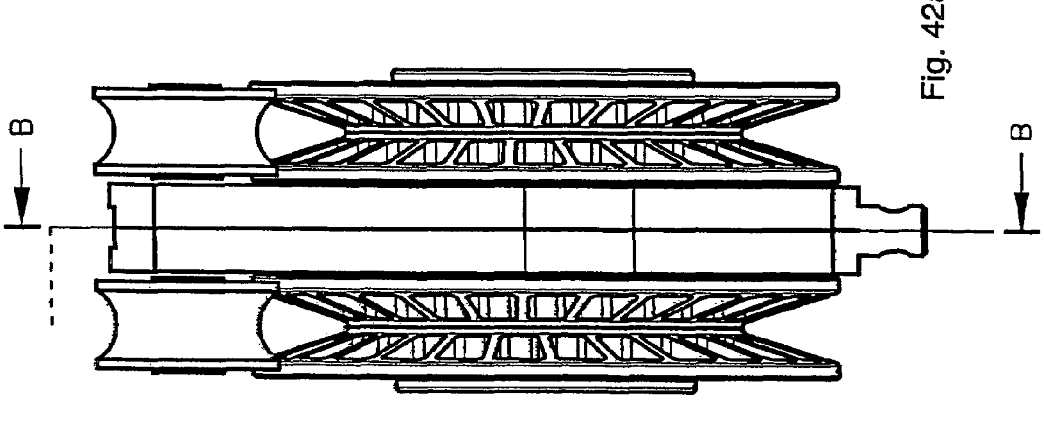
FIG. 42*a* is an end elevation of the pulley of FIG. 39.

FIG. 43 shows the carrier 430 in more detail. The carrier 430 is shaped like a ratchet wheel and has, on its circumference, three ratchets 444. Referring to FIG. 42*b*, the casing 416 has a pawl 446 for engaging with the ratchets 444 of the carrier 430. This ratchet mechanism prevents the carrier 430 from rotating in one direction. Referring to FIG. 39, a toggle 449 is attached to the pawl 446 by a cord 451 so that it may be used to lift the pawl 446 to allow the carrier 430 to rotate in any direction.

The casing 416 carries four spaced-apart feed rollers 440*a*, 440*b*, 440*c*, 440*d* arranged at one end. The feed rollers 440*a*, 440*b*, 440*c*, 440*d* are positioned so that two rollers are in the same plane as the respective pulley wheels 412, 414. At the other end the casing has an anchor point 446 for securing the pulley.

In use, as shown in FIG. 39, a continuous rope 411 runs around the first pulley wheel 412, through feed rollers 440*a*, 440*b* and up to a standard block 450 which is attached to a load (not shown), and back around the second pulley wheel 414 in the same direction as the first pulley wheel 412, and around feed rollers 440*c*, 440*d*.

A first gear ratio is obtained by pulling simultaneously both free ends of the continuous rope 411 which are not fed through the standard block 450. In this way, both pulley wheels 412, 414 turn together. The pinions 434 do not rotate about their axles but the carrier 430 rotates with the pulley wheels 412, 414. The carrier is prevented from counter-rotating by the pawl, and the rope 411 is prevented from running out. The pawl 446 may be lifted so that the rope 411 can run out. A gear ratio of 1:1 is achieved.

A second gear ratio is obtained by securing one free end of the continuous rope 411 in a cleat (not shown) and pulling on the other. In this way, one of the pulley wheels 412, 414 is held in place while the other turns as the rope 411 is pulled. Again, the carrier 430 turns with the pulley wheel but rotates much more slowly. The carrier 430 is prevented from counter-rotating by the pawl 446, and the rope 411 is prevented from running out. A gear ratio of 2:1 is achieved. The pawl 446 may be lifted so that the rope 411 can run out.

A third, high gear ratio is obtained by pulling on one of the free ends of the continuous rope 411 and allowing the other to run out. In this way, the pulley wheels 412, 414 rotate in opposite directions because of the gearing mechanism 429 therebetween. As the number of gears on the first gear wheel 436 is different from the number of gears on the second gear wheel 438, a differential is achieved. A high gear ratio of 19.6:1 is achieved for two gear wheels having 44 and 49 gear teeth respectively. The pawl 446 may be lifted so that the rope 411 can run out.

Referring to FIGS. 46 to 53, a pulley 510 of the sixth embodiment of the invention comprises a first pulley wheel 512, a second pulley wheel 514, a first side plate 516 associated with the first pulley wheel 512, a second side plate 518 associated with the second pulley wheel 514. A pinion carrier 520 is located between the pulley wheels 512, 514.

Two mounting arms 540 attach to and lie against the outside surface of each respective side plate 516, 518, extending outward to join a short distance from the plates 516, 518. A cam cleat 542 is attached to the mounting arms 540 at their outer ends, such that a rope may be fed through the cam cleat 542 onto the first pulley wheel 512.

The first and second side plates 516, 518 each have respective substantially cylindrical protrusions 517, 519 protruding orthogonally therefrom. Protrusion 519 has a pawl mechanism comprising two pawls 524 fitted thereto by tension springs (not shown).

The carrier 520 has a tube-shaped axle 521 arranged to fit over and rotate about the protrusion 517, 519. The part of the axle 521 which fits over the protrusion 519 defines six internal ratchets 526 which are to engage with the pawls 524. The first pulley wheel 512 and second pulley wheel 514 each have respective journals 523, 525. The journals 523, 525 are arranged to fit over an elastomeric bearing 542 and plain bearing 540 and rotate about the axle 521.

The pulley 510 is assembled so that the carrier 520 is sandwiched between the first pulley wheel 512 on one side, and the second pulley wheel 514 on the other. The pulley wheels 512, 514 are able to rotate about the axle 521 of the carrier 520, and the axle 521 is able to rotate about the protrusions 517, 519.

The carrier 520 has a substantially hexagonal cross-section and has six gearless pinions 528 spaced apart equally around the circumference. Each pinion 528 is of frustoconical shape and is made of a hard elastomeric material. The pinions 528 are arranged to rotate about quasi-radial axles 530 that are angled toward the second pulley wheel 524. The first and second pulley wheels 512, 514 have, on their respective inner faces, respective concentric circular tracks 532, 534 suitable for receiving the gearless pinions 528. The track 532 on the first pulley wheel 512 has a larger radius than the track 534 on the second pulley wheel 514. In this way a gear ratio is established between the first and second pulley wheels 512, 514. The tracks 532, 534, pinions 528 and carrier 520 are arranged to produce a 5:4 gear ratio between the two pulley wheels 512, 514.

The elastomeric bearing 542 of the pulley 510 between the axle 521 of the carrier 520 and the journal 523 of the second pulley wheel 514 is arranged to allow the second pulley wheel 514 to rock slightly in the direction of the surface of a notional sphere so that, in use, when a heavy load is acting on the pulley wheel 514, the track 534 is pushed on to the gearless pinions 528 and they are prevented from slipping relative to each other. Under light loads the pinions 528 disengage from the track 532 and quick release of the pulley in a system is achieved.

The pulley wheels 512, 514 each have a V-shaped groove 86 running along the circumference thereof for gripping a rope. To increase the grip of the wheels 512, 514 on a rope, the side walls of the groove have holes cut into them. The holes in one wall are offset from the holes in the other wall. The holes increase grip on a rope and because they are offset they cause a rope to snake as it feeds around the groove of the pulley wheel 512, 514, again increasing friction and grip.

Each side plate 516, 518 has an undercut recess 544, the recesses 544 being opposed so that when the side plates 516, 518 are secured together the recesses 544 retain the head 546 of an anchor 548 such that the foot 550 of the anchor 548 protrudes from the side plates 516, 518, the foot 550 defining an aperture 552 such that the anchor 548 and hence the pulley 510 can be attached to a load or a fixed point.

The pulley, in use, in a system, works as described in the fifth embodiment, but with the release of rope achieved by slipping of the frustoconical pinions against the track.

The rope in each embodiment may be a standard, sailing rope such as made by Marlow Ropes, for example a three strand core rope with a braid cover. The rope is in a continuous loop.

It will be apparent to a person skilled in the art that the design of the grooves of the pulley wheels in each embodiment may be altered provided the desired gripping characteristic of each pulley wheel on a rope, chain or the like is achieved.

It will be apparent to a person skilled in the art that the design of the grooves of the pulley wheels in each embodiment may be altered provided the desired gripping characteristic of each pulley wheel on a rope, chain or the like is achieved.

Figure 55:
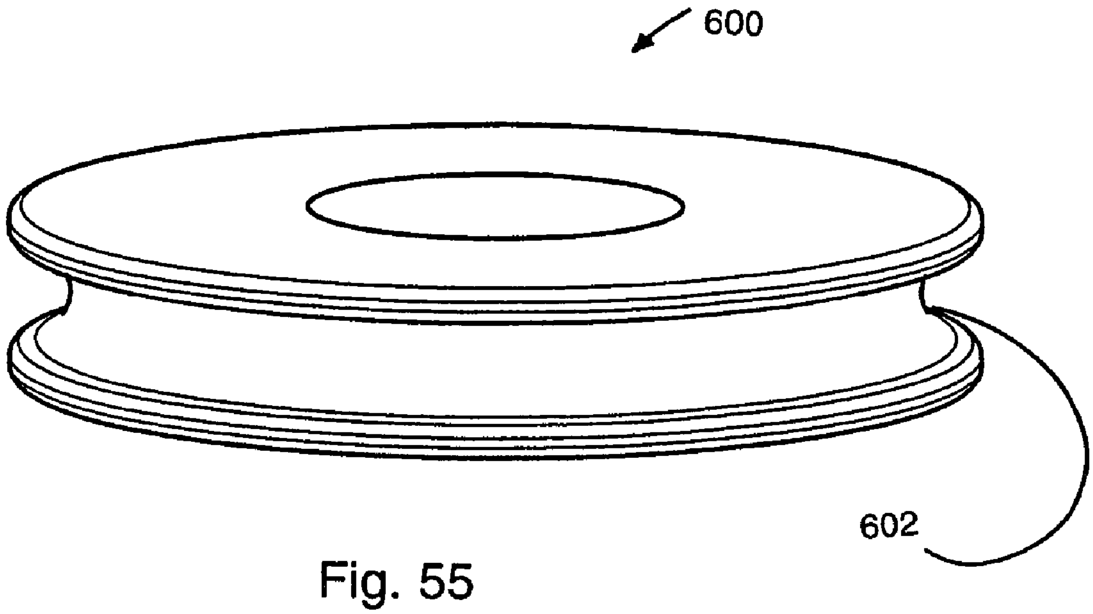
FIGS. 55 to 61 show several alternative pulley wheels.

FIG. 55 shows a standard pulley wheel or sheave 600 having a plain U-shaped groove 602 around the circumference thereof.

Figure 56:
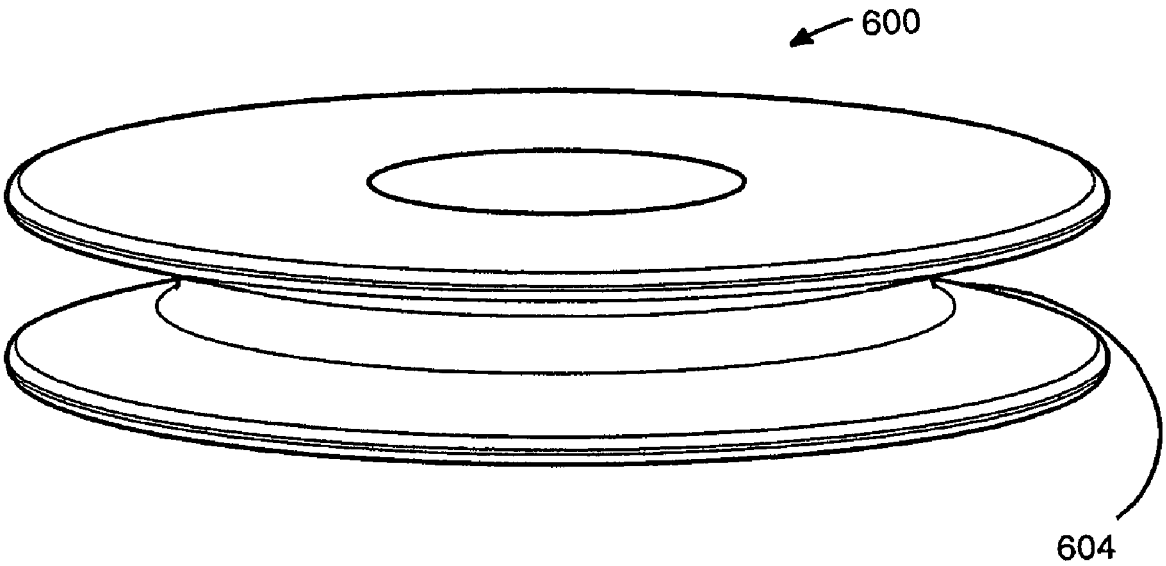

FIG. 56 shows a similar sheave 600 having a deeper, V-shaped groove 604.

Figure 57:
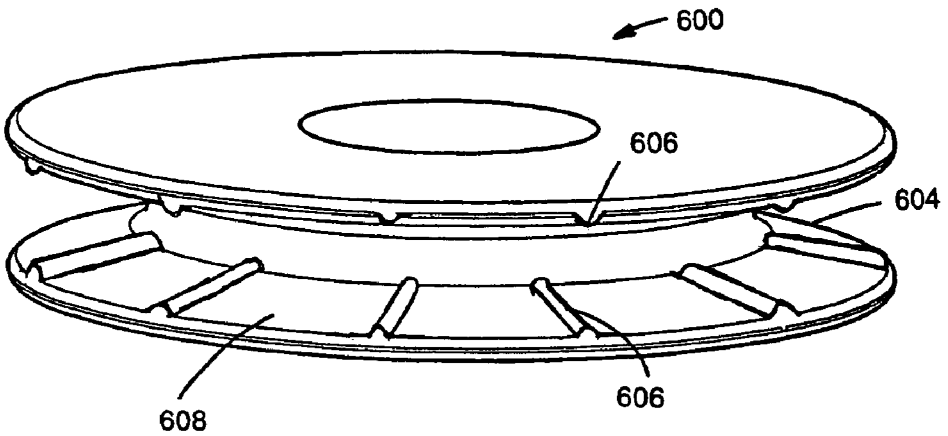

FIG. 57 shows a sheave 600 having a V-shaped groove 604 similar to that of FIG. 56, but having opposite pairs of radially-extending semi-cylindrical inwardly-facing intrusions 606 on the walls 608 defining the groove 604. It will be apparent to the skilled reader that the pairs of intrusions may be offset in an alternative embodiment, although this is not shown in the Figures.

Figure 58:
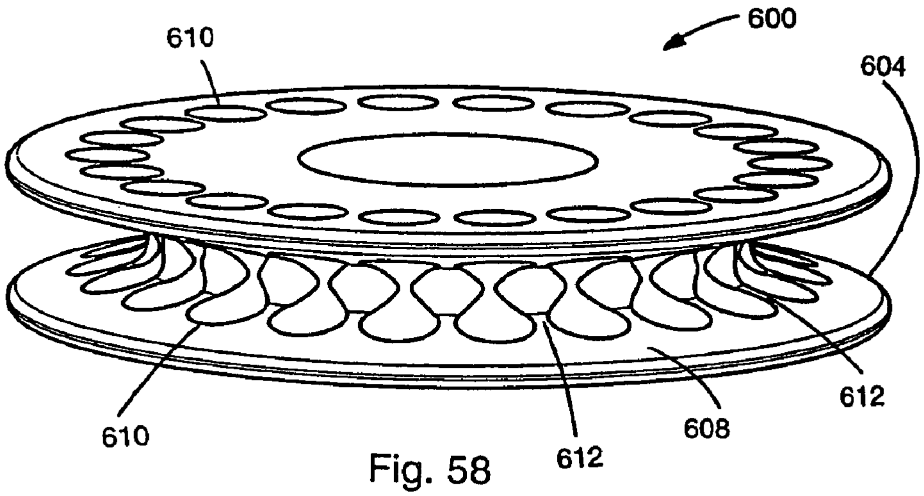

FIG. 58 shows a sheave 600 similar to that shown in FIG. 56, but which has additional aligned opposite pairs of holes 610 in the walls 608 of the groove 604. Adjacent holes define therebetween intrusions 612 in the walls 608 of the groove 604. The holes 610 are tear-shaped because each hole 610 has been formed by drilling through the edge of the sheave axially, and because the groove has a V-shaped cross-section.

Figure 59:
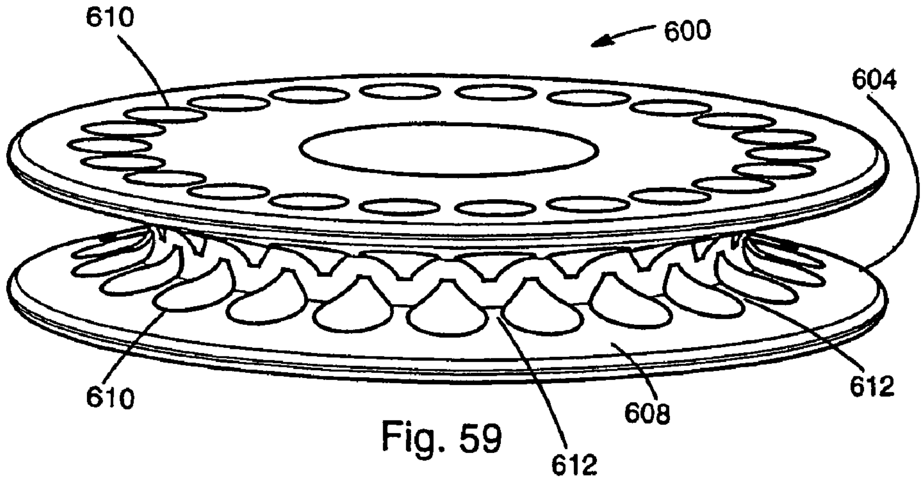

FIG. 59 shows a variation of the sheave 600 of FIG. 58 where the opposite pairs of holes 610 are offset.

Figure 60:
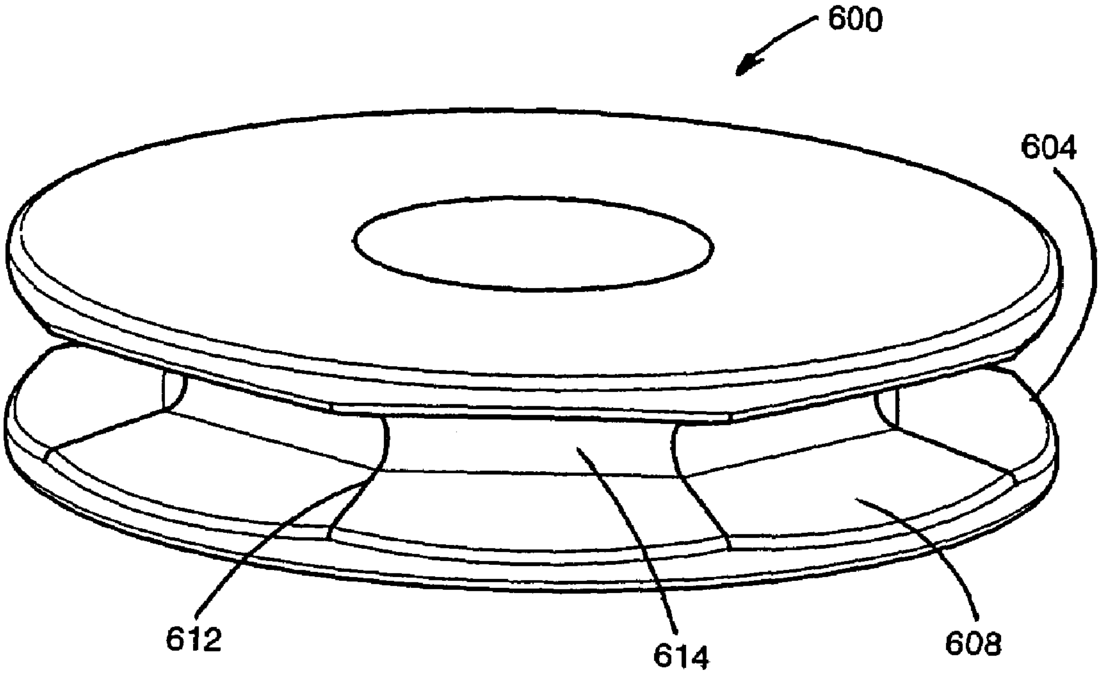

FIG. 60 shows a faceted sheave 600 having a substantially V-shaped groove 604 running around the circumference thereof. The innermost surface of the groove 604 is faceted and has an octagonal profile, i.e. there are eight facets. The groove 604 is narrowest at the point where two of the eight facets 614 meet defining eight intrusions 612. The side walls 608 of the groove 604 bow out between the intrusions 612.

Figure 61:
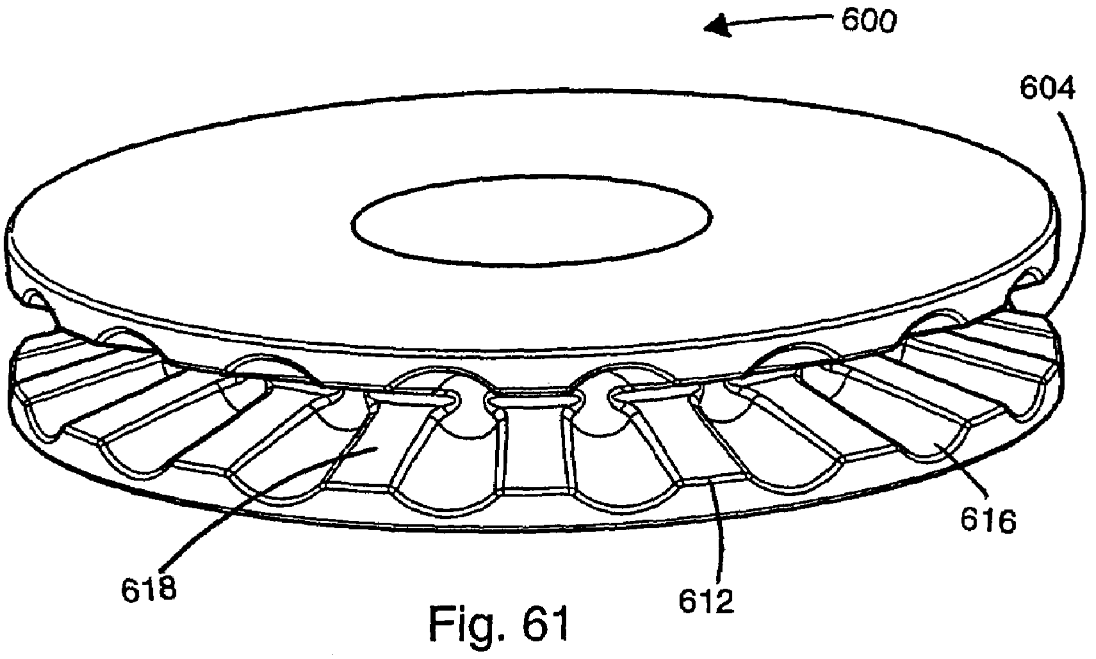

FIG. 61 shows a sheave 600 with a V-shaped groove 604 having radially-drilled conical holes 616 therein. The holes define between them opposite pairs of intrusions 612 in the groove each having a broad, flat inner face 618.

It will be apparent to the skilled reader, that where it is necessary to attach the pulley of any of the embodiments to an object such as the deck or boom of a sailing boat, there are a number of ways in which this can be achieved. All the embodiments show the frame having an anchor point, and in use, it is anticipated that a shackle will be used to attach the anchor point to the object, the object having an eyelet or similar fixed thereto. Another option is to provide holes in the frame of the pulley so that it may be screwed or bolted flat out to the object in a cheek mounted fashion. For example, the flat side of the side plate may be placed flat on the deck of a boat or other surface and bolted or screwed thereto.

What is claimed is:

1. A pulley comprising a first pulley wheel and a second pulley wheel, the pulley including means acting between the two pulley wheels such that:

when substantially equal force is applied to each pulley wheel in use on a rope tail side causing the pulley wheels to rotate, then a low gear ratio is achieved through a rope or chain acting on a load through a block;

when one pulley wheel is prevented from rotating and a force is applied to the other pulley wheel in use on a rope tail side causing it to rotate, then a higher gear ratio is achieved through a rope or chain acting on a load through a block; and, when force is applied to the first wheel on a rope tail side and the second pulley wheel is allowed to rotate, then a still higher ratio is achieved in use through a rope or chain acting on a load through a block.

2. A pulley as claimed in claim 1, wherein the means acting between the pulley wheels prevents relative rotation of the pulley wheels in one direction, the pulley wheels being able to rotate relative to each other in the other direction.

3. A pulley as claimed in claim 2, wherein the means to prevent relative rotation of the pulley wheels in one direction comprises a ratchet mechanism.

4. A pulley as claimed in claim 3, wherein the ratchet mechanism is a load-activated ratchet system so that the ratchet operates only when the load on one pulley wheel reaches a certain level.

5. A pulley as claimed in claim 4, wherein part of the ratchet mechanism is resiliently moveable under load to activate the load-activated ratchet mechanism.

6. A pulley as claimed in claim 1, wherein the first pulley wheel is arranged to grip a rope or chain reaved around the pulley less well than the second pulley wheel.

7. A pulley as claimed in claim 1, wherein the first pulley wheel is arranged to prevent a rope or chain reaved around the pulley from slipping relative to the pulley wheel when both tails of the rope or chain coming from the pulley wheel are under tension, the pulley wheel being arranged to allow the rope or chain to slip relative to the pulley wheel when one or both tails of the rope are not under tension.

8. A pulley as claimed in claim 7, wherein the second pulley wheel is arranged to prevent a rope or chain from slipping around the pulley wheel.

9. A pulley as claimed in claim 1 wherein at least one pulley wheel is arranged for use with rope, a plurality of intrusions are offset on opposite sides of a circumferential groove in said pulley wheel to create a serpentine path for the rope.

10. A pulley as claimed in claim 1 wherein at least one pulley wheel is grooved around its circumference, the inner surface of the groove consists of a series of facets.

11. A pulley as claimed in claim 1, wherein the pulley has a frame and the frame defines an opening aligned with the second pulley wheel to enable a rope or chain to be fed around substantially the whole circumference of the second pulley wheel.

12. A pulley as claimed in claim 11, wherein the frame carries means for jamming the rope or chain.

13. A pulley as claimed in claim 1, further comprising a brake to resist rotation of at least one pulley wheel.

14. A pulley as claimed in claim 13, wherein urging means is provided to urge the pulley wheel and the brake together.

15. A pulley as claimed in claim 14, wherein the urging means comprises an elastomeric bush mounted axially of the pulley wheel.

16. A pulley as claimed in claim 1, wherein the first pulley wheel and the second pulley wheel have a common axis of rotation.

17. A pulley as claimed in claim 16, wherein the first pulley wheel and the second pulley wheel each rotate about a common axle.

18. A pulley as claimed in claim 1, wherein one pulley wheel has a larger effective radius for rope around the pulley wheel than the other.

19. A pulley as claimed in claim 1, wherein the means acting between the pulley wheels imparts, when a rotational force is applied to the first pulley wheel, an opposite counter-rotational force on the second pulley wheel such that in the absence of a force on the second pulley wheel opposite to the counter-rotational force, a rotational force applied to the first pulley wheel causes the first pulley wheel to rotate and the second pulley wheel to counter-rotate.

20. A pulley comprising a first pulley wheel, a second pulley wheel and means to prevent relative rotation of the pulley wheels in one direction, the pulley wheels being able to rotate relative to each other in the other direction, wherein the means to prevent relative rotation of the pulley wheels in one direction comprises a ratchet mechanism.

21. A pulley as claimed in claim 20, wherein the ratchet mechanism is a load-activated ratchet system so that the ratchet operates only when the load on one pulley wheel reaches a certain level.

22. A pulley as claimed in claim 21, wherein part of the ratchet mechanism is resiliently moveable under load to activate the load-activated ratchet mechanism.

23. A pulley as claimed in claim 20, wherein the first pulley wheel is arranged to grip a rope or chain reaved around the pulley less well than the second pulley wheel.

24. A pulley as claimed in claim 20, wherein the first pulley wheel is arranged to prevent a rope or chain reaved around the pulley from slipping relative to the pulley wheel when both tails of the rope or chain coming from the pulley wheel are under tension, the pulley wheel being arranged to allow the rope or chain to slip relative to the pulley wheel when one or both tails of the rope are not under tension.

25. A pulley as claimed in claim 20, wherein the second pulley wheel is arranged to prevent a rope or chain from slipping around the pulley wheel.

26. A pulley as claimed in claim 20 wherein at least one pulley wheel is arranged for use with rope, a plurality of intrusions are offset on opposite sides of a circumferential groove in said pulley wheel to create a serpentine path for the rope.

27. A pulley as claimed in claim 20 wherein at least one pulley wheel is grooved around its circumference, the inner surface of the groove consists of a series of facets.

28. A pulley as claimed in claim 20, wherein the pulley has a frame and the frame defines an opening aligned with the second pulley wheel to enable a rope or chain to be fed around substantially the whole circumference of the second pulley wheel.

29. A pulley as claimed in claim 28, wherein the frame carries means for jamming the rope or chain.

30. A pulley as claimed in claim 20, further comprising a brake to resist rotation of at least one pulley wheel.

31. A pulley as claimed in claim 30, wherein urging means is provided to urge the pulley wheel and the brake together.

32. A pulley as claimed in claim 31, wherein the urging means comprises an elastomeric bush mounted axially of the pulley wheel.

33. A pulley as claimed in claim 20, wherein the first pulley wheel and the second pulley wheel have a common axis of rotation.

34. A pulley as claimed in claim 20, wherein the first pulley wheel and the second pulley wheel each rotate about a common axle.

35. A pulley as claimed in claim 20, wherein one pulley wheel has a larger effective radius for rope around the pulley wheel than the other.

36. A pulley comprising a first pulley wheel, a second pulley wheel and means acting between the pulley wheels such that, a force acting to rotate the first pulley wheel in a first direction imparts a corresponding force to rotate the second pulley wheel in a second, opposite direction.

37. A pulley as claimed in claim 36, wherein, when the second pulley wheel is prevented from rotating, the force acting to rotate the first pulley wheel causes the first pulley wheel to rotate but not the second pulley wheel.

38. A pulley as claimed in claim 37, wherein, when a force is acting to rotate the second pulley wheel in the same direction as the first pulley wheel, the force acting to rotate the first pulley wheel causes the first pulley wheel to rotate, and the force acting to rotate the second pulley wheel causes the second pulley wheel to rotate in the same direction as the first pulley wheel.

39. A pulley as claimed in claim 36, wherein means is provided to allow the first and second pulley wheels to slip relative to each other under low load conditions.

40. A pulley as claimed in claim 36, wherein the means acting between the two pulley wheels is a gear means.

41. A pulley as claimed in claim 40, wherein the gear means includes a plurality of pinions, said first and second pulley wheels including means for engaging said pinions.

42. A pulley as claimed in claim 41, wherein each of the means for engaging the pinions is a continuous track.

43. A pulley as claimed in claim 42 wherein the continuous tracks lie out of the major plane of respective pulley wheels.

44. A pulley as claimed in claim 43, wherein the pinions are frustoconical rollers.

45. A pulley as claimed in claim 44, wherein the rollers are made of elastomeric material.

46. A pulley as claimed in claim 41, wherein the means for engaging the pinions are gear wheels having gear teeth.

47. A pulley as claimed in claim 46, wherein the pinions are held by a carrier, the carrier being rotatable.

48. A pulley as claimed in claim 47, wherein the pinions extend substantially radially from the axis of rotation of the carrier.

49. A pulley as claimed in claim 47, wherein the first pulley wheel, the second pulley wheel and the carrier have a common axis of rotation.

50. A pulley as claimed in claim 41, wherein the number of pinions provided obeys the following formula: the total number of gear teeth on the two gear wheels divided by the number of pinions equals an integer.

51. A pulley as claimed in claim 41, wherein the pinions are angled.

52. A pulley as claimed in claim 36 further including a frame, wherein the carrier is arranged such that, in a first state, it can rotate relative to the frame in one direction only, but, in a second state, it can rotate relative to the frame in both directions.

53. A pulley as claimed in claim 52, wherein one of the carrier and the frame of the pulley carries a ratchet and the other of the carrier and the frame of the pulley carries a pawl.

54. A pulley as claimed in claim 53, wherein there is provided a quick-release for the ratchet and pawl.

55. A pulley as claimed in any of claims 52, wherein the frame is provided with means for feeding rope or chain to the pulley wheels.

56. A pulley as claimed in claim 55, wherein the means for feeding comprises two opposed wheels for each pulley wheel.

57. A system comprising a pulley having a first pulley wheel and a second pulley wheel, the pulley including means acting between the two pulley wheels such that:

when substantially equal force is applied to each pulley wheel in use on a rope tail side causing the pulley wheels to rotate, then a low gear ratio is achieved through a rope or chain acting on a load through a block;

when one pulley wheel is prevented from rotating and a force is applied to the other pulley wheel in use on a rope tail side causing it to rotate, then a higher gear ratio is achieved through a rope or chain acting on a load through a block; and, when force is applied to the first wheel on a rope tail side and the second pulley wheel is allowed to rotate, then a still higher ratio is achieved in use through a rope or chain acting on a load through a block, the system further comprising a rope or chain.

58. A system as claimed in claim 57, wherein the rope or chain is wound around the pulley wheels in opposite directions.

59. A system as claimed in claim 58, wherein the first pulley wheel and the rope have a friction coefficient such that the ratio of tension between the two ends of the rope when reaved around the first pulley wheel is greater than half the highest gearing ratio of the system.

60. An expanded system comprising a pulley having a first pulley wheel and a second pulley wheel, the pulley including means acting between the two pulley wheels such that:

when substantially equal force is applied to each pulley wheel in use on a rope tail side causing the pulley wheels to rotate, then a low gear ratio is achieved through a rope or chain acting on a load through a block;

when one pulley wheel is prevented from rotating and a force is applied to the other pulley wheel in use on a rope tail side causing it to rotate, then a higher gear ratio is achieved through a rope or chain acting on a load through a block; and, when force is applied to the first wheel on a rope tail side and the second pulley wheel is allowed to rotate, then a still higher ratio is achieved in use through a rope or chain acting on a load through a block, the expanded system further comprising a rope or chain and at least one block.

61. A boat having an expanded system comprising a pulley having a first pulley wheel and a second pulley wheel, the pulley including means acting between the two pulley wheels such that:

when substantially equal force is applied to each pulley wheel in use on a rope tail side causing the pulley wheels to rotate, then a low gear ratio is achieved through a rope or chain acting on a load through a block;

when one pulley wheel is prevented from rotating and a force is applied to the other pulley wheel in use on a rope tail side causing it to rotate, then a higher gear ratio is achieved through a rope or chain acting on a load through a block; and, when force is applied to the first wheel on a rope tail side and the second pulley wheel is allowed to rotate, then a still higher ratio is achieved in use through a rope or chain acting on a load through a block, the expanded system further comprising a rope or chain and at least one block.

62. A pulley comprising a first pulley wheel, a second pulley wheel, a frame mounting the first and second pulley wheels and means acting between the pulley wheels such that, a force acting to rotate the first pulley wheel in a first direction imparts a corresponding force to rotate the second pulley wheel in a second, opposite direction, and an anchor point for attachment of the pulley being provided on the frame.

63. A pulley comprising a first pulley wheel, a second pulley wheel, a frame mounting the first and second pulley wheels, means acting between the pulley wheels to prevent relative rotation of the pulley wheels in one direction, wherein the pulley wheels being able to rotate relative to each other in the other direction, wherein one pulley wheel has a larger effective radius for rope around the pulley wheel than the other, and an anchor point for attachment of the pulley being provided on the frame.

64. A pulley comprising a first pulley wheel, a second pulley wheel and means to prevent relative rotation of the pulley wheels in one direction, the pulley wheels being able to rotate relative to each other in the other direction, wherein at least one pulley wheel is arranged for use with rope, a plurality of intrusions are offset on opposite sides of a circumferential groove in said pulley wheel to create a serpentine path for the rope.

65. A pulley comprising a first pulley wheel, a second pulley wheel and means to prevent relative rotation of the pulley wheels in one direction, the pulley wheels being able to rotate relative to each other in the other direction, wherein at least one pulley wheel is grooved around its circumference, the inner surface of the groove consists of a series of facets.

66. A pulley comprising a first pulley wheel, a second pulley wheel and means to prevent relative rotation of the pulley wheels in one direction, the pulley wheels being able to rotate relative to each other in the other direction, further comprising a brake to resist rotation of at least one pulley wheel.

* * * * *